US012130399B2

(12) United States Patent
Wheelock et al.

(10) Patent No.: US 12,130,399 B2
(45) Date of Patent: Oct. 29, 2024

(54) SYSTEMS AND METHODS FOR MEASURING CLUSTER EFFICIENCY USING BROADBAND TUBE WAVES

(71) Applicant: ExxonMobil Technology and Engineering Company, Spring, TX (US)

(72) Inventors: Brent D. Wheelock, Lebanon, NJ (US); Peter A. Gordon, Yardley, PA (US); Limin Song, West Windsor Township, NJ (US); Kenneth W. Desmond, Doylestown, PA (US); Yibing Zhang, Annandale, NJ (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 74 days.

(21) Appl. No.: 18/045,656

(22) Filed: Oct. 11, 2022

(65) Prior Publication Data

US 2023/0147476 A1     May 11, 2023

Related U.S. Application Data

(60) Provisional application No. 63/261,959, filed on Oct. 1, 2021.

(51) Int. Cl.
*G01V 1/50*     (2006.01)
*E21B 43/26*     (2006.01)
(Continued)

(52) U.S. Cl.
CPC ............ *G01V 1/50* (2013.01); *E21B 47/26* (2020.05); *E21B 49/00* (2013.01); *G01V 1/137* (2013.01);
(Continued)

(58) Field of Classification Search
CPC . G01V 1/50; G01V 1/137; G01V 1/46; G01V 2210/646; E21B 47/12;
(Continued)

(56) References Cited

U.S. PATENT DOCUMENTS 11,609,351 B2 *   3/2023   Vu .................. E21B 47/14
11,725,507 B2 *   8/2023   Gordon ............ G01V 1/46
                                                                 166/250.1

* cited by examiner

*Primary Examiner* — Franklin D Balseca
(74) *Attorney, Agent, or Firm* — ExxonMobil Technology and Engineering Company—Law Department

(57) ABSTRACT

Methods and systems for measuring cluster efficiency for stages of wellbores are provided herein. One method includes selecting a frequency band for generating broadband tube waves within the fluid column of the wellbore and generating the broadband tube waves within the fluid column of the wellbore using a pressure pulse generator that is hydraulically coupled to the wellbore. The method also includes recording data corresponding to the broadband tube waves and reflected broadband tube waves using pressure receivers that are hydraulically coupled to the wellbore. The pressure receivers are arranged into arrays with two or more pressure receivers in each array. The data recorded by the pressure receivers relate to characteristics of reflectors (including perforation cluster/fracture interfaces) within the wellbore. The method further includes processing the recorded data using interferometry and performing full waveform inversion(s) on the processed data to determine frequency-dependent, complex-valued reflection coefficients at each perforation cluster/fracture interface.

20 Claims, 25 Drawing Sheets

(51) Int. Cl.
  *E21B 47/26* (2012.01)
  *E21B 49/00* (2006.01)
  *G01V 1/137* (2006.01)
  *G01V 1/46* (2006.01)
(52) U.S. Cl.
  CPC ................ *G01V 1/46* (2013.01); *E21B 43/26* (2013.01); *G01V 2210/646* (2013.01)
(58) Field of Classification Search
  CPC .......... E21B 47/14; E21B 47/18; E21B 47/20; E21B 47/22; E21B 47/24; E21B 47/26; E21B 43/26; E21B 49/00; E21B 49/008
  See application file for complete search history.

SYSTEMS AND METHODS FOR MEASURING CLUSTER EFFICIENCY USING BROADBAND TUBE WAVES

CROSS-REFERENCE TO RELATED APPLICATION

This application claims the benefit of U.S. Provisional Application 63/261,959, entitled "Systems and Methods for Measuring Cluster Efficiency Using Broadband Tubewaves," filed Oct. 1, 2021, the disclosure of which is hereby incorporated by reference in its entirety.

FIELD OF THE INVENTION

The techniques described herein relate to the field of hydrocarbon well completions and hydraulic fracturing operations. More specifically, the techniques described herein relate to systems and methods for measuring cluster efficiency for stages of a hydrocarbon well using broadband tube waves that extend to high frequencies.

BACKGROUND OF THE INVENTION

This section is intended to introduce various aspects of the art, which may be associated with embodiments of the present techniques. This discussion is believed to assist in providing a framework to facilitate a better understanding of particular aspects of the present techniques. Accordingly, it should be understood that this section should be read in this light, and not necessarily as admissions of prior art.

In the drilling of hydrocarbon wells, a wellbore is formed within a formation using a drill bit that is advanced at the lower end of a drill string until it reaches a predetermined location in the subsurface. The drill string and bit are then removed, and the wellbore is lined with steel tubulars, commonly referred to as casing strings or liners. An annulus is thus formed between the casing strings and the surrounding subsurface formation. A cementing operation is typically conducted to fill the annulus with columns of cement. The combination of the casing strings and the cement strengthens the wellbore and isolates or impedes fluid flow and pressure transmissibility along the annulus.

It is common to place several casing strings having progressively-smaller outer diameters into the wellbore. The first casing string may be referred to as the "surface casing string." The surface casing string serves to isolate and protect the shallower, freshwater-bearing aquifers from contamination by any other wellbore fluids. Accordingly, this casing string is almost always cemented entirely back to the surface.

A process of drilling and then cementing progressively-smaller casing strings is repeated several times below the surface casing string until the hydrocarbon well has reached total depth. The final casing string, referred to as the "production casing string," extends through a hydrocarbon-bearing interval within the formation, referred to as a "reservoir." In some instances, the production casing string is a liner, that is, a casing string that is not tied back to the surface. The production casing string is also typically cemented into place. In some completions, the production casing string has swell packers or plugs spaced across selected productive intervals. This creates compartments between the packers for isolation of stages and specific stimulation treatments. In this instance, the annulus may simply be packed with subsurface formation sand.

As part of the completion process, a section of the well is isolated through the setting of a packer or plug. The production casing string is then perforated at one or more desired intervals uphole of the plug. This means that holes are created through the production casing string and the cement column surrounding the production casing string using a perforating gun. In operation, the perforating gun typically forms one perforation cluster by shooting a number of holes in close proximity, such as, for example, 12 to 18 perforations at one time, over a 1- to 3-foot region, with each perforation being approximately 0.3 to 0.5 inches in diameter. The perforating gun is then typically moved uphole 10 to 100 feet, and a second perforating gun is used to form a second perforation cluster. This process of forming perforation clusters is repeated to create additional perforation clusters within each stage of the hydrocarbon well. The resulting clusters of perforations allow hydrocarbon fluids from the surrounding reservoir to flow into the hydrocarbon well. Note that in some wells, casing strings are provided that have pre-formed perforations, such as sliding sleeve tubulars. Typically, the preformed perforations are initially closed, but can be opened through various forms of actuation to control fluid flow through the perforations.

After the perforation process is complete, the reservoir is typically fractured at the corresponding stage to increase the reservoir's productivity. Hydraulic fracturing consists of injecting a volume of fracturing fluid through the created perforations and into the surrounding reservoir at such high pressures and rates that the reservoir rock in proximity to the perforations cracks open and extends outwardly in proportion to the injected fluid volume. Ideally, a separate fracture emanates outwardly from each perforation cluster, forming a set of fractures, commonly referred to as a "fracture network." Ideally, this fracture network includes a sequence of parallel fracture planes, thereby creating as much fracturing of the reservoir rock as possible. Near the wellbore, a complex topology of fractures may result from the breakdown of perforations within a cluster, but it is common to assume that these fractures ultimately link up to form a single dominant fracture plane that is hydraulically connected to the wellbore. In operation, to create the fracture, the injection pressure of the fracturing fluid must exceed the hydraulic pressure within the subsurface formation plus the strength of the rock, and often even exceeds the lithostatic pressure in the formation.

Hydraulic fracturing is used most extensively for increasing the productivity of "unconventional," or "tight," reservoirs, which are reservoirs with very low permeability that typically do not produce economically without hydraulic fracturing. Examples of unconventional reservoirs include tight sandstone reservoirs, tight carbonate reservoirs, shale gas reservoirs, coal bed methane reservoirs, and/or tight oil reservoirs. During the hydraulic fracturing of such reservoirs, the injection rate of the fracturing fluid is typically increased until it reaches a maximum injection rate of around 20-150 barrels per minute (bbl/min). In operation, approximately 5,000 to 15,000 barrels of fracturing fluid may be injected for each stage of the hydrocarbon well.

In operation, a small portion, i.e., around 5-10%, of the fracturing fluid is pumped into the wellbore during a pad phase. The pad phase is designed to initiate fractures and grow the fractures to a certain size and volume to accommodate the injection of a proppant material, such as sand, crushed granite, ceramic beads, or other granular materials. The remaining portion of the fracturing fluid is mixed with the proppant material and pumped into the wellbore and through the perforations into the SRV. The volume of proppant material is usually increased as fracturing progresses, with the volume percent of the proppant material added limited by the possibility that the proppant may jam in the narrow flow pathways of the fractures, a phenomenon known as "screen-out". The volume of proppant added to the fracturing fluid typically may reach around 10 vol. %. The proppant material serves to hold the fractures open after the hydraulic pressures are released. Ideally, the resulting fractures grow to be hundreds of feet radially from the wellbore into the reservoir. In the case of unconventional reservoirs, the combination of fractures and injected proppant substantially increases the flow capacity of the treated reservoir.

In order to further stimulate the reservoir and to clean the near-wellbore regions downhole, an operator may choose to acidize the reservoir. This is done by injecting an acid solution down the wellbore and through the perforations. The use of an acidizing solution is particularly beneficial when the reservoir includes tight carbonate rock. In operation, the completion company injects a concentrated formic acid or other acidic composition into the wellbore and directs the fluid into selected stages of interest. The acid helps to dissolve carbonate material, thereby opening up porous channels through which hydrocarbon fluids may flow into the hydrocarbon well. In addition, the acid helps to dissolve drilling mud that may have invaded the reservoir.

Application of hydraulic fracturing and acid stimulation as described above is a routine part of petroleum industry operations as applied to individual reservoirs. Such reservoirs may represent hundreds of feet of gross, vertical thickness of subterranean formation. More recently, hydrocarbon wells are being completed through reservoirs horizontally, with the horizontal (or "lateral") sections often extending greater than 1,000 feet, in which case the hydrocarbon well may be referred to as an "extended-reach lateral well," or, in some cases, greater than 10,000 feet, in which case the hydrocarbon well may be referred to as an "ultra-extended-reach lateral well."

When there are multiple-layered or very thick reservoirs to be hydraulically fractured, or where an extended-reach or ultra-extended-reach lateral well is being completed, then more complex treatment techniques are required to obtain treatment of the entire target area. Therefore, the operating company must isolate various stages to ensure that each separate stage is not only perforated, but also adequately fractured and treated. In this way, the operator is sure that fracturing fluid and stimulant are being injected through each perforation cluster and into each stage of interest to effectively increase the flow capacity at each desired depth and lateral location.

Treatment of a stage of interest requires isolation from all stages that have already been treated. This, in turn, involves the use of so-called diversion methods, in which injected fracturing fluid is directed towards one selected stage of interest while being diverted from other stages. In many cases, frac plugs are set between stages and are used to prevent injected fluid from entering stages that have already been fractured and propped.

This hydraulic fracturing process is repeated for every stage in the hydrocarbon well. In the case of wells including lateral sections, the first stage is typically located near the end (or "toe") of the lateral section, and the last stage is typically located near the beginning (or "heel") of the lateral section. For extended-reach lateral wells, there will typically be around 20-50 individual stages. Moreover, some ultra-extended-reach lateral wells may include more than 100 stages.

After the hydraulic fracturing process is complete, the frac plugs (and/or other diversion materials) may be drilled out of the hydrocarbon well. The hydrocarbon well may then be put into production, meaning that it may be used to recover hydrocarbon fluids from the reservoir. In operation, the pressure differential between the reservoir and the hydrocarbon well is typically used to force hydrocarbon fluids to flow through the fractures in the reservoir and into the production casing string via the corresponding perforation clusters. The hydrocarbon fluids then flow up the hydrocarbon well to the surface.

In operation, the success of the hydraulic fracturing process has a direct impact on the amount of hydrocarbon fluids that may be recovered from the reservoir. Specifically, the numbers, sizes (e.g., lengths, heights, and/or aperture sizes), compliances, and locations of the fractures corresponding to the perforation clusters within each stage of the hydrocarbon well directly impact the amount of hydrocarbon fluids that are able to mobilize and flow into the hydrocarbon well. Ideally, each perforation cluster leads to one fracture, and the fracturing fluid is evenly distributed among the perforation clusters and corresponding fractures such that contact surfaces and flow conduits are uniform (i.e., in length, height, and aperture) among the fractures. This ideal scenario offers the best potential for maximizing production from a well by uniformly draining the greatest possible extent of the reservoir through optimized well spacing and efficient stimulation. However, it has been estimated that only a fraction of the stages in a multi-stage well typically contribute to the ultimate production of hydrocarbon fluids from the reservoir. Moreover, while accurate fracture characterization is essential for enabling optimized well planning and efficient stimulation, it is very difficult to measure the exact number, locations, and injected fluid volume distribution among the perforation clusters and corresponding fractures. To date, reliable and accurate fracture characterization remains elusive. In particular, currently-available fracture diagnostic technologies are still indirect, and high associated costs prevent their routine application.

SUMMARY OF THE INVENTION

An embodiment described herein provides a method for measuring cluster efficiency for a stage of a wellbore, where the wellbore includes a fluid column that is defined by a surface casing string that couples the wellbore to a wellhead located at a surface and a production casing string that extends through a reservoir within a subsurface. The method includes selecting a frequency band for generating broadband tube waves within the fluid column of the wellbore and generating the broadband tube waves within the fluid column of the wellbore using a pressure pulse generator that is hydraulically coupled to the wellbore. The method also includes recording data corresponding to the broadband tube waves and reflected broadband tube waves using a number of pressure receivers that are hydraulically coupled to the wellbore, where the pressure receivers are arranged into arrays with at least two pressure receivers in each array and with one array positioned on the same tubing as the pressure pulse generator and another array positioned on a separate offshoot of tubing, where the data recorded by the pressure receivers relate to characteristics of reflectors within the wellbore, and where the reflectors include perforation cluster/fracture interfaces within a stage of the wellbore. The method further includes processing the recorded data using interferometry and performing at least one full waveform inversion on the processed data to determine frequency-dependent, complex-valued reflection coefficients at each perforation cluster/fracture interface within the stage of the wellbore.

Another embodiment described herein provides a system for measuring cluster efficiency for a stage of a wellbore. The system includes a pressure pulse generator that is hydraulically coupled to a wellbore and is configured to generate broadband tube waves with a selected frequency band, where the broadband tube waves propagate within a fluid column within the wellbore and interact with perforation cluster/fracture interfaces and other reflectors within a stage of the wellbore, creating reflected broadband tube waves that propagate within the fluid column. The system also includes at least two arrays of pressure receivers that are hydraulically coupled to the wellbore and are configured to record data corresponding to the broadband tube waves and the reflected broadband tube waves, where each array includes at least two pressure receivers, with one array positioned on the same tubing as the pressure pulse generator and another array positioned on a separate offshoot of tubing, and where the data recorded by the pressure receivers provide frequency-dependent, complex-valued reflection coefficients at each perforation cluster/fracture interface within the stage of the wellbore after application of interferometric techniques and at least one full waveform inversion.

These and other features and attributes of the disclosed embodiments of the present disclosure and their advantageous applications and/or uses will be apparent from the detailed description which follows.

BRIEF DESCRIPTION OF THE DRAWINGS

To assist those of ordinary skill in the relevant art in making and using the subject matter thereof, reference is made to the appended drawings.

Figure 1A:
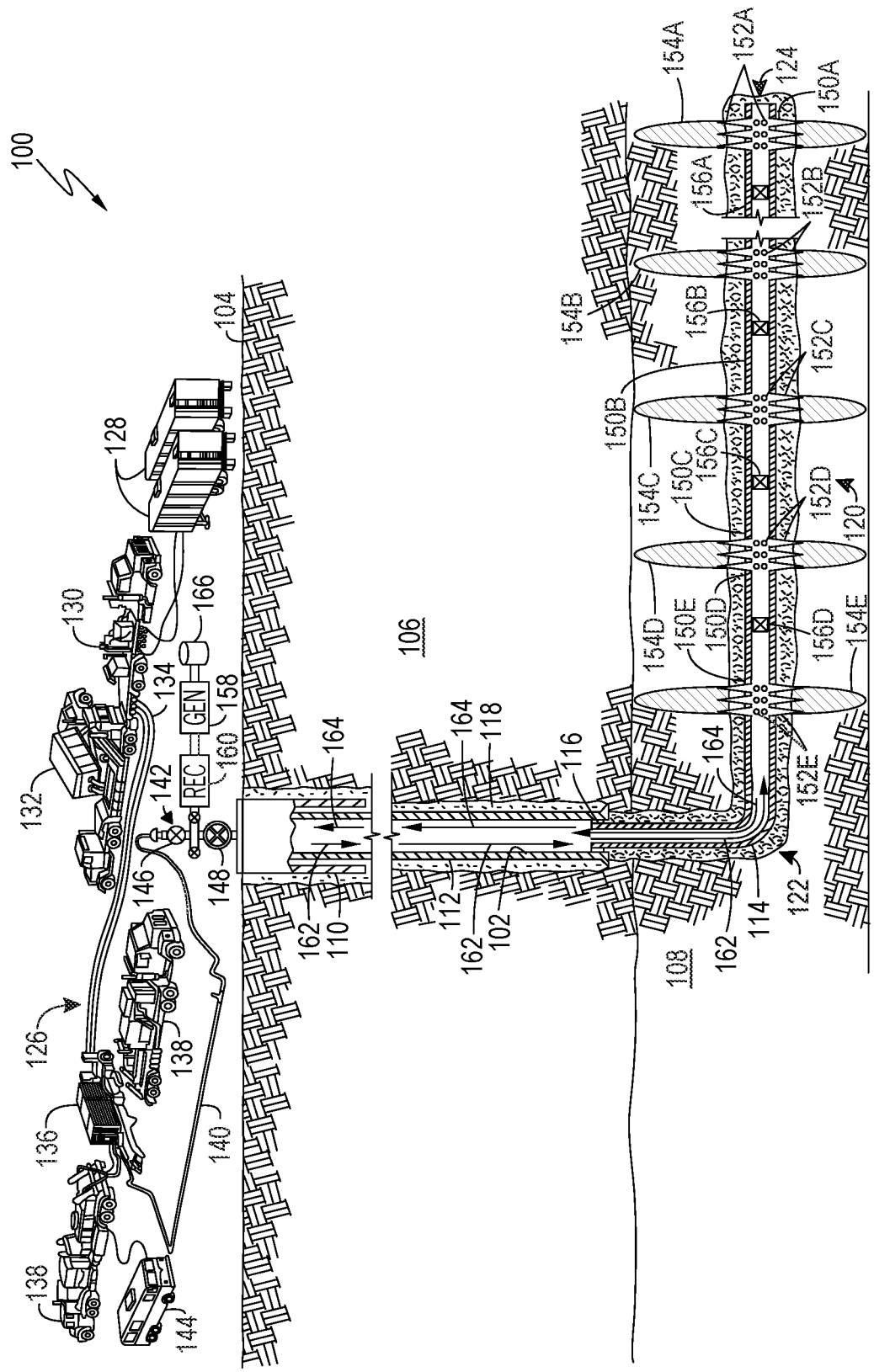
FIG. 1A is a schematic view of an exemplary hydrocarbon well including cluster efficiency measurement equipment that may be used in conjunction with a hydraulic fracturing process.

It should be noted that the figures are merely examples of the present techniques and are not intended to impose limitations on the scope of the present techniques. Further, the figures are generally not drawn to scale, but are drafted for purposes of convenience and clarity in illustrating various aspects of the techniques.

DETAILED DESCRIPTION OF THE INVENTION

In the following detailed description section, the specific examples of the present techniques are described in connection with preferred embodiments. However, to the extent that the following description is specific to a particular embodiment or a particular use of the present techniques, this is intended to be for example purposes only and simply provides a description of the embodiments. Accordingly, the techniques are not limited to the specific embodiments described below, but rather, include all alternatives, modifications, and equivalents falling within the true spirit and scope of the appended claims.

At the outset, and for ease of reference, certain terms used in this application and their meanings as used in this context are set forth. To the extent a term used herein is not defined below, it should be given the broadest definition those skilled in the art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As used herein, the singular forms "a," "an," and "the" mean one or more when applied to any embodiment described herein. The use of "a," "an," and/or "the" does not limit the meaning to a single feature unless such a limit is specifically stated.

The terms "about" and "around" mean a relative amount of a material or characteristic that is sufficient to provide the intended effect. The exact degree of deviation allowable in some cases may depend on the specific context, e.g., ±1%, ±5%, ±10%, ±15%, etc. It should be understood by those of skill in the art that these terms are intended to allow a description of certain features described and claimed without restricting the scope of these features to the precise numerical ranges provided. Accordingly, these terms should be interpreted as indicating that insubstantial or inconsequential modifications or alterations of the subject matter described are considered to be within the scope of the disclosure.

The term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "including," may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the term "any" means one, some, or all of a specified entity or group of entities, indiscriminately of the quantity.

The phrase "at least one," in reference to a list of one or more entities, should be understood to mean at least one entity selected from any one or more of the entities in the list of entities, but not necessarily including at least one of each and every entity specifically listed within the list of entities, and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently, "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the phrase "based on" does not mean "based only on," unless expressly specified otherwise. In other words, the phrase "based on" means "based only on," "based at least on," and/or "based at least in part on.

The term "broadband" is meant to describe a single signal, or ensemble of signals, generated by a pressure pulse generator, which is characterized by a broad and continuous range of frequencies having an appreciable power above the ambient noise level. For example, a signal (or ensemble of signals) with continuously high power between 5 and 500 Hz, all above the noise floor, is more of a broadband signal (or ensemble of signals) than one with continuously high power between 20 and 100 Hz. In the time-domain, a single broadband pressure pulse signal has a very narrow yet smooth appearance, or short duration with minimal oscillation. Yet, note that, due to the linearity of tube waves, an ensemble of signals, taken as separate recordings, each with slightly different and somewhat narrow frequency bands of appreciable power, may be summed together to create an effectively broadband signal. Additionally, given the use of interferometry (as described herein), the broadband signal need not have a zero-valued or linear phase spectrum, that is, concentrated in time. In other words, the wide range of frequencies with appreciable power may be phase-shifted in a complicated manner such that their time-domain expression is long in duration, yet nonetheless, the cumulative power spectrum in the frequency-domain is broadband. An example of this is a Chirp waveform.

As used herein, the term "configured" means that the element, component, or other subject matter is designed and/or intended to perform a given function. Thus, the use of the term "configured" should not be construed to mean that a given element, component, or other subject matter is simply "capable of performing a given function but that the element, component, and/or other subject matter is specifically selected, created, implemented, utilized, and/or designed for the purpose of performing the function.

As used herein, the terms "example," exemplary," and "embodiment," when used with reference to one or more components, features, structures, or methods according to the present techniques, are intended to convey that the described component, feature, structure, or method is an illustrative, non-exclusive example of components, features, structures, or methods according to the present techniques. Thus, the described component, feature, structure, or method is not intended to be limiting, required, or exclusive/exhaustive; and other components, features, structures, or methods, including structurally and/or functionally similar and/or equivalent components, features, structures, or methods, are also within the scope of the present techniques.

As used herein, the term "fluid" refers to gases and liquids, as well as to combinations of gases and liquids, combinations of gases and solids, combinations of liquids and solids, and combinations of gases, liquids, and solids.

"Formation" refers to a subsurface region including an aggregation of subsurface sedimentary, metamorphic and/or igneous matter, whether consolidated or unconsolidated, and other subsurface matter, whether in a solid, semi-solid, liquid and/or gaseous state, related to the geological development of the subsurface region. A formation can be a body of geologic strata of predominantly one type of rock or a combination of types of rock, or a fraction of strata having substantially common sets of characteristics. A formation can contain one or more hydrocarbon-bearing intervals, generally referred to as "reservoirs." Note that the terms "formation," "reservoir," and "interval" may be used interchangeably, but may generally be used to denote progressively smaller subsurface regions, stages, or volumes. More specifically, a "formation" may generally be the largest subsurface region, while a "reservoir" may generally be a hydrocarbon-bearing stage or interval within the geologic formation that includes a relatively high percentage of oil and gas. Moreover, an "interval" may generally be a sub-region or portion of a reservoir. In some cases, a hydrocarbon-bearing stage, or reservoir, may be separated from other hydrocarbon-bearing stages by stages of lower permeability, such as mudstones, shales, or shale-like (i.e., highly-compacted) sands.

The use of the noun "fracture" refers to a crack or surface of breakage induced by an applied pressure or stress within a subsurface formation. Moreover, the use of the noun "fracture network" refers to a group of closely-spaced, substantially-parallel fracture planes corresponding to a particular perforation cluster within a particular stage of a multi-stage hydrocarbon well.

The use of the verb "fracture" means to perform a stimulation treatment, such as a hydraulic fracturing treatment, which is routine for hydrocarbon wells in low-permeability reservoirs. Specially-engineered fracturing fluids are pumped at high pressures and rates into the reservoir interval to be treated, causing fractures to open. The wings of the fractures extend away from the wellbore in opposing directions according to the natural stresses within the formation. The characteristics of different fractures and fracture networks have a significant impact on a reservoir's production capability.

The term "fracturing fluid" refers to a fluid injected into a hydrocarbon well as part of a stimulation operation. A commonly-used fracturing fluid is "slickwater." Slickwater is mostly water with a small amount, i.e., around 1%, of friction reducers and other viscous fluids (usually shear thinning, non-Newtonian gels or emulsions). The friction reducers and viscous fluids allow for a faster pumping rate into a reservoir, leading to an increase in the numbers and sizes of the fractures formed.

The term "hydraulic fracturing" refers to a process for creating fractures that extend from a wellbore into a reservoir, so as to stimulate the flow of hydrocarbon fluids from the reservoir into the wellbore. A fracturing fluid is generally injected into the reservoir with sufficient pressure to create and extend multiple fractures within the reservoir, and a proppant material is used to "prop" or hold open the fractures after the hydraulic pressure used to generate the fractures has been released.

A "hydrocarbon" is an organic compound that primarily includes the elements hydrogen and carbon, although nitrogen, sulfur, oxygen, metals, or any number of other elements may be present in small amounts. As used herein, the term "hydrocarbon" generally refers to components found in natural gas, oil, or chemical processing facilities. Moreover, the term "hydrocarbon" may refer to components found in raw natural gas, such as $CH_4$, $C_2H_6$, $C_3$ isomers, $C_4$ isomers, benzene, and the like.

The term "pressure" refers to dynamic pressure within the fluid, as opposed to static or absolute pressure, unless otherwise noted. The absolute pressure is the total, instantaneous pressure in the fluid, the combination of the static pressure, whose value does not vary over time, and the dynamic pressure, whose value does vary over time. The dynamic pressure variation over time may be characterized by a complex value, representing an amplitude and a phase shift, at a given frequency (in hertz) greater than zero. Such pressure values over a full range of frequencies can characterize the behavior of dynamic pressure. The static pressure, by contrast, is the real value (amplitude only) of pressure defined only at 0 Hz. In all instances unless otherwise stated, "pressure" refers to the dynamic pressure as represented by its complex-valued function of frequency, for frequencies greater than zero. As such, for all equations herein, unless a time-dependence is explicitly stated, e.g., by use of an argument t, it should be assumed that the equations represent some dynamic frequency-dependent quantities, e.g., pressure or reflection coefficients, expressed in the frequency-domain with argument $\omega$ or $f$, even if these arguments are not explicitly written.

According to embodiments described herein, the terms "pressure receiver," "receiver," "pressure transducer," and "pressure gauge" are used, sometimes interchangeably, to refer to devices used to measure pressure.

As used herein, the term "proppant" or "proppant material" refers to particles that are mixed with fracturing fluid to hold open fractures that are formed within a near-wellbore region of a reservoir using a hydraulic fracturing process. The size, shape, strength, and density of the proppant material have a significant impact on the hydraulic fracturing process. Currently, commercial proppant materials include natural proppants, such as natural sands, resin-coated natural sands, shell fragments, and the like, and artificial proppants, such as sintered bauxite and ceramics, resin-coated or metal-coated ceramics, carbon-based proppants, lightweight proppants, ultra-lightweight proppants, and the like.

The term "reflectivity" refers to the absolute magnitude of the potentially-complex-valued and frequency-dependent reflection coefficient. The reflection coefficient is related to a configuration of materials within a tube-wave's travel path that gives rise to a change in acoustic impedance along that path and, therefore, a change, or splitting, of the direction of the incident tube-wave energy.

As used herein, the term "surface" refers to the uppermost land surface of a land well, or the mud line of an offshore well, while the term "subsurface" (or "subterranean") generally refers to a geologic strata occurring below the earth's surface. Moreover, as used herein, "surface" and "subsurface" are relative terms. The fact that a particular piece of equipment is described as being on the surface does not necessarily mean it must be physically above the surface of the earth but, rather, describes only the relative placement of the surface and subsurface pieces of equipment. In that sense, the term "surface" may generally refer to any equipment that is located above the casing strings and other equipment that is located inside the wellbore. Moreover, according to embodiments described herein, the terms "downhole" and "subsurface" are sometimes used interchangeably, although the term "downhole" is generally used to refer specifically to the inside of the wellbore.

As used herein, the term "tube wave" refers to a pressure wave that travels through a wellbore parallel to the direction of the wellbore. The tube wave is initiated via a pressure fluctuation within the wellbore and propagates through the wellbore via a fluid column within the wellbore that acts as an acoustic waveguide for the tube wave. The properties of the tube wave correlate to dynamic pressures at different points within the wellbore. Moreover, different obstacles in the wellbore, such as pipe sections with different diameters, frac plugs, perforations, and fractures, are characterized by different "acoustic impedances" and serve as "reflectors" for the tube wave. Specifically, the acoustic impedance (Z) of a particular material is a product of the material's density ($\rho$) and acoustic velocity (V), and acoustic impedance variations between two materials have an effect on the acoustic transmission and reflection of the tube wave at the boundary of the two materials. Furthermore, differences in volumetric flow rate may result in partial reflection/transmission of tube waves due to, for example, changes in the cross-sectional area of the flow path, even where material and acoustic properties remain unchanged.

Like other types of waves, tube waves can be differentiated by their frequency, amplitude, wavelength, and speed of propagation. The wavelength of a particular wave is defined as the wave's speed of propagation divided by its frequency, where wavelength is measured in meters (m), speed of propagation is measured in meters per second (m/s), and frequency is measured in hertz (Hz). Moreover, the amplitude of a particular wave is the wave's maximum displacement from its rest position. When a wave is represented graphically, the wavelength may be identified by determining the distance between the successive peaks of the wave, and the amplitude may be identified by determining the distance between the wave's center line and its peak.

The term "substantially," when used in reference to a quantity or amount of a material, or a specific characteristic thereof, refers to an amount that is sufficient to provide an effect that the material or characteristic was intended to provide. The exact degree of deviation allowable may depend, in some cases, on the specific context.

The term "wellbore" refers to a borehole drilled into a subterranean formation. The borehole may include vertical, deviated, highly deviated, and/or horizontal sections. The term "wellbore" also includes the downhole equipment associated with the borehole, such as the casing strings, production tubing, gas lift valves, and other subsurface equipment. Relatedly, the term "hydrocarbon well" (or simply "well") includes the wellbore in addition to the wellhead and other associated surface equipment.

Certain embodiments and features are described herein using a set of numerical upper limits and a set of numerical lower limits. It should be appreciated that ranges from any lower limit to any upper limit are contemplated unless otherwise indicated. All numerical values are "about" or "approximately" the indicated value, and account for experimental errors and variations that would be expected by those skilled in the art.

Furthermore, concentrations, dimensions, amounts, and/or other numerical data that are presented in a range format are to be interpreted flexibly to include not only the numerical values explicitly recited as the limits of the range, but also all individual numerical values or sub-ranges encompassed within that range, as if each numerical value and sub-range were explicitly recited. For example, a disclosed numerical range of 1 to 200 should be interpreted to include, not only the explicitly-recited limits of 1 and 200, but also individual values, such as 2, 3, 4, 197, 198, 199, etc., as well as sub-ranges, such as 10 to 50, 20 to 100, etc.

As described above, the success of the hydraulic fracturing process has a direct impact on the amount of hydrocarbon fluids that may be recovered from the reservoir. Specifically, the numbers, sizes (e.g., lengths, heights, and/or aperture sizes), compliances, and locations of the fractures corresponding to the perforation clusters within each stage of the hydrocarbon well directly impact the amount of hydrocarbon fluids that are able to mobilize and flow into the hydrocarbon well. Ideally, each perforation cluster leads to one fracture, and the fracturing fluid is evenly distributed among the perforation clusters and corresponding fractures such that contact surfaces are uniform among the fractures. However, it has been estimated that only a fraction of the stages in a multi-stage well typically contribute to the ultimate production of hydrocarbon fluids from the reservoir. Moreover, while accurate fracture characterization is essential for enabling optimized well planning and efficient stimulation, reliable and accurate fracture characterization remains elusive. In particular, currently-available fracture diagnostic technologies involve a high degree of uncertainty with regard to the interpretation of the results. In addition, high costs associated with currently-available fracture diagnostic technologies often prevent their routine application.

One common fracture diagnostic technique involves using a downhole camera to measure the sizes of the perforation holes and then using such measurements to infer the estimated fluid volume within each perforation cluster. However, this technique does not provide real-time measurements and is expensive to deploy. In addition, the perforation hole sizes may not be accurately measured due to obstructions from surrounding debris.

Another fracture diagnostic technique involves injecting a radioactive tracer during the proppant-loading phase. After stimulation, a gamma-ray logging tool is then run into the wellbore and used to identify the tracer locations in the near-wellbore region. However, this technique cannot be used to identify the amount of proppant within each perforation cluster or to estimate the volume of fluid within each cluster since the gamma-ray logging tool has a limited penetration depth into the formation.

Other common fracture diagnostic techniques involve using optical-fiber-based measurements to infer the fluid flow volume from the wellbore into the formation during stimulation. Such optical-fiber-based measurement techniques include distributed temperature sensing (DTS) techniques, distributed acoustic sensing (DAS) techniques, and distributed strain sensing (DSS) techniques. However, such optical-fiber-based measurement techniques are local and close to the casing string and cannot be used to directly measure the size (e.g., height, length, and/or aperture) of the fractures. In addition, the resulting measurements depend on the quality of the cement surrounding the casing, as well as the formation geology. Furthermore, deployment of this technology increases the well cost and operational complexity of the hydraulic fracturing operation, which limits its scale-up to every well.

Another fracture diagnostic technique involves analyzing tube waves associated with water hammer signals at the end of a hydraulic fracturing process for a particular stage. Specifically, pumps being used to inject fracturing fluid into the stage at a high flow rate of around 90 bbl/min are gradually shut down over a 10-30 second time interval. This relatively abrupt change in well pressure generates a tube wave within the wellbore. However, such water hammer signals are often not very repeatable, as the frequency content depends on the rate at which the pumps are shut down. In general, there are no operator guidelines that standardize how fast to shut down the pumps. In addition, strong water hammer responses can potentially damage surface piping equipment, so operators usually seek to avoid their generation. Furthermore, such water hammer signals often do not have enough high-frequency energy remaining to be effective after traveling to the desired downhole location. Moreover, tube waves generated in this manner are limited in bandwidth, with typical frequency ranges of only a few hertz (Hz). Data collected from tube waves with such low frequencies exhibit high reflectivity at impedance boundaries between fractures and the wellhead (shielding later reflections), as well as limited spatial resolution, and, thus, do not provide highly accurate information regarding the fractures within the surrounding reservoir.

Another fracture diagnostic technique involves using hydraulic impedance testing to measure the fractures intersecting a wellbore. For this technique, a pressure pulse is introduced into the wellbore from the wellhead by the controlled closure and/or opening of a valve. The limitations of the opening/closure process (e.g., having a time frame that is on the order of hundreds of milliseconds and being limited to the same constraints of pressure spikes that are not damaging to wellhead equipment) lead to the generation of a low-frequency pressure wave, which is then reflected within the wellbore and measured at the surface. However, this technique treats all the fractures in each stage collectively as one effective fracture, a constraint imposed by the low frequency of the injected pressure pulse.

Another fracture diagnostic technique involves using electrical resistivity mapping or tomography (ERT) to measure the electrical resistivity or conductivity distribution within a formation and then using such measurements to produce images of the fluid-filled fracture networks within the formation. However, this technique suffers from limited spatial resolution, low measurement accuracy, and high deployment costs per well, impacting scalability.

Other fracture diagnostic techniques involve using numerical and analytical methods to characterize tube wave reflection from multiple fractures. Such methods model a fracture by considering the fracture apertures and the elasticity of the formation. It has been shown that the tube wave reflectivity is frequency-dependent, and the dependency is related to the reflector types. In particular, as tube wave frequency decreases, the reflectivity of the conductive fracture increases, while the reflectivity due to a change in borehole diameter decreases. The model has also shown that the reflectivity can be used to distinguish one fracture from multiple, closely-spaced fractures, under the condition that the fracture separation is comparable to the wavelength of the tube wave. For example, tube waves with frequencies of over 500 Hz may be used to detect multiple fractures that are spaced less than 10 feet apart, based on the "quarter wavelength resolution rule." Specifically, according to the quarter wavelength resolution rule, a tube wave can differentiate between two perforation clusters that are separated by a distance that is a quarter of the tube wave's wavelength. However, for these methods, tube wave attenuation along the wellbore is excluded, which limits the distance of a detectable fracture from the surface, especially at higher frequency bands (i.e., above around 500 Hz).

Sonic logging techniques have also been used for fracture diagnostic purposes. For such techniques, tube waves generated by a sonic logging tool are reflected at locations where fractures intersect the wellbore and are used to detect fractures and to estimate their effective apertures. An acoustic logging tool, which includes an acoustic source and an array of acoustic receivers, is run along a wellbore. The logging tool is then used to launch tube waves and to record the resulting tube wave reflections. As the logging tool approaches each fracture, the tube wave reflections are detected and used to characterize the aperture of the fracture. For such techniques, the tube wave frequency range is around 300 to 500 Hz. However, because such techniques utilize receivers inside the wellbore, the measurements are intrusive, and their use would be difficult to practice during hydraulic fracturing operations. In addition, due to its location within the wellbore, the logging tool introduces background noise into the tube wave reflections, complicating the signal interpretation. Therefore, to calculate the reflectivity of each fracture accurately, various signal processing methods are used to separate direct arrival waves from reflected waves, as well as to distinguish the background noise caused by the logging tool from the reflections of interest.

Tube wave reflection logging techniques, which are similar to tube wave sonic logging techniques, have also been used for fracture diagnostic purposes. Such techniques similarly rely on intrusive acoustic logging tools within the wellbore to take measurements. In addition, such techniques rely on both tube wave reflection and attenuation effects to characterize the overall fractured zone, not the individual fractures. Through such fractured zones, the tube waves, which typically have a frequency range of around 300 to 2,200 Hz, are attenuated and slowed down due to the fluid flow into and out of the fractures. However, this technique suffers from the same shortcomings of tube wave sonic logging techniques, including intrusiveness with respect to well completion operations and the introduction of background noise into the tube wave reflections as a result of the downhole deployment of the logging tool.

Several techniques have been developed to utilize low-frequency tube waves to characterize remotely-located fractures. As an example, one such fracture diagnostic technique is provided by U.S. Patent Application Publication No. 2019/0055836 A1, entitled "Method for Fracture Activity Monitoring and Pressure Wave Resonance Analysis for Estimating Geophysical Parameters of Hydraulic Fractures Using Fracture Waves." The technique described therein involves generating a tube wave within a hydrocarbon well using a pressure source, measuring the resulting pressure signal for a certain period of time, and then determining at least one physical parameter of the hydrocarbon well using the measured pressure signal. The pressure source may be generated in an intentional, controlled manner (referred to herein as an active source), such as through controlled shutdown of fracture treatment pumps, or it may be an uncontrolled source, where tube waves are generated through inadvertent pumping rate fluctuations or through microseismic events. However, such pressure sources generally produce limited-bandwidth, low-frequency pressure pulses. Thus, this technique is unable to provide detailed information regarding the fractures within the reservoir.

As another example, U.S. Patent Application Publication No. 2013/0079935 A1, entitled "Method of Real Time Diagnostic of Fracture Operations with Combination of Tube Waves and Microseismic Monitoring," provides another fracture diagnostic technique that involves generating tube waves in a wellbore, recording the tube wave reflections from the fractures in the wellbore, and analyzing the recorded data to determine fracture characteristics within the wellbore. However, the technique described therein relate to limited-bandwidth, low-frequency tube waves and, thus, is similarly limited in terms of reflectivity and spatial resolution.

As another example, another fracture diagnostic technique is provided by U.S. Patent Application Publication No. 2019/0136684 A1, entitled "Method for Evaluating and Monitoring Formation Fracture Treatment Closure Rates and Pressures Using Fluid Pressure Waves." The fracture diagnostic technique described therein involves using an active acoustic source and a pressure gauge at the wellhead to probe subsurface fracture properties, such as the fracture conductivity. This technique utilizes pressure waves with low frequencies, i.e., below 10 Hz, and long wavelengths, i.e., around 150 meters. The use of pressure waves with such low frequencies and long wavelengths results in a low spatial resolution and, thus, an inability to differentiate fractures that are less than around 100 meters apart. As a result, this technique also fails to provide detailed information regarding the individual fractures corresponding to the perforation clusters in each stage within the reservoir.

As another example, U.S. Pat. No. 10,641,090 B2, entitled "Method for Evaluating and Monitoring Formation Fracture Treatment Using Fluid Pressure Waves," provides a fracture diagnostic technique that utilizes pressure and pressure time derivatives to infer subsurface fracture properties, such as the fracture width, height, conductivity, and drainage volume. The tube wave reflection time, phase, and amplitude are used to extract information related to the fracture properties and/or the changes in the fracture properties over time. More specifically, for this technique, a geomechanical fracture model is used. Closely-spaced fractures are assumed to be effectively identical, and the elastic interactions among fractures are neglected. However, the utilized tube wave frequencies are subsonic (e.g., less than 20 Hz). Therefore, based on the quarter wavelength resolution rule, this technique can only be used to identify and characterize fractures that are more than 60 feet apart.

As another example, U.S. Patent Application Publication No. 2018/0094521 A1, entitled "Method for Evaluating and Monitoring Formation Fracture Treatment Using Fluid Pressure Waves," provides a fracture diagnostic technique that involves evaluating and monitoring formation fracture treatment using fluid pressure waves. For this technique, a linear array of sensors is deployed into the wellbore to generate and record tube waves. An initial, baseline measurement is acquired as a reference to compare with consecutive recordings over time. Parameters, such as pressure wave amplitude, phase, energy content, frequency, and/or time shift, are used to characterize the changes between the baseline reference and consecutive recordings. These measurable changes are used to infer the changes in the fracture network, e.g., changes in the effective volume, fracture length, permeability, fracture extent, fracture density, fracture surface area, and the like. However, this technique can only be used to monitor a wellbore with a relatively limited depth range without significantly impacting the spatial resolution for resolving the features of the fracture network.

As another example, a fracture diagnostic technique is provided by U.S. Patent Application Publication No. 2019/0310386 A1, entitled "Fracture Wave Depth, Borehole Bottom Condition, and Conductivity Estimation Method." According to the technique provided therein, surface-launched pressure waves and the resulting reflected pressure and pressure time derivatives are used to infer subsurface fracture properties, such as fracture wave depth, borehole bottom condition, and conductivity. As described therein, "fracture wave depth" is a measurement of one effective fracture depth in each stage after fracturing. It is based on the fact that the tube wave velocity becomes lower once the borehole section is connected with fractures. A fracture depth is estimated using the difference between the estimated tube wave velocity in the intermediate casing string and the estimated tube wave velocity in the production casing string. The estimated tube wave velocities at different sections of the borehole are calculated based on the known reflector locations and the first arriving times of tube wave reflections. As also described therein, "borehole bottom condition" is defined as the condition at the end of the fluid column for a stage. A borehole bottom condition is evaluated based on the polarity and magnitude of tube wave reflections at the bottom boundary. In addition, fracture conductivity in each stage is inferred using the overall reflectivity from that stage based on a reflectivity (diffusion) model. This reflectivity model can also be used to further estimate the number of fractures, assuming that all fractures are identical. Based on further assumptions among all stages, including homogeneity of geology, same perforation quality and flush of the borehole with clean fluid, stimulated cluster volumes can be quantified and compared. This comparison is done stage-by-stage.

To determine fracture conductivity from the reflected tube wave, inversion methodologies and workflow are provided therein. Time domain full waveform inversion on tube wave traces is used to estimate frequency-dependent fracture hydraulic impedance. The frequency domain resonance frequency/quality factor (Q) of the tube wave response are fitted into a coupled two-layer borehole-fracture model using a genetic algorithm global minimization-based inversion approach. The inversions are intended to obtain five parameters: fracture conductivity, upper part borehole Q factor, lower part borehole Q factor, upper part borehole wave velocity, and lower part borehole wave velocity.

According to the technique provided therein, pressure wave decay rate is also used to infer the fracture conductivity. After pumping hydraulic fracturing fluid, an effective conductivity of at least one fracture in a stage is determined based on the rate of pressure decay. It is assumed that the pressure decay is controlled by the borehole storage and the viscous flow of fluid following Darcy's law in a fracture network, which originates from the perforation clusters and penetrates the formation radially as fractures form.

For this technique, passive acoustic background noise, which is generated during the fracturing operation, is also used. The frequency analysis of the passive acoustic background noise shows the resonant frequencies and changes in the resonant frequencies over time. This information is then used to characterize the fracture network growth and borehole condition changes. However, the resonant frequency range is less than 2 Hz in all the described embodiments.

As demonstrated by the range of currently-available fracture diagnostic techniques described above, it is generally recognized that, when several perforation clusters are being simultaneously fractured in a common fracturing operation, often the fracturing fluid treatment materials are not evenly dispersed among the available perforation clusters. It is observed that sometimes some perforation clusters receive an excess of the fracturing fluid, or perhaps a vast majority of the fracturing fluid, while other perforation clusters undesirably do not. This issue may be highly detrimental to overall commercial potential, resulting in sub-optimal stimulation of the subsurface formation and decreased productivity in the long run. Therefore, there exists a need for accurate, reliable, and cost-effective techniques for characterizing individual clusters during hydraulic fracturing operations, particularly for multi-stage, unconventional wells.

Accordingly, embodiments described herein provide a means to measure and characterize individual fracture cluster reflections, from which interpretations of stage-based cluster efficiency can be made. The measurement techniques utilize tube waves with a range of frequency content that can directly measure and characterize individual perforation clusters and corresponding fractures on a stage-by-stage basis. Specifically, according to embodiments described herein, a broadband tube wave is launched using a pressure pulse generator, and the tube wave's reflections are detected at the surface using a number of pressure receivers that are arranged into arrays, as described further herein. The recorded data are then processed using interferometric techniques to distinguish data that are of interest (i.e., data relating to the fracture clusters) from data that are not of interest (e.g., data relating to other reflection points within the wellbore and topside infrastructure). Some portion of the frequency spectra of the reflectivity (or hydraulic conductivity) at each perforation cluster/fracture junction (or interface) are then determined using a robust full waveform inversion method, and the portion of reflectivity (or hydraulic conductivity) spectra at each perforation cluster/fracture junction (or interface) are processed (e.g., normalized) and interpreted as a surrogate measurement of the cluster efficiency. The number of perforation clusters/fractures connected to the wellbore may then be inferred from the number of relevant reflection events of the pulsed tube wave, and the locations of the perforation clusters/fractures along the wellbore may be calculated using the time of flight (TOF) of each reflection event and the calibrated in situ wave-speed or theoretical expectations of the speed of tube waves in water.

Embodiments described herein utilize low-attenuation, broadband tube waves extending to high frequencies. The frequencies of the tube waves are selected such that the resulting signals can effectively resolve the features of interest (e.g., the cluster spacing) and the tube waves can be generated at sufficient amplitude from the surface to be detectable after traveling round-trip through the wellbore. In various embodiments, such frequencies may be between around 10 Hz and around 500 Hz, although the frequency range may vary based on the details of each implementation. For example, with a pressure pulse generator that can generate sufficiently high power relative to the ambient noise at both the high and low end of the frequency spectrum, the usable tube-wave frequency range may be extended from 5 to 4,000 Hz. Additionally or alternatively, if the round-trip distance through the wellbore is shorter than the typical dimensions assumed here, such that the cumulative attenuation is less, the usable tube-wave frequency range may also be extended from 5 to 4,000 Hz. This, in turn, allows for remote cluster efficiency measurement from the surface and provides a high spatial resolution that enables the individual identification of multiple perforation clusters in each stage. Accordingly, embodiments described herein provide cost-effective, minimally-intrusive techniques for characterizing fractures at a cluster level in each stage and comparing cluster efficiency on a stage-by-stage basis. Such techniques may be used to analyze the connection between a wellbore and a reservoir, either in real-time pre-stimulation, during stimulation, or post-stimulation.

Exemplary Hydrocarbon Wells Utilizing Cluster Efficiency Measurement Equipment in Conjunction with Hydraulic Fracturing Operations FIG. 1A is a schematic view of an exemplary hydrocarbon well 100 including cluster efficiency measurement equipment that may be used in conjunction with a hydraulic fracturing process. The hydrocarbon well 100 defines a wellbore 102 that extends from a surface 104 into a formation 106 within the subsurface. The formation 106 may include several subsurface intervals, such as a hydrocarbon-bearing interval that is referred to herein as a reservoir 108. In some embodiments, the reservoir 108 is an unconventional, tight reservoir, meaning that it has regions of low permeability. For example, the reservoir 108 may include tight sandstone, tight carbonate, shale gas, coal bed methane, tight oil, and/or tight limestone.

The wellbore 102 is completed by setting a series of tubulars into the formation 106. These tubulars include several strings of casing, such as a surface casing string 110, an intermediate casing string 112, and a production casing string 114, which is sometimes referred to as a "production liner." In some embodiments, additional intermediate casing strings (not shown) are also included to provide support for the walls of the wellbore 102. According to the embodiment shown in FIG. 1A, the surface casing string 110 and the intermediate casing string 112 are hung from the surface 104, while the production casing string 114 is hung from the bottom of the intermediate casing string 112 using a liner hanger 116.

The surface casing string 110 and the intermediate casing string 112 are set in place using cement 118. The cement 118 isolates the intervals of the formation 106 from the wellbore 102 and each other. The production casing string 114 may also be set in place using cement 118, as shown in FIG. 1A. Alternatively, the wellbore 102 may be set as an open-hole completion, meaning that the production casing string 114 is not set in place using cement.

The exemplary wellbore 102 shown in FIG. 1A is completed horizontally (or laterally). A lateral section is shown at 120. The lateral section 120 has a heel 122 and a toe 124 that extends through the reservoir 108 within the formation 106. In some embodiments, the distance between the heel 122 and the toe 124 is over 1,000 feet, in which case the hydrocarbon well 100 may be referred to as an extended-reach lateral well. In other embodiments, the distance between the heel 122 and the toe 124 is over 10,000 feet, in which case the hydrocarbon well 100 may be referred to as an ultra-extended-reach lateral well.

In various embodiments, because the reservoir 108 is an unconventional, tight reservoir, a hydraulic fracturing process may be performed to allow hydrocarbon fluids to be economically produced from the hydrocarbon well 100. As shown in FIG. 1A, the hydraulic fracturing process may utilize an extensive amount of equipment at a well site 126 located on the surface 104. The equipment may include fluid storage tanks 128 to hold fracturing fluid, such as slickwater, and blenders 130 to blend the fracturing fluid with other materials, such as proppant 132 and other chemical additives, forming a low-pressure slurry. The low-pressure slurry 134 may be run through a treater manifold 136, which may use pumps 138 to adjust flow rates, pressures, and the like, creating a high-pressure slurry 140, which can be pumped down the wellbore 102 via a wellhead 142 and used to fracture the rocks in the reservoir 108. Moreover, a mobile command center 144 may be used to control the hydraulic fracturing process, as well as the cluster efficiency measurement techniques described herein.

The wellhead 142 may include any arrangement of pipes and valves for controlling the hydrocarbon well 100. In some embodiments, the wellhead 142 is a so-called "Christmas tree." A Christmas tree is typically used when the subsurface formation 106 has enough in-situ pressure to drive hydrocarbon fluids from the reservoir 108, up the wellbore 102, and to the surface 104. The illustrative wellhead 142 includes a top valve 146 and a bottom valve 148. In some contexts, these valves are referred to as "master valves." Moreover, in various embodiments, the wellhead 142 also couples the hydrocarbon well 100 to other equipment, such as equipment for running a wireline (not shown) into the wellbore 102. In some embodiments, the equipment for running the wireline into the wellbore 102 includes a lubricator (not shown), which may extend as much as 75 feet above the wellhead 142. In this respect, the lubricator must be of a length greater than the length of a bottomhole assembly (BHA) (not shown) attached to the wireline to ensure that the BHA may be safely deployed into the wellbore 102 and then removed from the wellbore 102 under pressure.

While there are several different methods for hydraulically fracturing a reservoir, a hydraulic fracturing process referred to as a "plug-and-perforation process" is described with respect to FIG. 1A. During the plug-and-perforation process, a specialized BHA, referred to as a "plug-and-perf assembly," (not shown) is run into the wellbore 102 via the wireline connected to the wellhead 142. The wireline provides electrical signals to the surface 104 for depth control. In addition, the wireline provides electrical signals to perforating guns (not shown) included within the plug-and-perf assembly. The electrical signals may allow the operator within the mobile command center 144 to cause the charges within the perforating gun to fire, or detonate, at a desired stage or depth within the wellbore 102.

In operation, the perforating gun is run into a first stage 150A of the hydrocarbon well 100 located near the toe 124 of the lateral section 120. The perforating gun is then detonated to create a first perforation cluster 152A through the production casing string 114 and the surrounding cement 118. In operation, the perforating gun typically forms one perforation cluster by shooting 12 to 18 perforations at one time, over a 1- to 3-foot region, with each perforation being approximately 0.3 to 0.5 inches in diameter. The perforating gun is then typically moved uphole 10 to 100 feet, and a second perforating gun is used to form a second perforation cluster. This process of forming perforation clusters is repeated another 1 to 18 times to create several perforation clusters within a single stage. Therefore, while only one perforation cluster is shown for each stage 150A-E in FIG. 1A, each stage of the hydrocarbon well 100 may include a total of around 3 to 20 perforation clusters, with each perforation cluster being spaced around 10 to 100 feet apart.

The plug-and-perf assembly is then removed from the wellbore 102, and the high-pressure slurry 140 of fracturing fluid is pumped down the wellbore 102, through the perforations within the perforation clusters (e.g., the first perforation cluster 152A and any number of additional perforation clusters) within the first stage 150A, and into the surrounding reservoir 108, forming a first set of fractures (e.g., the first fracture 154A corresponding to the first perforation cluster 152A and fractures corresponding to each of the additional perforation clusters) within the reservoir 108. Moreover, the proppant 132 in the high-pressure slurry 140 serves to hold the fractures open after the hydraulic pressures are released.

The plug-and-perf assembly is then lowered back into the hydrocarbon well 100 and used to enable hydraulically fracturing of the second stage 150B of the hydrocarbon well 100. This involves using the plug-and-perf assembly to set a first frac plug 156A within the production casing string 114 to isolate the first stage 150A of the hydrocarbon well 100 from the second stage 150B of the hydrocarbon well 100. Specifically, a setting tool (not shown) within the plug-and-perf assembly is used to set the first frac plug 156A against the inner diameter of the production casing string 114 upstream of the first set of perforation clusters 152A. Moreover, during the setting process, the force generated by the setting tool causes the setting tool to shear off the first frac plug 156A, leaving the first frac plug 156A set within the hydrocarbon well 100.

Once the first frac plug 156A has been set within the production casing string 114, the perforating gun is detonated to create the second perforation cluster 152B (and any number of additional perforation clusters) within a second stage 150B of the hydrocarbon well 100. The plug-and-perf assembly is then removed from the wellbore 102, and the high-pressure slurry 140 of fracturing fluid is pumped down the wellbore 102, through the perforation clusters (e.g., the second perforation cluster 152B and the additional perforation clusters) within the second stage 150B, and into the surrounding reservoir 108, forming a second set of fractures (e.g., the second fracture 154B corresponding to the second perforation cluster 152B and fractures corresponding to each of the additional perforation clusters) within the reservoir 108.

In various embodiments, this plug-and-perforation process is used to perforate and fracture every stage within the wellbore 102. For example, according to the embodiment shown in FIG. 1A, the plug-and-perforation process is used to create a third perforation cluster 152C (and any number of additional perforation clusters) and a third fracture 154C corresponding to the third perforation cluster 152C (and fractures corresponding to each of the additional perforation clusters) within a third stage 150C of the hydrocarbon well 100, a fourth perforation cluster 152D (and any number of additional perforation clusters) and a fourth fracture 154D corresponding to the fourth perforation cluster 152D (and fractures corresponding to each of the additional perforation clusters) within a fourth stage 150D of the hydrocarbon well 100, and a fifth perforation cluster 152E (and any number of additional perforation clusters) and a fifth fracture 154E corresponding to the fifth perforation cluster 152D (and fractures corresponding to each of the additional perforation clusters) within a fifth stage 150E of the hydrocarbon well 100. Moreover, while only five stages 150A-E are shown in FIG. 1A, it is to be understood that a typical extended-reach lateral well may include around 20-50 stages, and some ultra-extended-reach lateral wells may include more than 100 stages. Furthermore, while a single perforation cluster 152A-E and a single corresponding fracture 154A-E are shown for each stage 150A-E in FIG. 1A, each stage 150A-E may include a total of around 3-20 perforation clusters and, ideally, a single fracture corresponding to each perforation cluster.

During the hydraulic fracturing process, the injection rate of the high-pressure slurry 140 may be increased until it reaches a maximum injection rate of around 20-150 barrels per minute (bbl/min). In operation, approximately 5,000 to 15,000 barrels of the high-pressure slurry 140 may be injected during the hydraulic fracturing of each stage 150A-E.

Because the fractures 154A-E within the near-wellbore region of the reservoir 108 provide the flow channels for the extraction of hydrocarbon fluids from the reservoir 108, the success of the hydraulic fracturing process has a direct impact on the amount of hydrocarbon fluids that may be recovered from the reservoir 108. Specifically, the numbers, sizes, compliances, and locations of the fractures 154A-E corresponding to the perforation clusters 152A-E directly impact the amount of hydrocarbon fluids that are able to mobilize and flow into the hydrocarbon well 100. As a result, accurate fracture characterization is essential for enabling optimized well planning and efficient stimulation of the wellbore.

Moreover, because multiple perforation clusters (e.g., perforation clusters 152A-E) are stimulated simultaneously to create multiple fractures (e.g., fractures 154A-E) within each stage (e.g., stages 150A-E) of the hydrocarbon well 100, it can be difficult to control how much fracturing fluid and proppant exits each perforation cluster and, thus, how large each resulting fracture becomes, in part because the rock properties, local rock stresses, cement quality, and other factors vary with well length. In fact, fractures frequently do not even initiate at some perforation clusters due to the rock surrounding those perforation clusters having different geomechanical properties than the rock surrounding the other perforation clusters in the same stage. It is generally believed that each fracture within a stage should be created with the same geometry and quality in order to maximize well production with a given well spacing. Therefore, a stage is considered to be inefficient (or, in other words, to have low "cluster efficiency") when it includes fractures of different sizes, or when there is an absence of one or more intended fractures. This inefficiency may be addressed in part by changing the perforation design, such as by reducing the total number of perforations in a stage (referred to as "limited entry"), varying the number of perforations across a stage, or plugging perforations during the treatment (referred to as "intra-stage diversion"). Upfront knowledge of the rock properties within a stage can also be utilized to attempt to design the optimal number of perforations within each perforation cluster such that even fracture lengths are created within each stage. Moreover, measurements relating to the number and quality of the fractures formed within each stage are very useful for evaluating and adjusting the perforation and/or diversion strategy to optimize the fracture geometries within each stage.

Furthermore, the pumping strategy (e.g., the flow rate, type of fluid, and/or total volume of fluid pumped for each stage) may be modified in real time to achieve a desired fracture size. For example, the total fluid volume for each stage is typically set, at least in part, on the assumption that N fracture clusters will all break down to ultimately produce N fractures in the stage, and the desired sizes (e.g., lengths) of the fractures are dictated by well spacing (e.g., to prevent the fractures from intersecting neighboring wells). If measurements can determine the number of growing fracture clusters early in the stage, here denoted by M, and it is found that M<N, then pumping the full volume of fluid may result in longer fractures than intended. Accordingly, the total fluid volume may be modulated by a factor of $(N-M)/N$ to compensate. Alternatively, a decision to utilize chemical diverters may be made to attempt to induce the breakdown of clusters that are detected to be closed according to the techniques described herein.

Therefore, according to embodiments described herein, one or more pressure pulse generators 158 and two or more pressure receivers 160 are used to collect data relating to wellbore characteristics, such as, in particular, data relating to the cluster efficiency of each perforation cluster/fracture interface within each stage (as well as, optionally, within each stage considered as a whole). More specifically, the pressure pulse generator 158 is configured to generate broadband tube waves 162 with high-frequency components within the wellbore 102, while the pressure receivers 160 are configured to record data relating to the generated broadband tube waves 162 and a time-delayed series of reflected broadband tube waves 164 returning from the wellbore 102. The data may then be used to analyze various wellbore characteristics. For example, the data may be used to analyze the number of perforation clusters for which fractures have formed within a particular stage of the hydrocarbon well 100, the sizes of the fractures corresponding to the perforation clusters for which fractures have formed, the locations of the perforation clusters for which fractures have formed, and/or the number of perforation clusters that have been stimulated to at least a threshold level as measured by the characteristics of the fractures corresponding to the perforation clusters within the particular stage. Moreover, in some embodiments, the determination of whether a particular perforation cluster has been stimulated to at least a threshold level may be made, at least in part, based on the growth or erosion of the perforations and, thus, the sizes of the resulting fracture entrances.

According to the embodiment shown in FIG. 1A, the pressure pulse generator 158 and the pressure receivers 160 are hydraulically coupled to the wellbore 102 via direct connection with the wellhead 142. However, the pressure pulse generator 158 and/or the pressure receivers 160 may be hydraulically coupled to the wellbore 102 in any suitable manner. Moreover, while both the pressure pulse generator 158 and the pressure receivers 160 are depicted as single units in FIG. 1A, the pressure pulse generator 158 and/or the pressure receivers 160 may optionally include multiple units that are connected to the wellhead 142 in different locations.

According to embodiments described herein, the pressure pulse generator 158 is a highly-controllable, highly-repeatable acoustic source that is configured to generate the broadband tube waves 162 within the wellbore 102. The high controllability of the pressure pulse generator 158 ensures that tube waves including a selected waveform containing a specific bandwidth of high- and/or low-frequency components can be generated within the wellbore 102. Moreover, the high repeatability of the pressure pulse generator 158 ensures that the tube waves can be generated in the same manner multiple times. This is essential for ensuring the accuracy of the collected data during the hydraulic fracturing process for each individual stage, as well as ensuring that the collected data can be used to compare the results of the hydraulic fracturing process for different stages and/or to compare results from different time windows during the pumping of fluid within a single stage.

In some embodiments, the pressure pulse generator 158 is configured to generate multiple discrete broadband tube waves 162 with waveforms containing narrow frequency components to cover a broad frequency band. Specifically, to prevent interference between the generated and reflected broadband tube waves 162 and 164, the pressure pulse generator 158 may generate a series of individual broadband tube waves 162 within the wellbore 102. Each individual broadband tube wave 162 may include a frequency range that is a predetermined increment of the specific bandwidth of high- and/or low-frequency components. For example, if the broadband tube waves 162 are generated in approximately 50-Hz increments for a specific bandwidth of 10-500 Hz, the first broadband tube wave may be a selected waveform including a frequency range of 10-50 Hz, the second broadband tube wave may be a selected waveform including a frequency range of 50-100 Hz, the third broadband tube wave may be a selected waveform including a frequency range of 100-150 Hz, the fourth broadband tube wave may be a selected waveform including a frequency range of 150-200 Hz, and so on, until reaching the final broadband tube wave, which may be a selected waveform including a frequency range of 450-500 Hz. In addition, each broadband tube wave 162 may be generated at a different time slot, with the time interval between each time slot being long enough to allow the previous broadband tube wave to fully attenuate and, thus, prevent interference between the generated and reflected broadband tube waves 162 and 164. The time interval between each time slot may be, for example, around 1 minute, depending on the details of the specific implementation.

The pressure pulse generator 158 may include one or more high-speed valves attached to the wellhead 142. In some embodiments, the wellbore 102 is first pressurized to a predetermined pressure level, and the pressure pulse generator 158 then generates the broadband tube waves 162 by partially depressurizing the wellbore 102. Specifically, the one or more high-speed valves may open, allowing a portion of the fracturing fluid (or other fluid) within the wellbore 102 to bleed off to open air or to a storage container, such as the storage container 166 shown in FIG. 1A, and then quickly close with the aid of one or more corresponding high-speed actuators. In other embodiments, the pressure pulse generator 158 generates the broadband tube waves 162 by increasing the pressure within the wellbore 102. Specifically, the one or more high-speed valves may be used to inject fracturing fluid, or any other suitable type of fluid, from the pressurized storage container 166 into the wellbore 102 in a controlled manner.

Moreover, while embodiments described herein primarily relate to the use of one or more high-speed valves for the pressure pulse generator 158, it is to be understood that the pressure pulse generator 158 may also include any other suitable device or system that is capable of generating controllable, repeatable broadband tube waves 162 within the wellbore 102. For example, in some embodiments, the pressure pulse generator 158 includes one or more rupture disks that are configured to fail, or rupture, in response to the wellbore 102 being pressurized to the predetermined pressure level or in response to being physically triggered to fail via a command from the operator of the mobile command center 144, for example. Failure of the one or more rupture disks causes a short, rapid pressure pulse within the wellbore 102 that is controlled via the quick closure of one or more valves located proximate to the one or more rupture disks, thus generating the desired broadband tube waves 162. Moreover, in such embodiments, the entire pressure pulse generator 158 may be designed to be easily detached from the wellhead 142 so that the one or more rupture disks may be replaced for the next iteration of the cluster efficiency measurement process.

As another example, in some embodiments, the pressure pulse generator 158 includes a fast-acting valve that is connected to the wellbore 102 via a short pipe that is empty or at low pressure. When the valve is opened, pressurized fluid from the wellbore 102 rushes into the short pipe. This fluid bleed-off initiates a wave that oscillates between the entrance and the tip of the short pipe until pressure equilibrium is reached. The oscillation frequency is determined by the length of the pipe and the sound speed within the fluid inside the pipe. This oscillating wave can act as the broadband tube wave 162 traveling down the wellbore 102.

As another example, in some embodiments, the pressure pulse generator 158 includes a piezoelectric crystal-based source, which is essentially an accelerometer, that is capable of generating tube waves with a selected waveform containing narrow frequency components. This type of pressure pulse generator may be easier to control than other types of pressure pulse generators described herein. More specifically, it may be easier to control the specific waveform of the generated tube waves using this type of pressure pulse generator. In various embodiments, the broadband tube waves generated by the piezoelectric crystal-based source are Hanning windowed-sinusoidal waveforms with narrow frequency components. Generating multiple tube waves with narrow frequency components helps to prevent distortion of the waveform due to frequency-dependent attenuation and dispersion.

Furthermore, as another example, in some embodiments, the pressure pulse generator 158 includes an explosive shock pulse generator. This class of pressure sources relies on small explosive charges, such as, for example, blank cartridges, detonation chords, pellets, and powders. During operation, the chemical energy stored in the explosive is released in a detonation wave which, depending on the choice of explosive, can have detonation velocities ranging from around 150 m/s to around 10,000 m/s. Most commercial mining explosives have supersonic detonation velocities ranging from around 1800 m/s to around 8000 m/s. Low explosives have detonation velocities that are subsonic and burn at a rate of around 150 m/s to around 650 m/s. Examples of low explosives are black powder and smokeless gunpowder. When an explosive charge is detonated, the immediate result is a very high near-field pressure that rises roughly in the form of an exponential spike. The shape and, hence, the frequency content of the spike is determined by the amount of charge, the detonation velocity, and whether the explosive charge is shaped in any manner.

In such embodiments, the explosive shock pulse generator may be located in a relatively small-volume cavity or pipe that is connected by a valve to the wellbore 102. The valve may be a gate valve that is open to the wellbore 102 when the explosive charge is fired. In this embodiment, the explosive charge is designed so that the pressure field transmitted through the open valve directly excites broadband tube waves including a selected waveform with a specific bandwidth of high- and/or low-frequency components. Frequency content is controlled by the dimensions of the valve cavity and the pipe, the type and amount of explosive used, and the shape of the explosive charge. In some embodiments, the explosive charge includes low explosive material.

Furthermore, in such embodiments, the explosive shock pulse generator is designed such that the explosive can be changed out. For example, the small-volume cavity or pipe may be connected to another valve or a removable flange through which the explosive can be loaded. Another way of changing out the charge would be a mechanical load lock assembly such as that found in many firearms. In addition, in some embodiments, the explosive shock pulse generator is designed such that the explosive may be fired either electronically or mechanically.

In another embodiment, the explosive shock pulse generator has all of the features of the previous embodiment but employs a larger-volume cavity or pipe that is connected by a valve to the wellbore 102. In this embodiment, the resonance of the cavity modulates the frequency content of the pressure pulse delivered to the wellbore 102, where the term "resonance" is taken to mean that the roundtrip time from end to end of the cavity or pipe can be used to generate a pressure envelope. If the pressure pulse from the detonation wave is short enough, the envelope consists of a series of individual pressure spikes from transit time back and forth (i.e., from end to end) of the cavity or pipe. By designing or controlling the length of the roundtrip time, the frequency content of the envelope can be adjusted.

In another embodiment, the pressure pulse generator 158 includes a floating piston that is driven by an explosive detonation. The explosive charge used for the detonation may be as described above with respect to explosive shock pulse generators. Moreover, in another embodiment, the pressure pulse generator 158 consists of a hydraulic power supply that provides power and signal to an acoustic source.

According to embodiments described herein, each pressure receiver 160 is a highly-sensitive, highly-controllable pressure receiver that is capable of recording direct, high-frequency pressure pulses, i.e., the generated broadband tube waves 162 and the reflected broadband tube waves 164. The recording duration may be at least 30 seconds, at least 1 minute, at least 5 minutes, or at least 10 minutes, for example, depending on the length of the wellbore 102 and the depth of the stage 150A-E of interest. In addition, in various embodiments, each pressure receiver 160 takes many repeat recordings in succession to improve the signal-to-noise ratios for subsequent processing steps. The high sensitivity of each pressure receiver 160 allows for precise recording of pressure pulses including selected waveforms containing specific bandwidths of high-frequency components.

According to the embodiment shown in FIG. 1A, the pressure pulse generator 158 and the pressure receivers 160 are being used to determine the cluster efficiency for the fifth, and final, stage 150E of the hydrocarbon well 100. However, it is to be understood that the pressure pulse generator 158 and the pressure receivers 160 may be used to determine the cluster efficiency for each stage 150A-E of the hydrocarbon well 100 as the hydraulic fracturing process progresses.

As described above, the hydraulic fracturing process involves injecting the high-pressure slurry 140 at an injection rate of around 20-150 bbl/min to create the fractures within the different stages 150A-E of the hydrocarbon well 100. However, during the hydraulic fracturing process, there are many times when the wellbore 102 is filled with a column of pressurized fracturing fluid, or slickwater, that is static (or near static), free of suspended solids, and can be used as a low-attenuation acoustic waveguide for propagating broadband tube waves. This may occur immediately after a particular stage 150A-E has been fractured and/or immediately before a corresponding frac plug 156A-D has been set, for example. In various embodiments, the cluster efficiency measurement techniques described herein are performed when the fluid column within the wellbore 102 is pressurized and flowing at a rate of less than 10 bbl/min, less 5 bbl/min, less than 1 bbl/min, or, most preferably, when the fluid column is static. The acoustic waveguide properties of the fluid within the wellbore 102 are ideal during this time. This is, at least in part, due to the fact that the broadband tube waves 162 will suffer less attenuation and have similar reflectivities that can be easily cross-compared when the fluid column within the wellbore 102 is static (or near static). The broadband tube waves 162 will also suffer less attenuation when the fluid column within the wellbore 102 is free of suspended solid material (e.g., the proppant slurry). Under these conditions, the broadband tube waves 162 generated by the pressure pulse generator 158 easily propagate inside the fluid column within the wellbore 102. The broadband tube waves 162 are then reflected at various interfaces within the wellbore 102 that include acoustic impedance mismatches, or boundaries. According to the embodiment shown in FIG. 1A, the reflection points, or reflectors, of interest are the perforation cluster/fracture interfaces, which are the interfaces between the wellbore 102 and the entry point for each fracture within the corresponding stages 150A-E of the hydrocarbon well 100. However, embodiments described herein may also be used to analyze other wellbore characteristics, since acoustic impedance boundaries arise from changes in cross-sectional area within the wellbore 102 and/or changes in the acoustic wave speed of the broadband tube waves 162 propagating through the wellbore 102. As a result, the casing joints, liner hangers, valves, plugs, sand bridges, and structural variations within the wellbore 102 (e.g., washouts) all act as reflectors for the broadband tube waves 162. Moreover, each transmitted broadband tube wave 162 may encounter multiple reflectors as it propagates through the wellbore 102, resulting in a series of bifurcated tube waves with different travel paths within the wellbore 102.

Those skilled in the art will appreciate that some acoustic impedance boundaries (e.g., casing joints, in particular) will only produce reflections at higher frequencies, and the reflected tube waves will likely attenuate to the point where such acoustic impedance boundaries are not detected at the surface. Therefore, the specific types of acoustic impedance boundaries that are detected at the surface will vary depending on the details of the particular implementation.

In various embodiments, the pressure receivers 160 monitor the pressures of the broadband tube waves 162 and the reflected broadband tube waves 164 in the time domain as they reach the wellhead 142. This data represents a complicated set of interactions between reflected broadband tube waves 164 and transmitted broadband tube waves 162 with different travels paths due to their behavior at different acoustic impedance boundaries. Moreover, the reflected broadband tube waves 164 will be attenuated due to viscous losses in the acoustic waveguide, with the degree of attenuation being frequency dependent, as described further with respect to FIG. 3.

The quality of information provided by the reflected broadband tube waves 164 is strongly dependent on the frequency of the generated broadband tube waves 162. More specifically, the broadband tube waves' interaction with the reflectors of interest, i.e., the interfaces between the wellbore 102 and the entry points for the fractures, is frequency dependent. In general, higher frequency tube waves exhibit lower reflectivity at reflection points, such as at the wellbore/fracture interfaces, leading to greater transmission of energy beyond these points. Therefore, using higher frequency tube waves enables larger numbers of wellbore/fracture interfaces, aligned in series with respect to the incoming tube waves, to be detected, particularly when attenuation of the broadband tube waves can be tolerated. Furthermore, higher frequency tube waves have shorter wavelengths and, thus, provide higher spatial resolution for separating closely-located wellbore/fracture interfaces. Accordingly, in some embodiments, frequencies between 10 Hertz (Hz) and the Nyquist frequency constitute at least 50% of the acoustic power in the generated broadband tube waves 162, which may correspond to a spatial resolution of less than around 100 meters if peak power density occurs at 10 Hz. More preferably, in other embodiments, frequencies between 100 Hz and the Nyquist frequency constitute at least 50% of the acoustic power in the generated broadband tube waves 162, with a peak power density at 100 Hz, which may correspond to a spatial resolution of less than around 10 meters.

In various embodiments, the reflected broadband tube waves 164 travel a roundtrip distance in excess of around 10,000 feet. Therefore, the pressure amplitudes of the generated broadband tube waves 162 may be controlled such that acceptable signal-to-noise ratios are obtained even after attenuation of the tube waves across such long distances. In some embodiments, acceptable signal-to-noise ratios are obtained by generating broadband tube waves 162 with maximum pressure amplitudes of at least 0.1 pounds per square inch (psi), at least 1 psi, at least 10 psi, or most preferably, at least 100 psi. Note that the aforementioned tube-wave amplitude is a dynamic pressure amplitude in addition to some background static pressure, which may be much higher than 100 psi. Moreover, in various embodiments, the pressure receivers 160 may be configured with a high degree of resolution such that valuable information can be obtained from reflected broadband tube waves 164 that are highly attenuated. For example, in some embodiments, the pressure receivers 160 are configured to resolve pressures (that is, to detect signals above the background noise) that are 10 milli-psi in amplitude. With a pressure pulse generator capable of generating a maximum transient pressure amplitude of 100 psi, this amounts to pressure resolution of one part in ten thousand. Given a set capability of the pressure pulse generator, the pressure receiver resolution should be at least one part in ten thousand (or, more preferably, one part in one hundred thousand) of the maximum pressure amplitude of the generated broadband tube waves 162. Note that these resolutions are also related only to the dynamic pressure, both of the generated tube-wave and the background noises.

In various embodiments, an upper limit for the frequency of the tube waves 162 is between around 4,000 and around 6,000 Hz. This upper frequency limit may be selected based, at least in part, on the diameter of the casing strings 110, 112, and 114 within the hydrocarbon well 100. More specifically, the upper frequency limit may be selected based on at least two factors. The first factor is the expected attenuation due to the tube waves' interactions with the walls of the casing strings 110, 112, and 114, as described further with respect to FIG. 3. The second factor is the minimum wavelength that can be tolerated for the broadband tube waves 162 such that the wavelength does not drop below the diameter of the smallest casing, i.e., the production casing string 114 within the wellbore 102. Once the wavelengths of the broadband tube waves are less than the diameter of the smallest casing, the tube waves become dispersive, meaning that they will begin to follow multiple different paths. This may cause the reflected broadband tube waves 164 to be distorted, resulting in signal processing challenges that jeopardize the success of the cluster efficiency measurement process. Therefore, in various embodiments, the wavelengths for the broadband tube waves 162 are at least double or at least triple the diameter of the smallest casing within the wellbore 102. As an example, if the wavelengths of the tube waves are selected to be at least double the diameter of the production casing string 114, and the production casing string 114 is 5 inches in diameter, the wavelengths for the broadband tube waves 162 may be at least 10 inches, or 0.25 meters. If the sound speed is 1,500 meters per second (m/s), this correlates to an upper frequency limit of around 6,000 Hz. As another example, if the wavelengths of the tube waves are selected to be at least triple the diameter of the production casing string 114, and the production casing string 114 is 5 inches in diameter, the wavelengths for the broadband tube waves 162 may be at least 15 inches, or 0.38 meters. If the sound speed is 1,500 meters per second (m/s), this correlates to an upper frequency limit of around 4,000 Hz.

In various embodiments, the pressure receivers 160 are configured with a sampling frequency that is at least twice as high as the highest frequency expected in the reflected broadband tube waves 164. For example, if the upper frequency limit is 4,000 Hz, the recording sampling frequency will be at least 8,000 Hz. This embodies the Nyquist-Shannon sampling theorem.

In various embodiments, the recorded data relating to the generated and reflected broadband tube waves 162 and 164 can be analyzed to determine the nature of the acoustic impedance boundaries, or reflection points, within the wellbore 102. For example, the recorded data may be used to analyze the number of perforation clusters for which open fractures have formed and/or the location of the perforation clusters for which fractures have formed within a corresponding stage 150A-E of the hydrocarbon well 100. This analysis may be performed using interferometric techniques as well as robust full waveform inversion methods relating to wave propagation within the wellbore 102. In some embodiments, such full waveform inversion methods include means for analyzing the times of flight of the reflected broadband tube waves 164 to infer the locations of the fractures and other reflectors, means for analyzing the reflectivity of the broadband tube waves 162 and 164, as determined by the change in magnitude between the generated broadband tube waves 162 and the reflected broadband tube waves 164, to infer the size of each fracture entrance, and/or means for analyzing the reflected broadband tube waves 164 based on the first arrival principle to identify the number of fractures or clusters in each stage 150A-E. Moreover, as described herein, the recorded data provides the most insight into the nature of the acoustic impedance boundaries when the tube waves 162 are generated within a desired frequency band that includes relatively high frequencies.

In some embodiments, it is difficult to analyze the cluster efficiency for the stages of the wellbore 102 due to the complexity of the reflected broadband tube waves 164. This problem is most pronounced when the broadband tube waves encounter multiple acoustic impedance boundaries, such as acoustic impedance boundaries caused by casing joints, liner hangers, valves, plugs, sand bridges, structural variations (e.g., washouts), and other reflectors within the casing of the wellbore 102. To solve this problem, in some embodiments, the pressure pulse generator 158 and the pressure receivers 160 are used to measure the pressure response of the wellbore 102 right after the plug is set and before fractures are formed for a particular stage 150A-E. The resulting data are then used as a baseline pressure response that may be compared to the pressure response after the sets of fractures 154A-E are formed. In this manner, similarities between the baseline pressure response and the pressure response after fracturing may be easily attributed to reflectors that are always present within the wellbore 102. This, in turn, makes it easier to determine the fracture characteristics within the particular stage 150A-E of the hydrocarbon well 100.

Moreover, in some embodiments, the pressure response of the wellbore 102 is only measured once after the fracturing of each stage 150A-E. However, in other embodiments, the pressure response is measured multiple times during the fracturing of each stage 150A-E. Measuring the pressure response multiple times during the fracturing of a particular stage 150A-E allows the progress of the fracture growth within the particular stage 150A-E to be closely monitored and provides additional pressure responses at different timings to compare to the baseline pressure response for the particular stage 150A-E. For example, the pressure response may be measured multiple times during the pad phase at the beginning of the hydraulic fracturing of a particular stage 150A-E to allow the growth of the fractures (e.g., fractures 154A-E) within the particular stage 150A-E to be analyzed prior to injecting proppant into the fractures. This is described further with respect to FIG. 8.

Figure 1B:
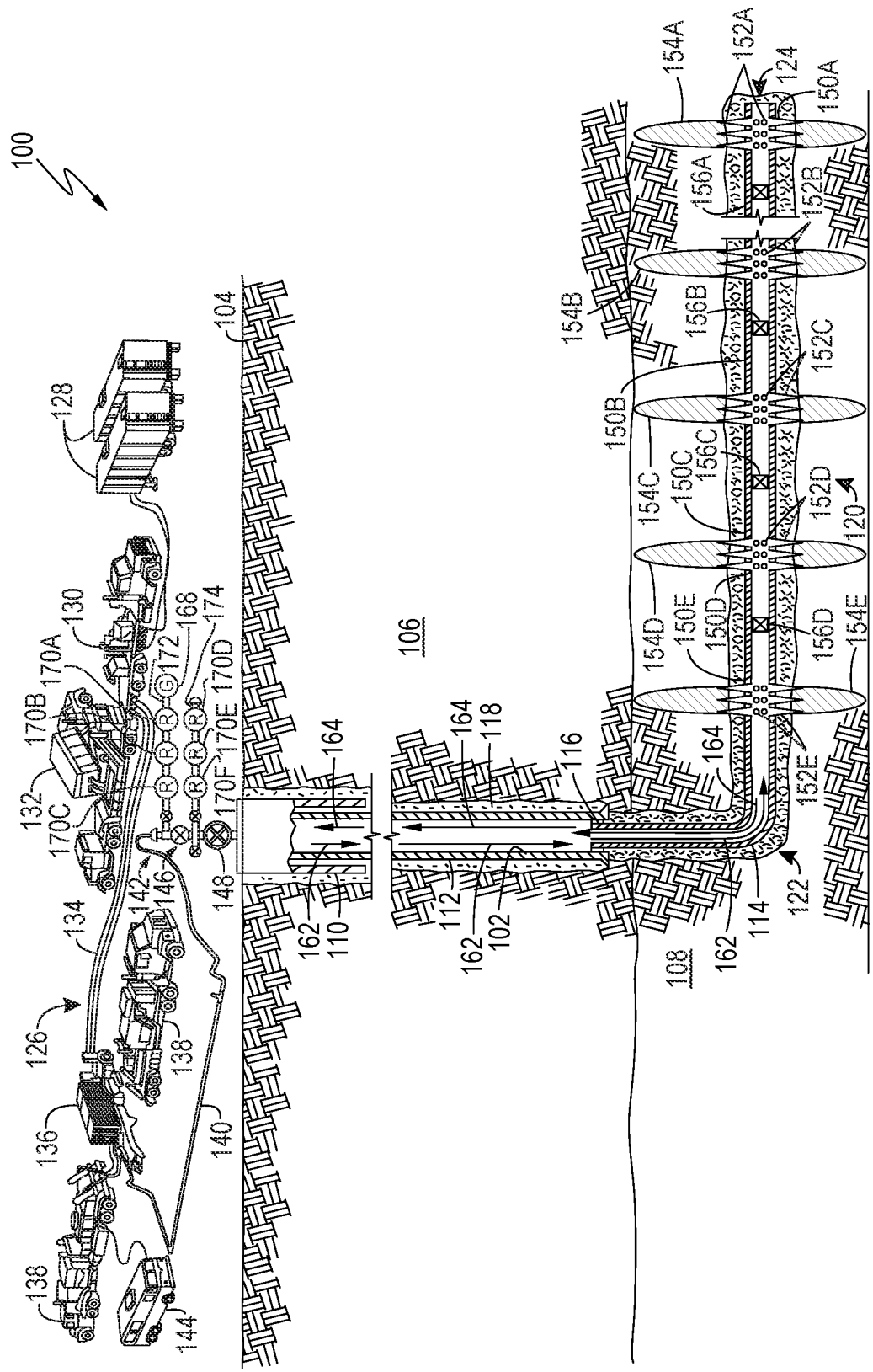
FIG. 1B is a schematic view of the exemplary hydrocarbon well of FIG. 1A, showing an exemplary embodiment of the cluster efficiency measurement equipment described herein.

FIG. 1B is a schematic view of the exemplary hydrocarbon well 100 of FIG. 1A, showing an exemplary embodiment of the cluster efficiency measurement equipment described herein. Like numbered items are as described with respect to FIG. 1A. According to the embodiment shown in FIG. 1B, the cluster efficiency measurement equipment includes a single pressure pulse generator 168 and multiple pressure receivers 170A-F. Specifically, the cluster efficiency measurement equipment includes two arrays of three pressure receivers 170A-C and 170D-F, where each array of pressure receivers may be referred to herein as a "triplet." In addition, as shown in FIG. 1B, the pressures receivers 170A-F are positioned such that the first array of pressure receivers 170A-C is positioned on a same tubing 172 as the pressure pulse generator 168, while the second array of pressure receivers 170D-F is positioned on an offshoot of tubing 174 that is connected by a T-junction (or other suitable connection) to a portion of the wellhead 146 that is in close proximity to the wellbore 102. Moreover, in various embodiments, each pressure receiver 170A-F within each array is placed at a predetermined minimum distance from the other pressure receivers to enable differentiation between the data recorded by each pressure receiver 170A-F.

Placing multiple arrays of pressure receivers, each array having at least two, but preferably three or more receivers within it allows for the use of interferometric processing of pressure data. Interferometric processing helps to remove reflection and transmission effects of the system that may be generated by unknown or difficult-to-characterize sources and that are not of interest for the characterization of subsurface perforation clusters and fractures intersecting the borehole. These unwanted effects of the system may relate to the exact source signature of the pressure pulse generator, which may not be known independently, and may only appear in the data over-printed by other reflection events. The along-tube distance of the pressure pulse generator relative to the pressure receivers may also be difficult to characterize. Other unwanted effects include timing and amplitude of reflection events related to the wellhead infrastructure, including the Christmas-tree, pipe valves, pipe joints or junctions, line kinks, or even the pressure pulse generator apparatus itself. These are items that may be unique to each well. Therefore, according to embodiments described herein, such items do not have to be characterized and modeled precisely at each well in order to interpret or invert the pressure data for subsurface information. The use of multiple arrays of pressure receivers, arranged on opposite sides of some of these sources of unwanted effects, allows for the automatic removal of unwanted effects from the pressure data through interferometry. Two types of interferometry may be used. A first type of interferometry removes certain unwanted reflections, e.g., those due to end-caps or top-side infrastructure. This type of interferometry requires at least two receivers. The second type of interferometry estimates tube wave speeds and attenuation between pressure receivers, which may be used as input for the first type of interferometry. This type of interferometry generally utilizes at least three pressure receivers in a row. Therefore, each array of pressure receivers may be referred to as a "triplet."

Those skilled in the art will appreciate that, while two arrays of pressure receivers 170A-C and 170D-F are shown in FIG. 1B, in other embodiments, three or more arrays may be utilized. Similarly, while three pressure receivers are depicted within each array of pressure receivers, in other embodiments, each array may include two, four, or more pressure receivers. In addition, in some embodiments, more than one pressure pulse generator 168 may be utilized to generate the tube waves. Furthermore, those skilled in the art will appreciate that the tubing 172 including the pressure pulse generator 168 and the first array of pressure receivers 170A-C may be connected to the offshoot of tubing 174 including the second array of pressure receivers 170D-F in any suitable manner.

The schematic views of FIGS. 1A and 1B are not intended to indicate that the hydrocarbon well 100 is to include all of the components shown in FIGS. 1A and 1B, or that the hydrocarbon well 100 is limited to only the components shown in FIGS. 1A and 1B. Rather, any number of components may be omitted from the hydrocarbon well 100 or added to the hydrocarbon well 100, depending on the details of the specific implementation. For example, while only one lateral section 120 is shown in FIG. 1A, the hydrocarbon well 100 may include multiple lateral, deviated, or highly-deviated sections extending in various directions throughout the formation 106. In such embodiments, the pressure pulse generator(s) and the pressure receiver(s) may be used to characterize fractures within each section separately. As another example, in some embodiments, the wellhead 142 is a splitter-type wellhead that connects to a number of wellbores 102 within the formation 106. In such embodiments, the pressure pulse generator(s) and the pressure receiver(s)

may be used to separately determine the cluster efficiency for each stage of each wellbore 102.

While FIGS. 1A and 1B relate to the utilization of the cluster efficiency measurement equipment described herein in conjunction with a plug-and-perforation process, the cluster efficiency measurement equipment may also be used for any other suitable type of fracturing or stimulation process. For example, in some embodiments, the cluster efficiency measurement equipment described herein are utilized in conjunction with a coiled tubing stimulation process or a sliding sleeve stimulation process.

Figure 2:
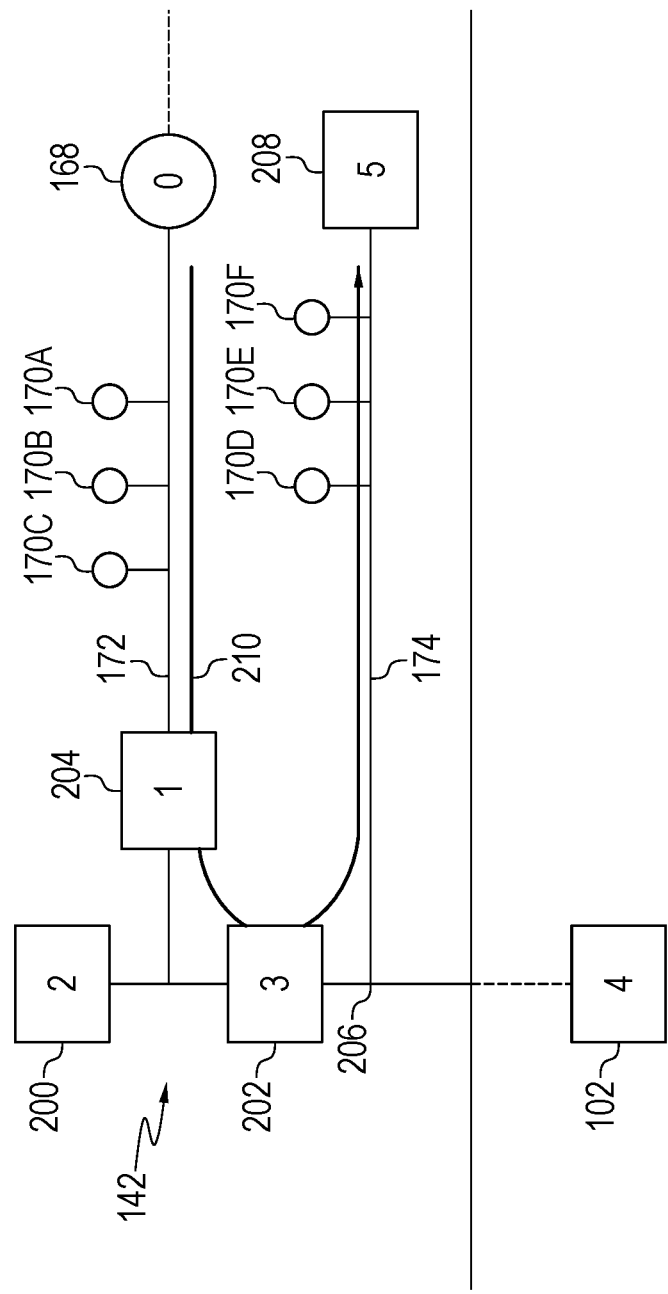
FIG. 2 is a simplified schematic view of the exemplary cluster efficiency measurement equipment described with respect to FIG. 1B.

FIG. 2 is a simplified schematic view of the exemplary cluster efficiency measurement equipment described with respect to FIG. 1B. Specifically, FIG. 2 depicts the wellhead 142, including a Christmas tree top portion 200 (depicted as box "2" in the figure), a Christmas tree middle portion 202 (depicted as box "3" in the figure), and a Christmas tree connection portion 204 (depicted as box "1" in the figure) that are hydraulically coupled to the wellbore 102 within the subsurface. Such boxes represent complex piping, joints, branches, and valves (among other components) that constitute the detailed hydraulic connections of the top-side assembly. FIG. 2 also depicts the pressure pulse generator 168 and the first array of pressure receivers 170A-C positioned on the tubing 172, as well as the second array of pressure receivers 170D-F positioned on the offshoot of tubing 174. According to the embodiment shown in FIG. 2, the offshoot of tubing 174 is connected to the main wellhead 142 and, thus, the tubing 172 including the first array of pressure receivers 170A-C and the pressure pulse generator 168 by a T-junction 206. In addition, the offshoot of tubing 174 includes an end cap 208 positioned after the last pressure receiver 170D within the array. Moreover, as illustrated by flowline 210, there is a direct flow path between the pressure pulse generator 168, the first array of pressure receivers 170A-C, and the second array of pressure receivers 170D-F. Furthermore, in various embodiments, the offshoot of tubing 174 is a pipe with a relatively small inner diameter (ID) and is positioned close to the wellbore 102 (and the corresponding subsurface reflectors).

Characteristics of the Broadband Tube Waves

Figure 3:
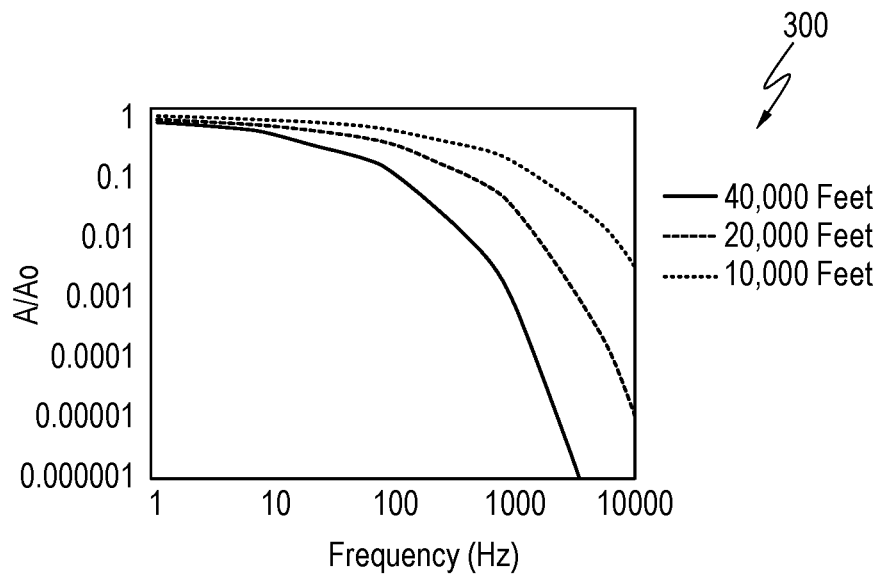
FIG. 3 is a graph showing the manner in which tube waves attenuate over different travel distances.

FIG. 3 is a graph 300 showing the manner in which tube waves attenuate over different travel distances. Specifically, the graph 300 shows a prediction of the amplitude ratio ($A/A_0$) for tube waves plotted as a function of frequency for travel distances of 10,000, 20,000, and 40,000 feet. The graph 300 was generated using a model with a 5-inch diameter steel pipe filled with water. The results of the model show that higher frequency information will be significantly attenuated after traveling a roundtrip distance ranging from 10,000 to 40,000 feet. Moreover, the results shown in the graph 300 merely provide a lower bound for attenuation, and the coupling to the pipe and the cement within the wellbore is not fully accounted for in this simple model.

In operation, the reflected broadband tube waves are attenuated, at least in part, due to viscous losses in the acoustic waveguide, with the degree of attenuation being frequency dependent. A simple viscous waveguide model predicts that the quality factor (Q) that determines attenuation is approximately proportional to the ratio of the pipe radius to the viscous skin depth. In the context of this model, the attenuation is frequency dependent due to the frequency dependence of the skin depth as well as the frequency-dependent ratio between the quality factor and the attenuation coefficient.

However, despite the significant attenuation experienced at higher frequencies, broadband tube waves are still preferable because they provide the highest spatial resolution for analyzing reflection points. Moreover, FIG. 3 suggests that a commercially-available pressure transducer is capable of successfully detecting reflected tube waves with a frequency of 1,000 Hz after they have traveled around 40,000 feet roundtrip within the wellbore.

Figure 4:
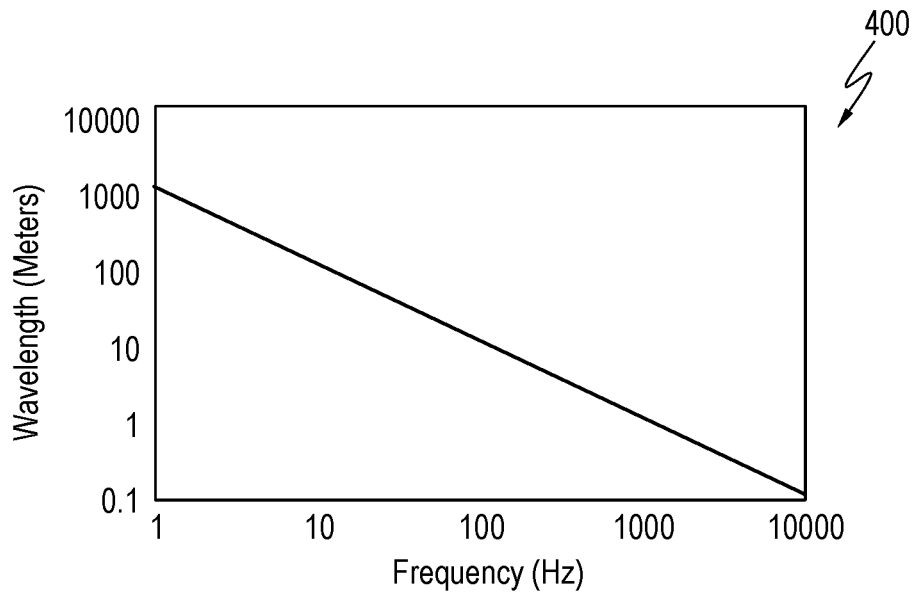
FIG. 4 is a graph showing the wavelength of a tube wave as a function of frequency.

FIG. 4 is a graph 400 showing the wavelength of a tube wave as a function of frequency. More specifically, the graph 400 shows a prediction of the wavelength of a tube wave in a wellbore with a sonic velocity of 1,400 m/s. Under those conditions, a tube wave with a frequency content of 1,000 Hz will have a wavelength of 1.4 meters. This short wavelength correlates to a higher spatial resolution, i.e., a spatial resolution of at least 0.35 meters, using the quarter wavelength resolution rule. Moreover, a higher spatial resolution allows reflectors with the wellbore to be analyzed in greater detail.

Cluster Efficiency Definition and Characterization

As described herein, the success of the hydraulic fracturing process for an unconventional hydrocarbon well directly impacts the amount of hydrocarbon fluids that can be recovered from the corresponding reservoir. Specifically, the numbers, sizes, compliances, and locations of the fractures corresponding to the perforation clusters within each stage of the hydrocarbon well directly impact the amount of hydrocarbon fluids that are able to mobilize and flow into the wellbore. Ideally, each perforation cluster leads to one fracture, and the fracturing fluid is evenly distributed among the perforation clusters and corresponding fractures such that contact surfaces are uniform among the fractures. This ideal scenario offers the best potential for maximizing production from the reservoir through optimized well spacing and efficient stimulation.

Figure 5:
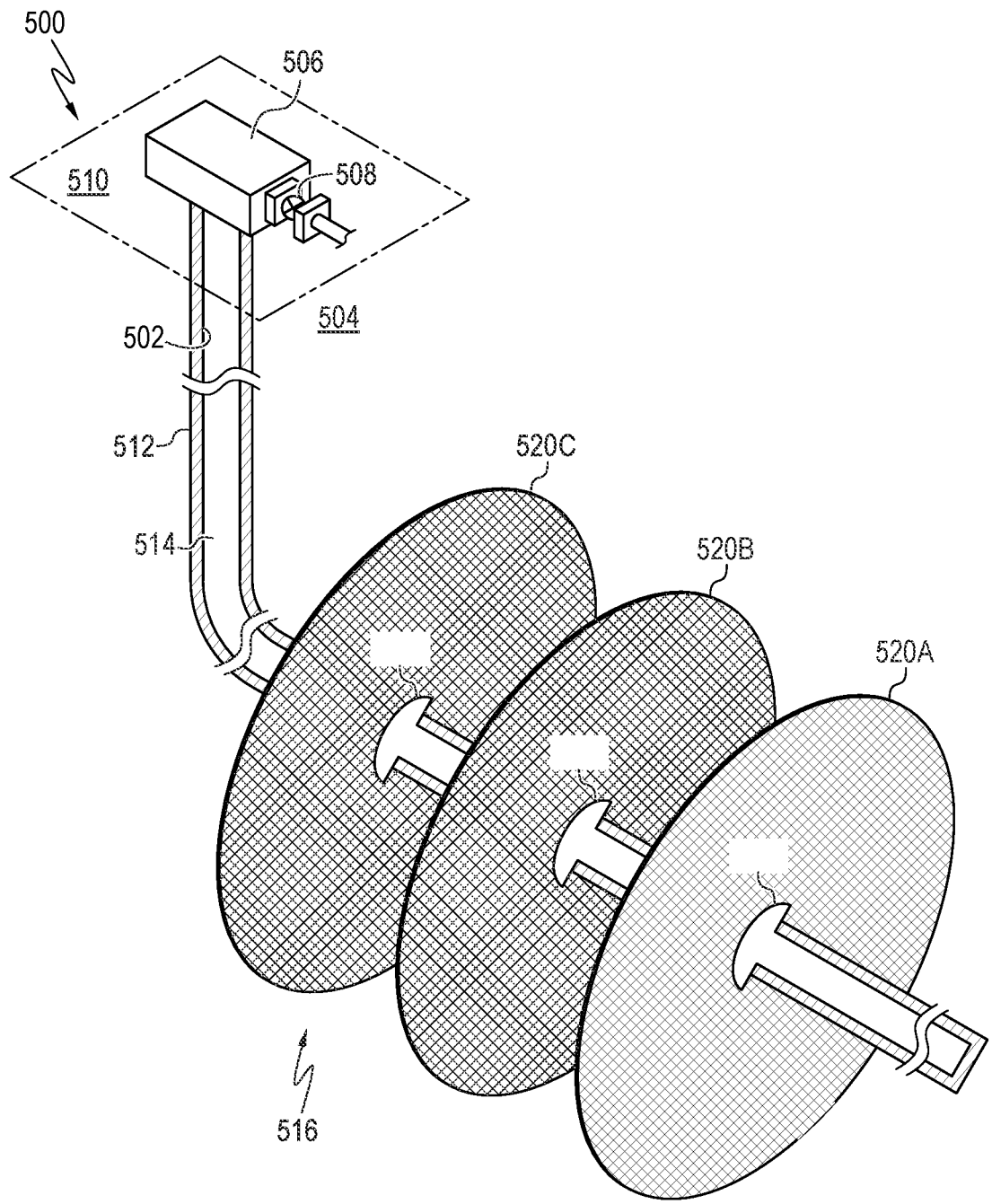
FIG. 5 is a simplified schematic view of a hydrocarbon well, showing the manner in which each perforation cluster ideally leads to a single fracture.

This concept is illustrated schematically in FIG. 5. Specifically, FIG. 5 is a simplified schematic view of a hydrocarbon well 500, showing the manner in which each perforation cluster ideally leads to a single fracture. Specifically, the exemplary hydrocarbon well 500 includes a wellbore 502 that extends within a subsurface region 504 including a hydrocarbon-bearing formation or reservoir, as well as a wellhead 506 including (among other components) a shut-in valve 508 that controls the flow of hydrocarbon fluids from the subsurface region 504 to a surface region 510. The hydrocarbon well 500 also includes a downhole tubular 512 that extends within the wellbore 502 and defines a tubular conduit 514 that provides a flow path for the hydrocarbons fluid to flow from the subsurface region 504 to the surface region 510.

The downhole tubular 512 includes a number of perforation clusters and a number of corresponding fractures formed with respect to each stage of the hydrocarbon well 500. For example, the hydrocarbon well 500 may include around 3 to 20 perforation clusters for each stage, with each perforation cluster ideally leading to a single fracture. This is illustrated schematically in FIG. 5, which depicts a portion of a single stage 516 of the hydrocarbon well 500. As shown in FIG. 5, the stage 516 includes a number of perforation clusters 518A, 518B, and 518C, with each perforation cluster leading to a single fracture (or fracture network) 520A, 520B, and 520C, respectively.

Figure 6A:
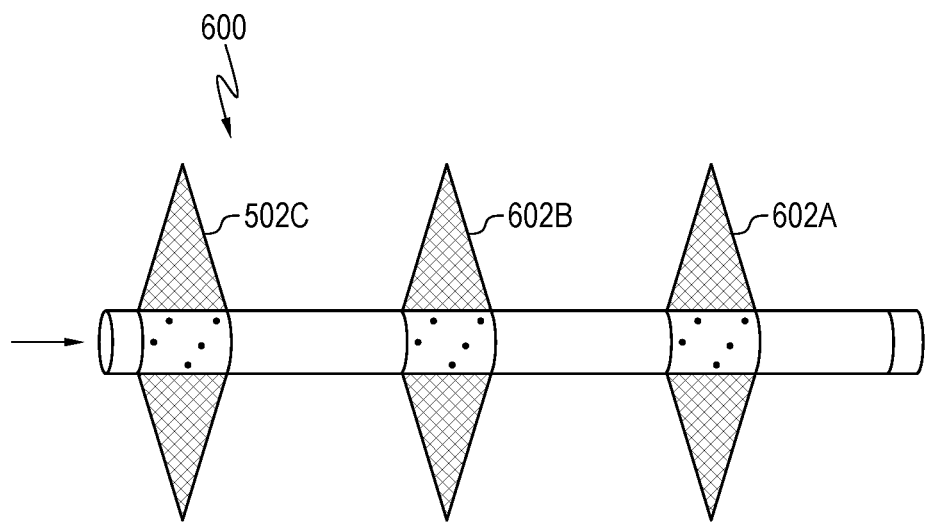
FIG. 6A is a simplified schematic view of a portion of a single stage of a hydrocarbon well, showing three perforation clusters with optimal fluid volume distribution of the fracturing fluid among the three perforation clusters.
Figure 6B:
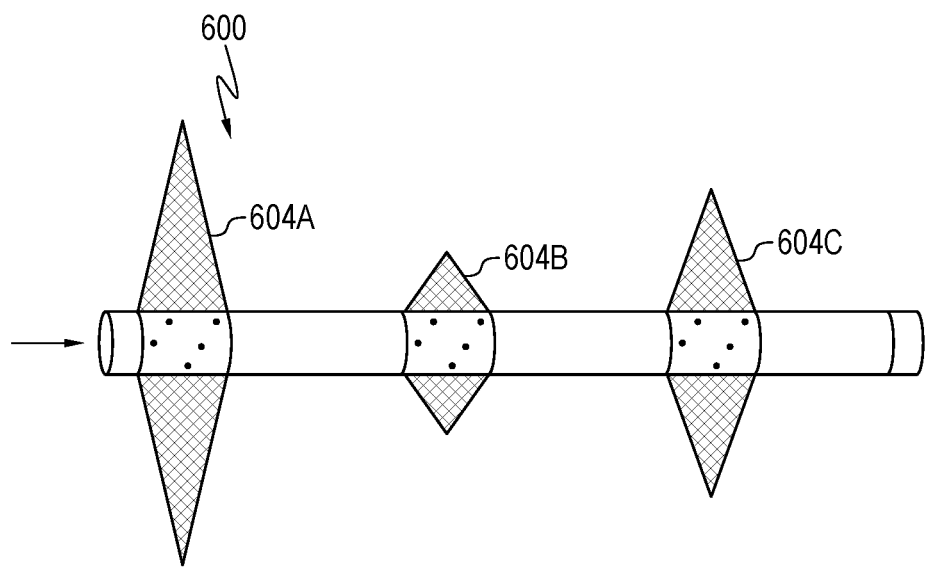
FIG. 6B is a simplified schematic view of another portion of the stage of the hydrocarbon well, showing three perforation clusters with suboptimal (or uneven) fluid volume distribution of the fracturing fluid among the three perforation clusters.

However, as will be appreciated by those skilled in the art, the ideal case shown in FIG. 5 is not fully representative of real hydraulic fracturing scenarios. Specifically, for real hydraulic fracturing scenarios, cluster efficiency may be highly variable, with some perforation clusters remaining entirely closed and other perforation clusters only partially opening and, thus, not allowing the designed amount of fracturing fluid to enter the reservoir and create fractures. Moreover, as described herein, it is highly desirable to generate the desired number of perforation clusters and corresponding fractures, with an even fluid volume distribution among the perforation clusters and corresponding fractures. This is illustrated schematically in FIGS. 6A and 6B. Specifically, FIG. 6A is a simplified schematic view of a portion of a single stage 600 of a hydrocarbon well, showing three perforation clusters 602A, 602B, and 602C with optimal fluid volume distribution of the fracturing fluid among the three perforation clusters 602A, 602B, and 602C. As depicted in FIG. 6A, optimal fluid volume distribution is the case in which the pumped fracturing fluid is evenly partitioned among all the designed perforation clusters within a particular stage. In contrast, FIG. 6B is a simplified schematic view of another portion of the stage 600 of the hydrocarbon well, showing three perforation clusters 604A, 604B, and 604C with suboptimal (or uneven) fluid volume distribution of the fracturing fluid among the three perforation clusters 604A, 604B, and 604C.

According to embodiments described herein, this concept is described using the term "cluster efficiency." Specifically, the term "cluster efficiency" is used herein to refer to a measurement of relative fluid volume distribution among perforation clusters and corresponding fractures. More specifically, cluster efficiency is a measurement derived from a surrogate measurement; in particular, it is a measurement of fluid volume partitioning based on strain rate variations in an optical fiber that sees flow past it during completion at positions near the wellbore feeding a particular perforation cluster. From the fluid volumes and relative fluid volumes, cluster efficiency is defined. Furthermore, the relative size of the fractures is presumed to be linked to the volume of fluid taken in at each perforation cluster, which is itself a surrogate measurement of the dimensions of the corresponding fracture.

The cluster efficiency of a particular stage of the wellbore is characterized by the uniformity index (UI) of all the perforation cluster/fracture pairs within the stage. In various embodiments, the UI is calculated according to Equations (1) and (2) and is normalized between a value of 0 and 1.

$$P_i = \frac{V_i}{V} \quad (1)$$

$$UI = \frac{N}{N-1} \sum_{i=1}^{N} P_i \times (1 - P_i) \quad (2)$$

In Equations (1) and (2), $V_i$ is the fluid volume taken by the ith perforation cluster; V is the total fluid volume of stimulation per stage; and N is the number of designed perforation clusters per stage.

Figure 7:
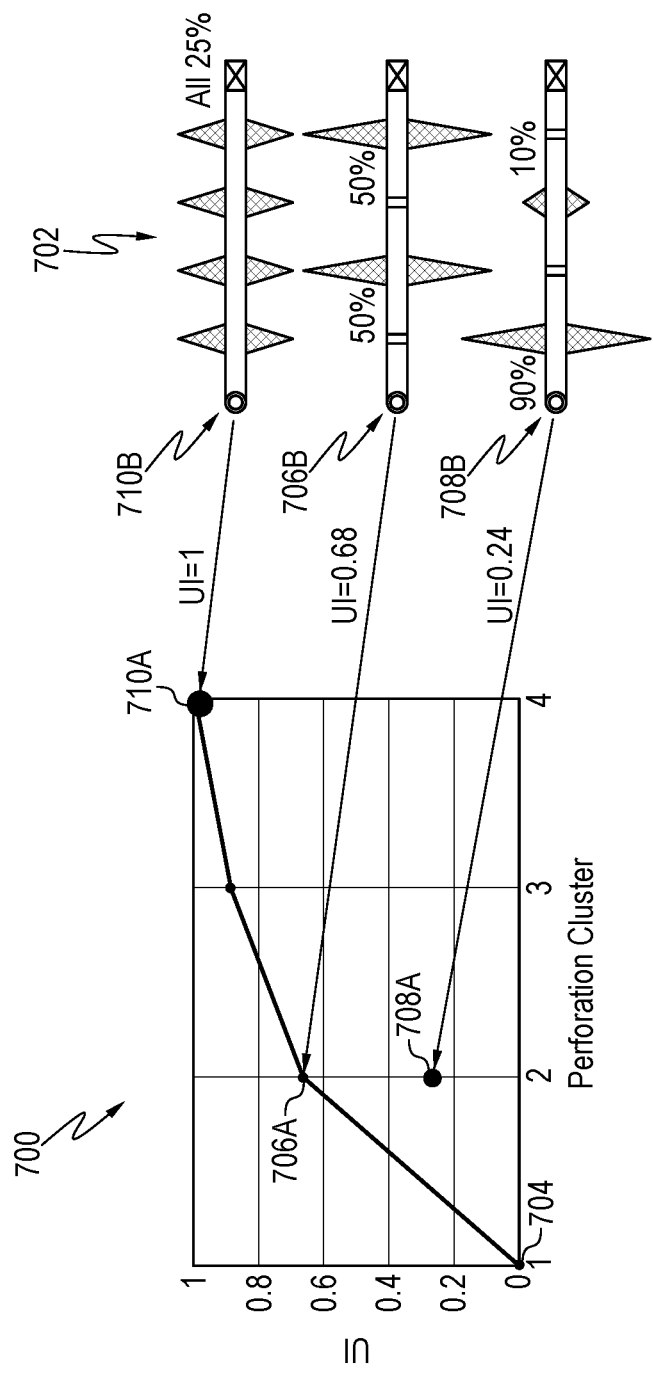
FIG. 7 is a graph and corresponding schematic view depicting exemplary real-life cluster efficiencies (as defined by the uniformity indices) for a stage that is designed to include four perforation clusters.

FIG. 7 is a graph 700 and corresponding schematic view 702 depicting exemplary real-life cluster efficiencies (as defined by the uniformity indices) for a stage that is designed to include four perforation clusters. In the graph 700, the x-axis defines the number of perforation clusters that were actually opened in the real-life scenario, while the y-axis defines the corresponding UI for the stage. In particular, when only one perforation cluster opens for the stage, as depicted graphically at 704, the UI for the stage is 0, since all the fracturing fluid flows into the single perforation cluster and is not distributed among multiple perforation clusters. When two perforation clusters open for the stage and take equal volumes of the fracturing fluid, the UI is 0.68, as depicted graphically at 706A and schematically at 706B.

When two perforation clusters open for the stage, but one perforation cluster takes 90% of the fracturing fluid and the other perforation cluster takes only 10% of the fracturing fluid, the UI is 0.24, as depicted graphically at 708A and schematically at 708B. However, when all four designed perforation clusters open and each perforation cluster takes 25% of the fracturing fluid, the UI is 1.0 (i.e., the ideal case), as depicted graphically at 710A and schematically at 710B.

As will be appreciated by those skilled in the art, it is desirable to achieve a uniformity index that is as close to one as possible, since a UI of 1.0 correlates to the highest achievable cluster efficiency. Moreover, determination of the cluster efficiency during the hydraulic fracturing operation not only enables fracture growth control in real-time during the stimulation process, e.g. by applying intra-stage diversion techniques, but also enables stimulation design improvements, e.g., by reducing the total number of perforation clusters per stage (referred to as "limited entry").

Cluster Efficiency Measurement Techniques

During the stimulation process, the wellbore is filled with pressurized fluid (e.g., water). The resulting pressurized fluid column is then used as an acoustic waveguide for the tube waves described herein. In particular, the generated tube waves propagate inside the fluid column and are reflected at acoustic impedance boundaries within the wellbore. As a result, the reflected tube waves include properties that allow for the characterization of such acoustic impedance boundaries, such as, in particular, acoustic impedance boundaries created by the perforation cluster/fracture interfaces.

Figure 8:
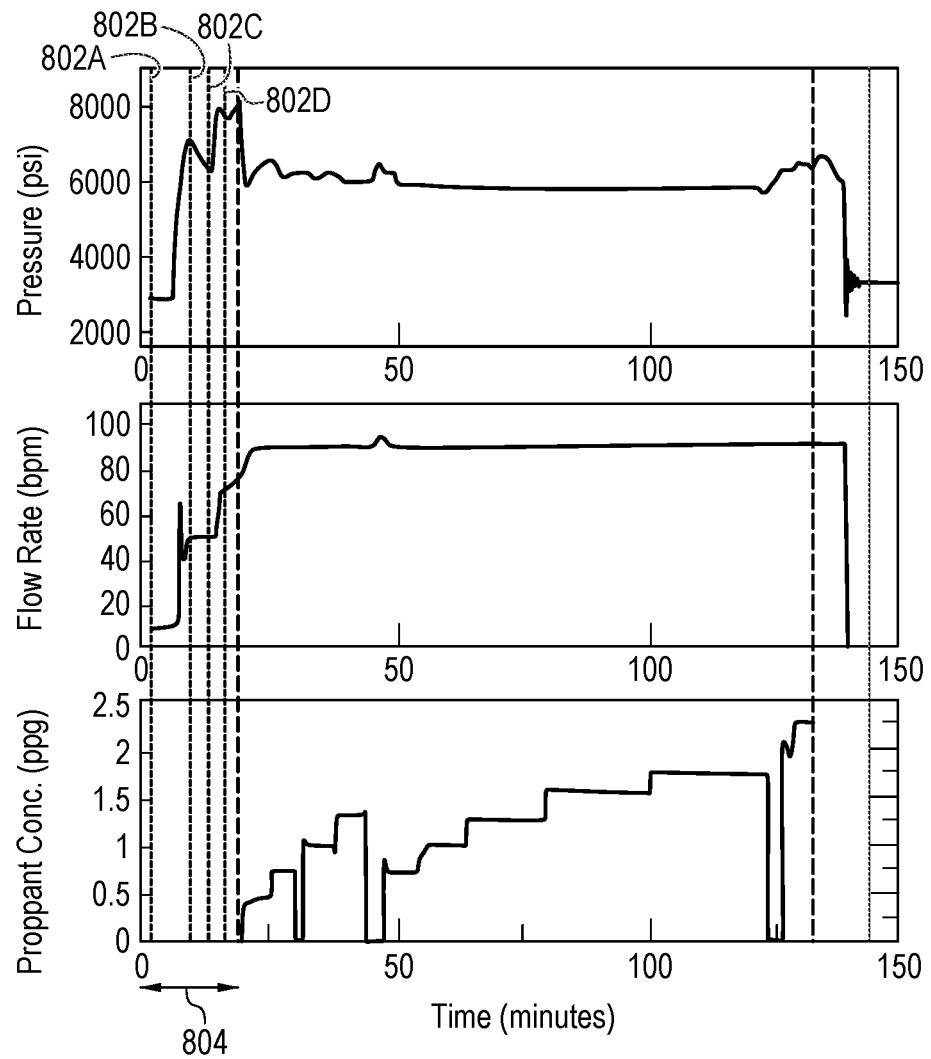
FIG. 8 is a graph showing a typical stage pumping profile.

According to embodiments described herein, the tube waves are preferably generated during the pad phase and/or the flush phase during the stimulation process, when only pressurized fracturing fluid (e.g., water) is present within the wellbore (e.g., without any sand or other proppant) since, during this time, the tube waves will experience the lowest attenuation and will not experience scattering losses due to interactions with proppant particulates. Moreover, with less attenuation along the wellbore, it is possible to probe perforation clusters that are farther away from the surface. This is illustrated in FIG. 8, which is a graph 800 showing a typical stage pumping profile. As depicted graphically at 802A, 802B, 802C, and 802D, embodiments described herein may include generating a series of tube waves during the pad phase 804 of the hydraulic fracturing operation, before any sand or other proppant has been pumped into the wellbore (e.g., when the proppant concentration is 0 pounds per gallon (ppg), as shown in the graph 800). Moreover, as shown in FIG. 8, the fluid flow rate (in barrels per minute (bpm)) is low during the pad phase, which is ideal for the propagation of the tube waves within the fluid column.

According to embodiments described herein, the reflected tube waves, which are measured at the surface, are then used to characterize cluster efficiency in real-time during a stimulation operation. In particular, when a particular tube wave is reflected at a perforation cluster/fracture interface, the reflectivity is determined by the local fluid conductivity at that interface, which is related to the fracture aperture, height, and length, as well as the elastic properties of the rock formation. Assuming the rock formation is homogenous in each stage (with each stage being around 100 feet to around 500 feet long, for example), the tube wave reflectivity from each fracture entry point can be used as an indirect measurement of the fracture aperture, height, and length, which is associated with the fluid volume distribution for the corresponding perforation cluster. To make such determinations, however, the recorded data are first processed using interferometric techniques, as described herein. The resulting processed data are then utilized to determine the number of reflections, as well as the magnitudes and time-sequence of the reflectivity at each perforation cluster/fracture interface, using a robust full waveform inversion method, as described further herein. The normalized ratio of the reflectivity, or relative hydraulic conductivity, at each perforation cluster/fracture interface in the corresponding stage may then be used as a surrogate measurement of the relative fluid volume distribution or, in other words, the cluster efficiency for the stage. However, it is worth noting that cluster efficiency is not a direct measurement of the individual fluid volume within each perforation cluster, as described further with respect to FIG. 9.

Figure 9:
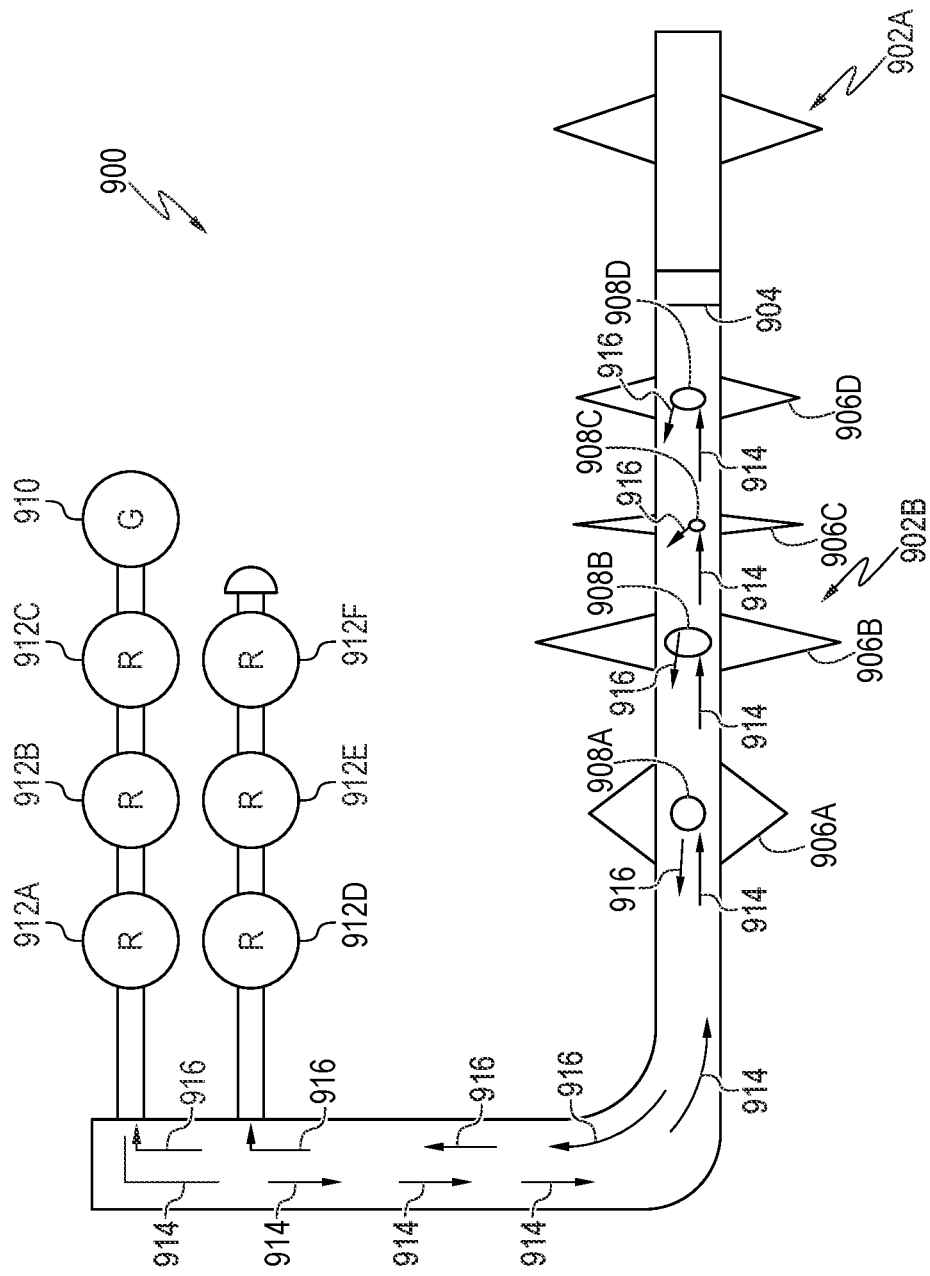
FIG. 9 is a schematic view of a theoretical wellbore that is used to depict the manner in which the cluster efficiency of a stage can be quantified based on the reflectivity, or relative hydraulic conductivity, at each perforation cluster/fracture interface within a particular stage.

FIG. 9 is a schematic view of a theoretical wellbore 900 that is used to depict the manner in which the cluster efficiency of a stage can be quantified based on the reflectivity, or relative hydraulic conductivity, at each perforation cluster/fracture interface within a particular stage. The theoretical wellbore includes multiple stages 902A and 902B separated by a frac plug 904, with the second stage 902B being the focus of the schematic view of FIG. 9. In particular, as shown in FIG. 9, the second stage 902B includes a number of perforation clusters 906A, 906B, 906C, and 906D, with each perforation cluster 906A, 906B, 906C, and 906D including a corresponding perforation cluster/fracture interface 908A, 908B, 908C, and 908D.

In addition, a pressure pulse generator 910 (e.g., for an experimental lab setup, often a hydrophone) and a number of pressure receivers 912A-F (e.g., for an experimental lab setup, often commercially-available pressure gauges) are hydraulically coupled to the wellbore 900. According to the exemplary embodiment shown in FIG. 9, the pressure receivers 912A-F are arranged into two arrays of three (e.g., as triplets). The pressure pulse generator 910 is configured to generate tube waves that travel down the wellbore 900, as indicated by arrows 914, while the pressure receivers 912A-F are configured to record the resulting reflected tube waves traveling back up the wellbore 900, as indicated by arrows 916.

As shown in FIG. 9, the tube waves are reflected at the perforation cluster/fracture interfaces 908A-D within the stage 902B of the hydrocarbon well 900. According to embodiments described herein, the cluster efficiency for the overall stage 902B can be determined by quantifying the reflectivity at each perforation cluster/fracture interface 908A, 908B, 908C, and 908D within the stage 902B and then (optionally) using the resulting reflection coefficients to calculate the uniformity index for the perforation clusters 906A, 906B, 906C, and 906D within the stage 902B. Specifically, Equations (3) and (4) define the frequency-dependent uniformity index for the reflectors (R) within the stage 902B, where $R_i(\omega)$ refers to the reflectivity of the $i^{th}$ cluster for a tube wave at frequency $\omega$, and where the reflectors of interest are the first perforation cluster/fracture interface 908A (e.g., $R_1(\omega)$), the second perforation cluster/fracture interface 908B (e.g., $R_2(\omega)$), the third perforation cluster/fracture interface 908C (e.g., $R_3(\omega)$), and the fourth perforation cluster/fracture interface 908D (e.g., $R_4(\omega)$). In addition, M is the number of detected reflections per stage, and N is the number of designed perforation clusters per stage.

$$UI_R(\omega) = \frac{N}{N-1} \sum_{i=1}^{N} S_i \times (1 - S_i) \quad (3)$$

$$S_i = \frac{|R_i(\omega)|}{\sum_{j=1}^{M} |R_j(\omega)|} \quad (4)$$

Using these equations, the reflected tube waves recorded by the pressure receivers 912A-F are approximated by a product of the reflectivity of the particular perforation cluster, the transmission from a previous perforation cluster, and the attenuation along the wellbore 900 (such as, for example, the reflected pressure wave amplitude from the second cluster from the surface), as defined by Equation (5).

$$P_{R_2}(\omega) = P_{input}(\omega) \times |R_2(\omega)| * (1-|R_1(\omega)|)^2 \times e^{(-A(\omega) \times 2L_2)} \quad (5)$$

The approximation in Equation (5) represents only the first direct reflection of each cluster and, therefore, neglects higher-order (multiple) reflections in the system. The approximation has first-order accuracy, which is sufficient when the magnitude of the reflection coefficient for each cluster is much smaller than 1. It is important to note that, in real-life scenarios, there may also be cross-interference from additional reflectors within the wellbore 900, as described herein, and such cross-interference will need to be accounted for during signal processing.

Frequency Selection Techniques for Tube Waves

According to embodiments described herein, both the pressure pulse generator and the pressure receivers are positioned close to the wellhead at the surface and are, thus, nonintrusive with respect to the wellbore and do not require the extra time, operational complexity, and cost of lowering equipment down into the wellbore. As a result of this nonintrusive, low-cost configuration, the cluster efficiency measurement techniques described herein are scalable to all wells. In general, to detect multiple fractures at the toe of a wellbore with a typical length of about 20,000 feet, the tube wave generator needs to launch a strong pressure wave from the surface, thus enabling the detection of the reflected tube wave within the pressure receiver's sensitivity range. However, even though it is easier to generate a strong pressure wave at a low frequency, a broadband tube wave, which extends to higher frequencies, is needed to resolve closely-spaced perforation clusters (e.g., perforation clusters that are around 10 feet to around 50 feet apart).

Accordingly, the cluster efficiency measurement techniques described herein provide for the selection of a suitable frequency band for detecting the cluster efficiency of remotely-located perforation clusters. Specifically, four frequency band selection criteria are provided herein. Such frequency band selection criteria include a non-dispersive wave criterion, a low attenuation criterion, a spatial resolution criterion, and a reflector differentiation criterion, as described further herein.

Turning first to the details of the non-dispersive wave criterion, ensuring that the tube waves are non-dispersive requires applying an upper frequency bound to the selected frequency band. In particular, once the wavelength of a tube wave is less than the diameter of the smallest casing string, the tube wave becomes dispersive, meaning that it will begin to follow multiple different paths. This may cause the reflected broadband tube wave to be distorted, resulting in signal processing challenges that jeopardize the success of the cluster efficiency measurement process. Therefore, in various embodiments, the wavelengths for the broadband tube waves are at least double or at least triple the diameter of the smallest casing string in the wellbore. As an example, if the wavelengths of the tube waves are selected to be at least double the diameter of the production casing string, and the production casing string is 5 inches in diameter, the wavelengths for the broadband tube waves may be at least 10 inches, or 0.25 meters. If the sound speed is 1,500 meters per second (m/s), this correlates to an upper frequency limit of around 6,000 Hz. As another example, if the wavelengths of the tube waves are selected to be at least triple the diameter of the production casing string, and the production casing string is 5 inches in diameter, the wavelengths for the broadband tube waves may be at least 15 inches, or 0.38 meters. If the sound speed is 1,500 m/s, this correlates to an upper frequency limit of around 4,000 Hz. However, in some cases, lower-frequency tube waves (e.g., tube waves with frequencies of less than around 6,000 Hz) can be treated as planar waves with wave fronts uniform with respect to the cross-section of the casing string, traveling parallel to the casing string, and any loss to the signal traveling parallel to the casing due to radial modes is captured phenomenologically within the attenuation coefficient.

With regard to the low attenuation criterion, there are two main loss mechanisms for tube waves propagating through a pressurized water column within a wellbore, and both loss mechanisms are frequency dependent. The first loss mechanism includes losses through the casing wall as a result of wall friction and mechanical vibration coupling to the cement and the formation outside the casing wall. According to embodiments described herein, this loss is accounted for to help identify the right tube wave generator and pressure receiver combination that will enable cluster efficiency measurement for long wellbores. The second loss mechanism includes losses incurred as a result of tube wave interaction with various reflectors within the wellbore. Such reflectors may include, for example, casing joints, liner hangers, valves, plugs, sand bridges, structural variations within the wellbore (e.g., washouts), perforations, and fractures. According to embodiments described herein, this type of loss is measured, and the reflection coefficients from the perforation clusters of interest are then singled out and used to characterize the cluster efficiency for the corresponding stage.

Figure 10A:
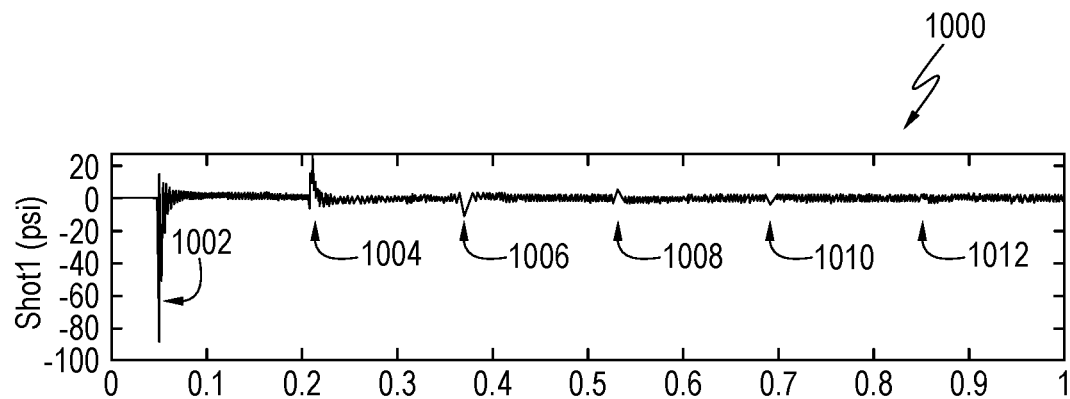
FIG. 10A is a graph showing an exemplary pressure reading corresponding to a perforating gun firing for a perforation cluster.

The rate of loss of energy to the casing wall friction and mechanical vibration coupling increases with tube wave frequency. There are currently-available numerical and analytical models for predicting the attenuation coefficient (A) based on acoustic waveguide theory. Such models treat the wellbore as a layered structure of pressurized water/casing/cement/rock formation. However, due to the unique pressurized conditions during stimulation, the mechanical parameters for each layer are difficult to identify. This makes it challenging to predict the attenuation coefficient (A) accurately based on such models. Therefore, embodiments described herein provide new methods for using field data to directly estimate frequency-dependent attenuation and to then select a suitable frequency band. According to embodiments described herein, the field data are acquired by using the perforating gun firings for each stage as the acoustic source within the subsurface and then measuring the resulting tube waves using the pressure receiver that is positioned close to the wellhead at the surface. Because the pressure receiver and the perforating gun are typically separated by over 10,000 feet when the perforating gun is fired, the acoustic near-field effect is not an issue. In various embodiments, the firing of the perforating gun generates a tube wave that propagates to the surface, reflects back into wellbore again, and then bounces back from the end of the stage. As a result, the first arrivals typically contain broadband tube waves, and the pressure cycles oscillating between the surface and the bottom of the wellbore typically contain lower-frequency tube waves. This concept is depicted in FIG. 10A, which is a graph 1000 showing an exemplary pressure reading corresponding to a perforating gun firing for a perforation cluster. The pressure reading was obtained using the pressure receiver (e.g., pressure gauge) described herein. As shown in FIG. 10A, the pressure reading includes a first pressure pulse 1002 corresponding to the direct arrival tube wave, a second pressure pulse 1004 corresponding to the first roundtrip reflection, a third pressure pulse 1006 corresponding to the second roundtrip reflection, a fourth pressure pulse 1008 corresponding to the third roundtrip reflection, a fifth pressure pulse 1010 corresponding to the fourth roundtrip reflection, and a sixth pressure pulse 1012 corresponding to the fifth roundtrip reflection.

Figure 10B:
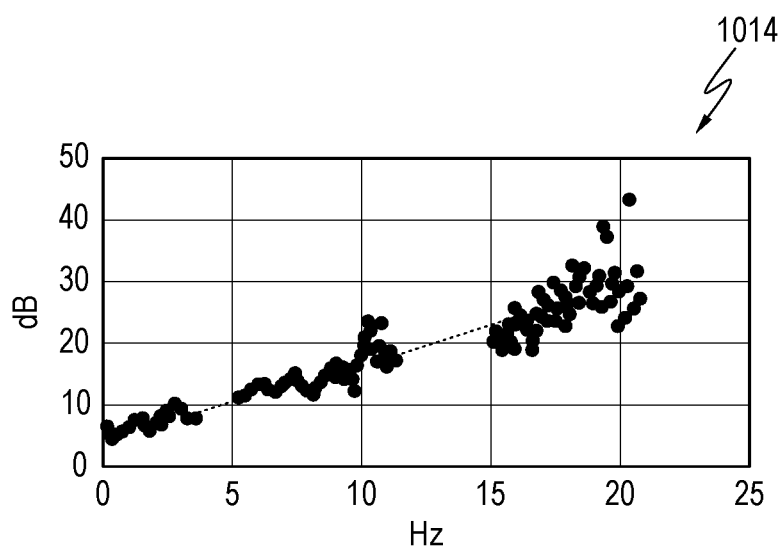
FIG. 10B is a graph showing the total attenuation loss as a function of the frequency for the first roundtrip reflection of the pressure reading shown in FIG. 10A.

In various embodiments, several methods may be used to estimate the tube wave attenuation using the high-frequency pressure data acquired at the surface. One method uses the oscillation of one perforating-gun-generated tube wave. The pressure decay peak from each roundtrip is used to determine the tube wave loss along the wellbore, with the assumption that the reflectors at the surface and the bottom of the stage both reflect 100% of the tube wave without any losses. This assumption results in an overestimate of the attenuation loss, but it is still a reasonable estimate for low-frequency tube waves. Field data (i.e., the field data corresponding to the pressure readings shown in FIG. 10A) show that the attenuation coefficient (A) is about 0.0000755 (1/feet) at 20 Hz. Moreover, attenuation coefficients are even smaller for lower frequencies. As an example, FIG. 10B is a graph 1014 showing the total attenuation loss (in decibels (dB)) as a function of the frequency (in Hz) for the first roundtrip reflection of the pressure reading shown in FIG. 10A.

Another method for estimating tube wave attenuation includes utilizing the tube wave generator in conjunction with a known downhole reflector (such as, for example, a hanger, plug, or other size-change location within the wellbore). In addition, another method including using a calibrated perforating gun, i.e., a perforating gun that is designed with known free-space sound pressure that is located around 10, 50 or 100 meters away from the explosion within the wellbore.

Yet another method for estimating tube wave attenuation utilizes multiple perforating gun firings at different locations along the wellbore. Assuming each perforating gun generates the same power spectral density (PSD) profile, i.e., the same intensity across a frequency band, the PSD difference between two surface recordings (e.g., all the first arrivals of each tube wave) are due to the attenuation loss along the separated section between the two perforating gun locations. As an example, up to 300 Hz signals can be observed from a perforating gun firing at a distance of around 18,000 feet away from the surface relative to the background noise. By comparing signals from two perforating-gun-generated tube waves at distances of around 18,000 feet and around 12,000 feet away from the surface, the attenuation can be estimated along the 6,000-foot distance. A linear estimation (as approximated using a linear relationship between the attenuation coefficient and frequencies in the range of the frequency of interest) concludes that the attenuation coefficient (A) range is around 0.00004 (1/feet) to around 0.00015 (1/feet) in a frequency range of around 50 Hz to around 200 Hz.

Figure 11A:
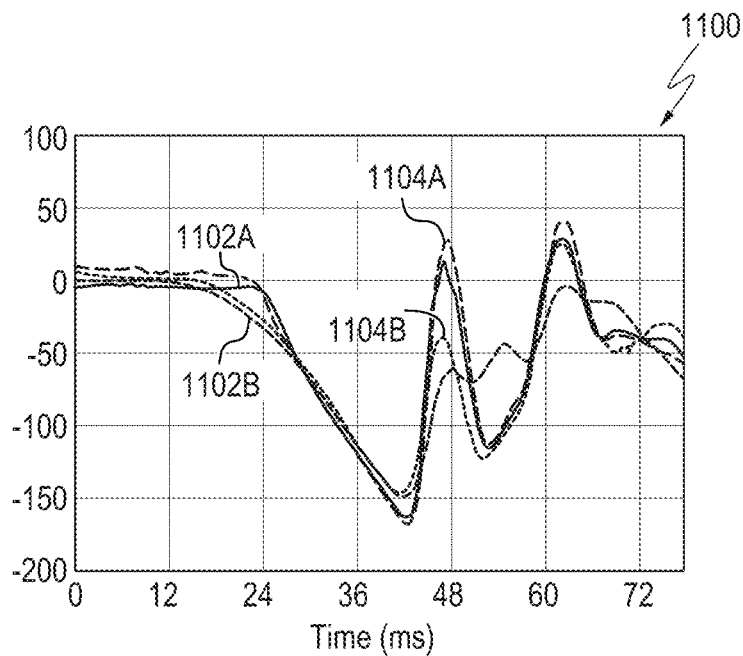
FIG. 11A is a graph showing recorded perforating-gun signals for a stage that is 18,500 feet away from the surface and another stage that is 12,500 feet away from the surface, assuming that there are two perforating gun firings per stage.
Figure 11B:
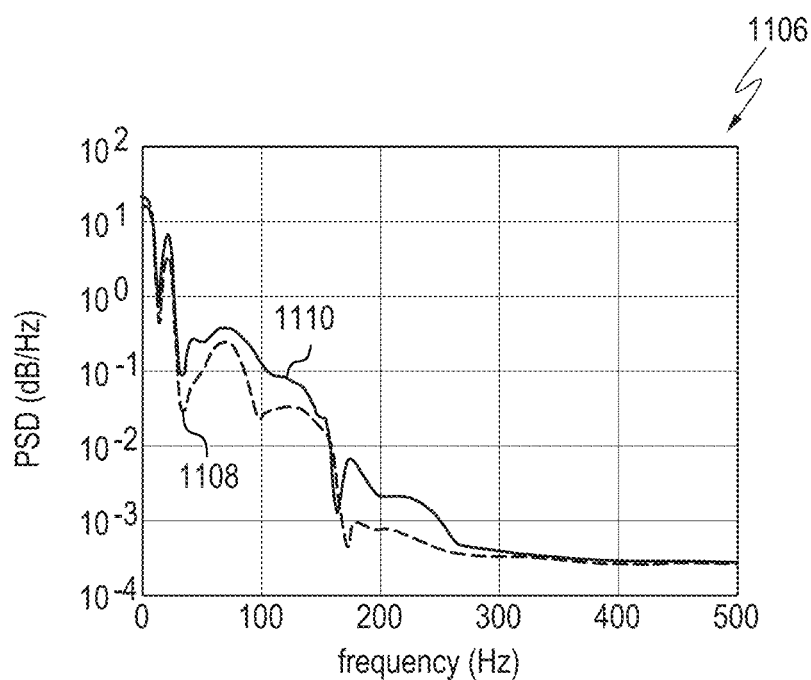
FIG. 11B is a graph showing the power spectral density (PSD) as a function of frequency for the stage that is 12,500 feet away from the surface and the PSD as a function of frequency for the stage that is 18,500 feet away from the surface, assuming that there is one perforating gun firing per stage.

This conclusion agrees with the estimated results obtained using tube wave oscillations according to the first method for estimating tube wave attenuation at low frequency bands, assuming that the perforating gun firings generate the same acoustic signal (i.e., in terms of amplitude and frequency band) at each stage. Such results are graphically depicted in FIGS. 11A, 11B, 12A, 12B, 13A, and 13B. Specifically, FIG. 11A is a graph 1100 showing recorded perforating-gun signals for a stage that is 18,500 feet away from the surface and another stage that is 12,500 feet away from the surface, assuming that there are two perforating gun firings per stage. In particular, the pressure (in psi) as a function of time (in ms) is recorded for the perforating-gun firings for the stage that is 12,500 feet away from the surface, as shown at 1102A and 1102B, and the pressure as a function of time is recorded for the perforating-gun firings for the stage that is 18,500 feet away from the surface, as shown at 1104A and 1104B. Similarly, FIG. 11B is a graph 1106 showing the power spectral density (PSD) (in dB/Hz) as a function of frequency (in Hz) for the stage that is 12,500 feet away from the surface, as shown at 1108, and the PSD as a function of frequency for the stage that is 18,500 feet away from the surface, as shown at 1110, assuming that there is one perforating gun firing per stage.

Figure 12A:
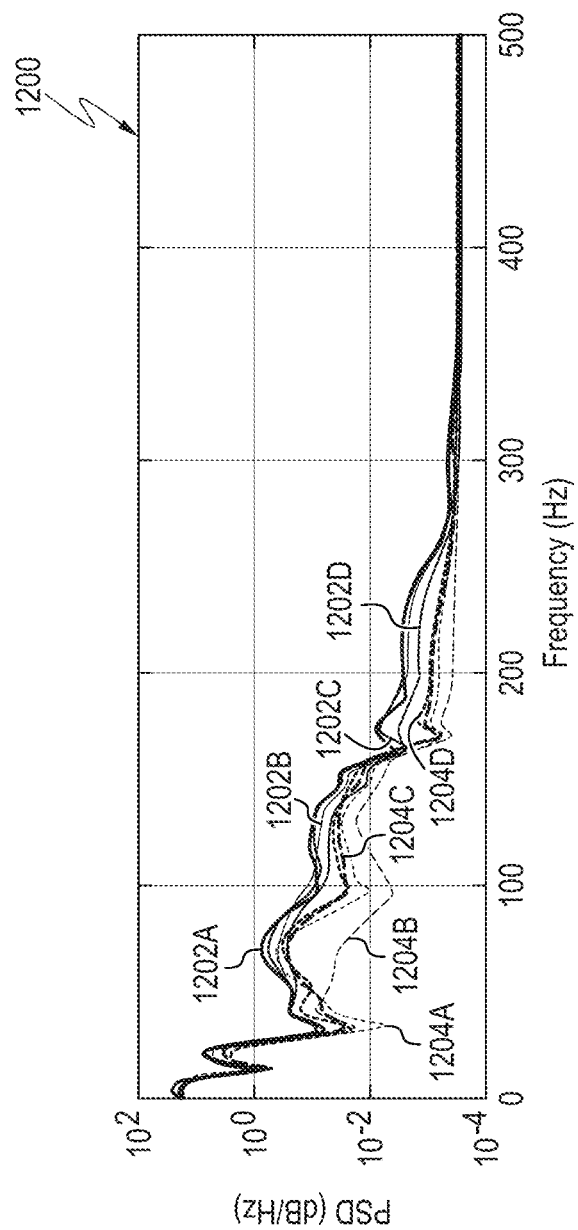
FIG. 12A is a graph showing the PSD as a function of frequency for four perforating gun firings for the stage that is 12,500 feet away from the surface and the PSD as a function of frequency for the stage that is 18,500 feet away from the surface.

FIG. 12A is a graph 1200 showing the PSD (in dB/Hz) as a function of frequency (in Hz) for four perforating gun firings for the stage that is 12,500 feet away from the surface, as shown at 1202A, 1202B, 1202C, and 1202D, and the PSD as a function of frequency for the stage that is 18,500 feet away from the surface, as shown at 1204A, 1204B, 1204C, and 1204D. These first arrivals from the perforating gun firings can be defined as shown below in Equations (6) and (7).

$$\frac{Pressure_{received}}{Pressure_{sent}} = e^{-Ax} \quad (6)$$

$$\frac{PSD_{received}}{PSD_{sent}} = e^{-2Ax} \quad (7)$$

Figure 12B:
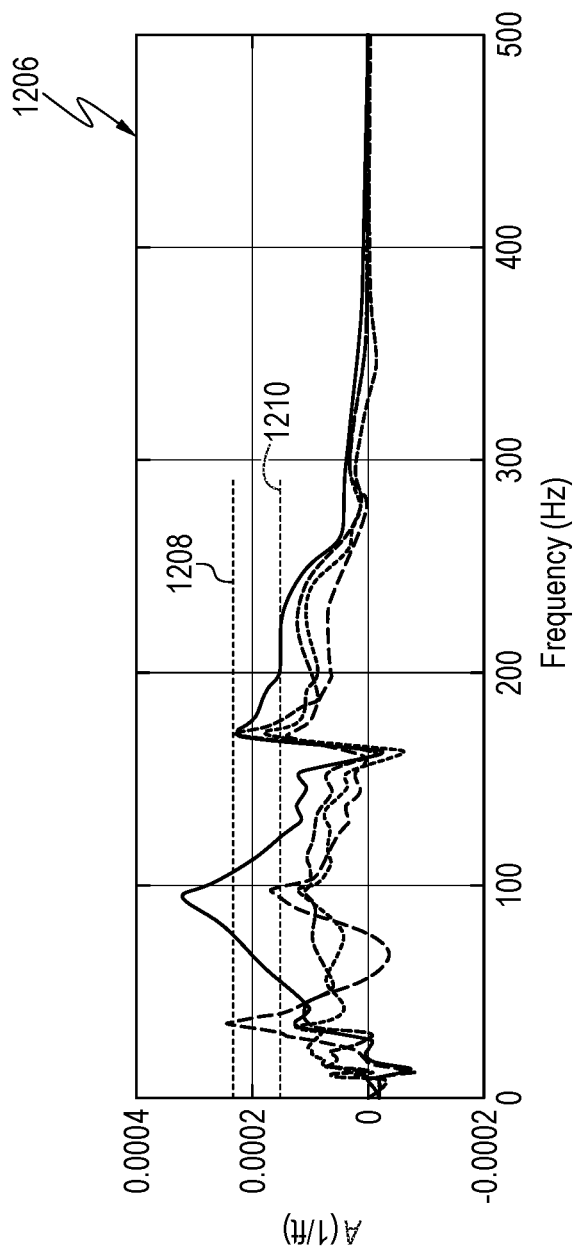
FIG. 12B is a graph showing the attenuation coefficient (A) as a function of frequency, as calculated based on the four pairs of PDSs shown in the graph of FIG. 11A.

Relatedly, FIG. 12B is a graph 1206 showing the attenuation coefficient (A) (in 1/feet) as a function of frequency (in Hz), as calculated based on the four pairs of PDSs shown in the graph 1200 of FIG. 12A. As shown in the graph 1206, the two maximum attenuation coefficients ($A_{max}$) are 0.00023, as indicated by dotted line 1208, and 0.00015, as indicated by dotted line 1210, where the attenuation coefficient is calculated according to Equation (8), where L=5,500 ft.

$$A(f) = \frac{\ln\left(\frac{PSD_{12,500 \, ft \, stage}}{PSD_{18,000 \, ft \, stage}}\right)}{2 \times L} \quad (8)$$

Figure 13A:
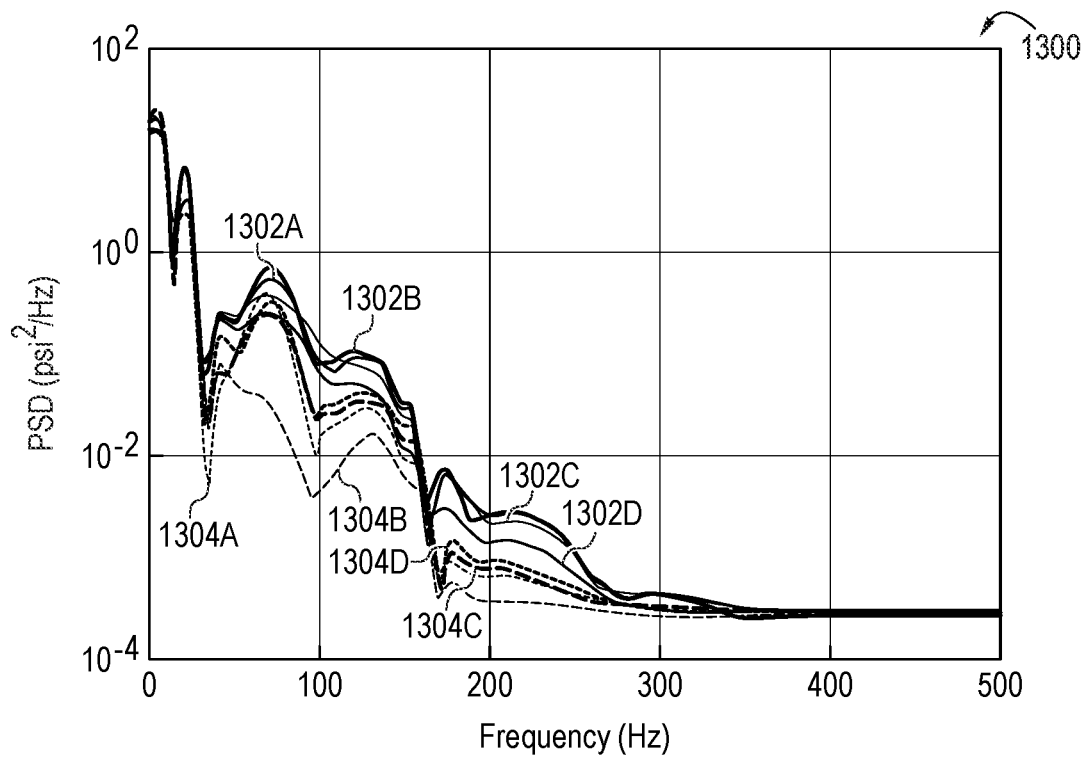
FIG. 13A is a graph showing the power spectral density as a function of frequency for four perforating gun firings for the stage that is 12,500 feet away from the surface and the PSD as a function of frequency for four perforating gun firings for the stage that is 18,500 feet away from the surface.
Figure 13B:
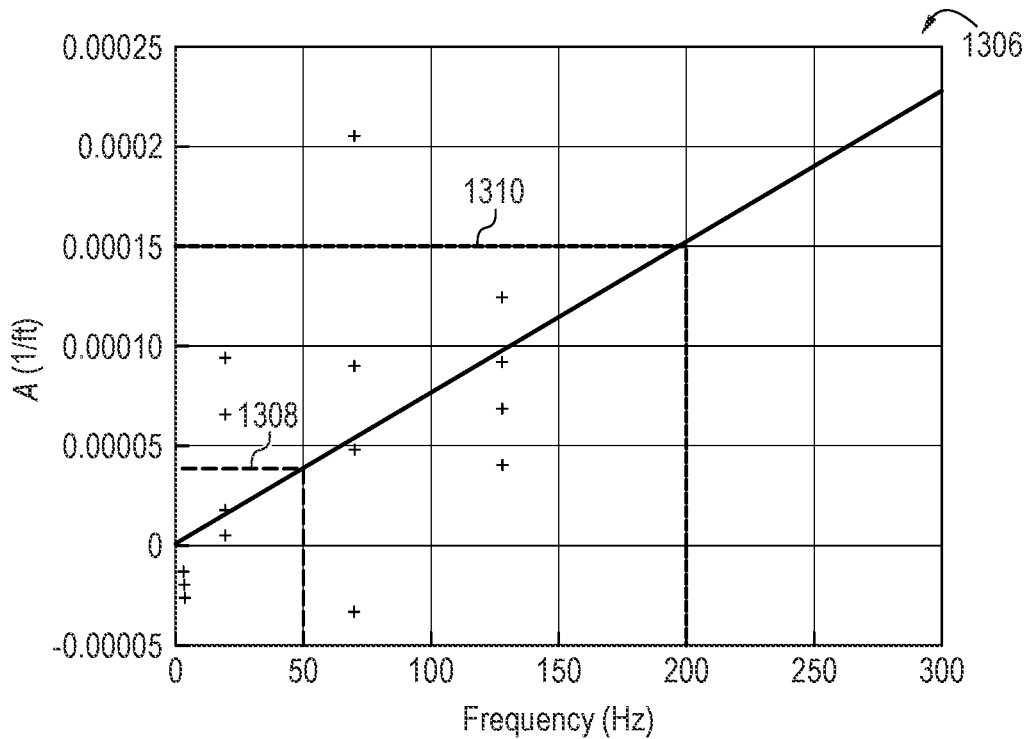
FIG. 13B is a graph showing the attenuation coefficient as a function of frequency, as calculated based on the four pairs of PSDs shown in the graph of FIG. 12A.

FIG. 13A and FIG. 13B further illustrate the frequency dependency of the attenuation coefficient. In particular, FIG. 13A is a graph 1300 showing the power spectral density in ($psi^2$/Hz) as a function of frequency (in Hz) for four perforating gun firings for the stage that is 12,500 feet away from the surface, as shown at 1302A, 1302B, 1302C, and 1302D, and the PSD as a function of frequency for four perforating gun firings for the stage that is 18,500 feet away from the surface, as shown at 1304A, 1304B, 1304C, and 1304D. FIG. 13B is a graph 1306 showing the attenuation coefficient (A) (in 1/feet) as a function of frequency (in Hz), as calculated based on the four pairs of PSDs shown in the graph 1300 of FIG. 13A. The graph 1306 clearly illustrates that the tube wave attenuation is frequency dependent, with lower frequencies having less attenuation and lower spatial resolution. For example, for a frequency of around 50 Hz (as indicated at 1308), the spatial resolution may be around 25 feet. However, for a frequency of 200 Hz (as indicated at 1310), the spatial resolution may be only around 6 feet according to the quarter wavelength resolution rule. Moreover, the attenuation for low-frequency signals (i.e., up to around 125 Hz) can be calculated directly due to the high signal-to-noise ratio, while the attenuation for high-frequency signals can be extrapolated from lower-frequency estimates using a linear approximation.

In addition to in situ characterization of the tube-wave attenuation function of frequency, an in situ characterization of the power spectrum of background noise and receiver precision can be made as well. This can be done by simply acquiring one or more long time windows of continuous pressure data with the receiver arrays installed near the pressure pulse generator and the side offshoot of tubing, while there is no active pressure pulse generation, that is, during a quiescent period in the field. This period should be chosen to reflect the same noise sources as would exist during the pressure pulse generation procedure to be used to characterize cluster reflectivity. The recordings during quiescent periods are then processed for their PSD, and the noise variation as a function of frequency is analyzed in relationship to the expected PSD of the pressure pulse generator to derive a signal-to-noise ratio (SNR), which is itself another function of frequency. Note that this SNR is a ratio of dynamic pressures. This SNR function is fed into the full-waveform inversion to guide the relative weighting across frequencies and to determine a threshold to which the data should no longer be fit, beyond which one would be interpreting noise. The background noise PSD may be further used to modify the design or settings of the pressure pulse generator to achieve a suitable SNR within the frequency band required to resolve individual perforation clusters, given a designated minimum spacing.

Figure 14:
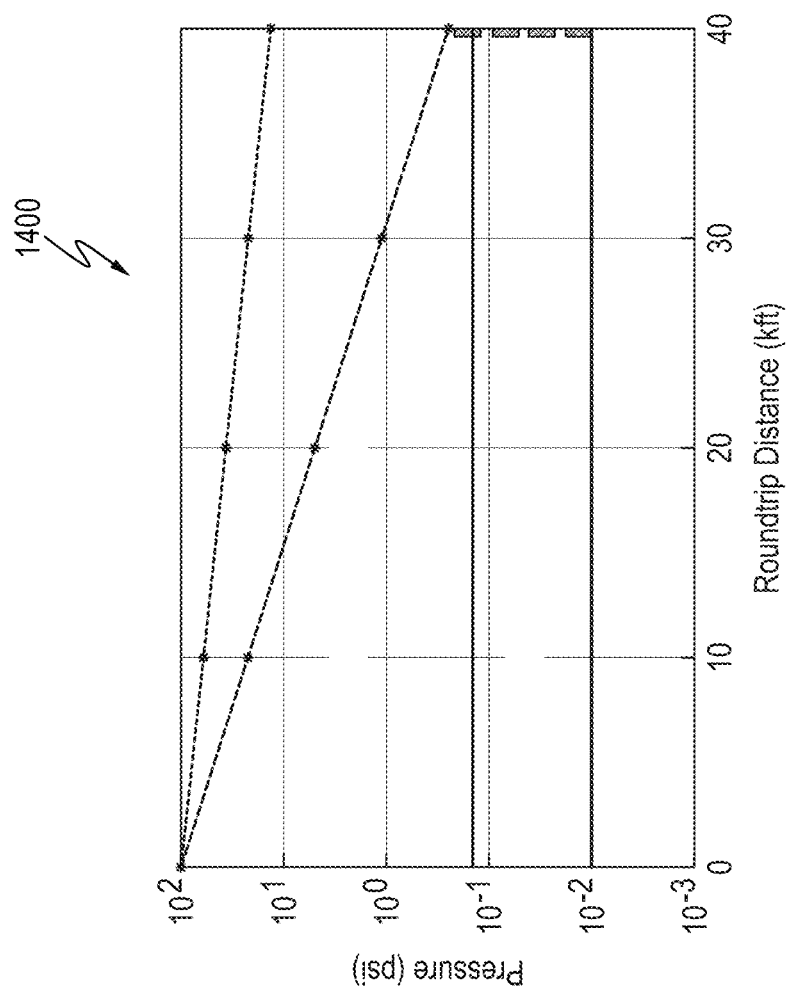
FIG. 14 is a graph depicting the manner in which the power budget required to enable cluster efficiency measurement for remotely-located clusters is estimated according to embodiments described herein.

According to embodiments described herein, the calculated attenuation coefficients along the wellbore can then be used to determine a suitable pressure level for detecting multiple, remotely-located perforation clusters. For example, using a tube wave generator that is configured to generate a pressure of around 100 psi at the surface and pressure receivers with sensitivities of around 10 millipounds of force per square inch (mpsi), a 50-Hz tube wave can be used to detect a reflector with less than around 0.1% reflectivity, while a 200-Hz tube wave can be used to detect a reflector with less than around 5% reflectivity at the toe of a 20,000-foot-long wellbore. As the pressure receiver sensitivity decreases to around 100 mpsi, the 50-Hz tube wave can be used to detect a reflector with less than around 0.1% reflectivity, while a 200-Hz tube wave can be used to detect a reflector with less than around 50% reflectivity in a 20,000-foot-long wellbore (one way). For a shorter wellbore that is around 15,000 feet long, a 200-Hz tube wave can be used to detect a reflector with around 10% reflectivity, with the pressure receiver sensitivity at around 100 mpsi (one way). This is illustrated in FIG. 14, which is a graph 1400 depicting the manner in which the power budget required to enable cluster efficiency measurement for remotely-located clusters is estimated according to embodiments described herein. In particular, the graph 1400 provides an exemplary illustration of the pressure (in psi) that must be generated by the tube wave generator to create a tube wave that is capable of traveling a particular roundtrip distance (in kilofeet (kft))

within the wellbore without experiencing too much attenuation. The graph 1400 shows that the surface-detected tube wave reflection is a result of the reflections from the perforation clusters and the attenuation within the wellbore. In other words, the pressure ($P_{R_{cluster\_n}}$) required to detect all the perforation clusters within a group of n perforation clusters may be approximated by the input pressure ($P_{input}$) multiplied by the total reflectivity (R) multiplied by the wellbore attenuation, as shown in Equation (9).

$$P_{R_{cluster\_n}} = P_{input} \times |R_{cluster_n}(\omega)| \times \Pi_{i=1}^{n-1} (1-|R_{cluster_i}|)^2 \times e^{(-A \times 2L_{cluster\_n})}$$

The reflectivity limitation mentioned above is for a single reflector or an effective reflector consisting of a group of reflectors. However, according to embodiments described herein, individual cluster reflectivity is detected for each perforation cluster in a group of perforation clusters that are each spaced around 10 feet to around 25 feet apart. Accordingly, the interactions among the perforation clusters have to be considered. However, the calculation of tube wave reflections and transmissions can be complicated when considering a group of interacting clusters, and thus a full numerical method for their simulation is not elaborated herein, but such methods of wave simulation are well known by those skilled in the art.

Figure 15A:
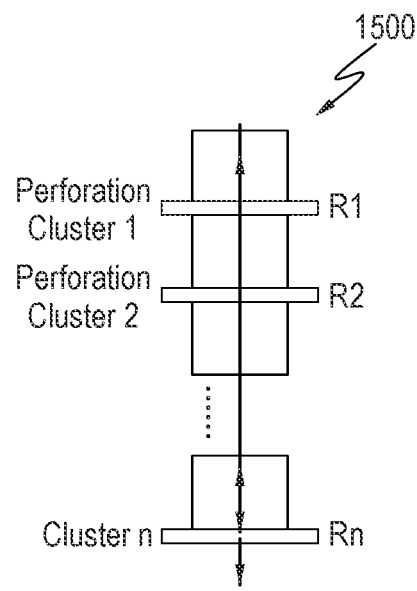
FIG. 15A is a schematic view showing a simplified model of a portion of a wellbore including n perforation clusters.
Figure 15B:
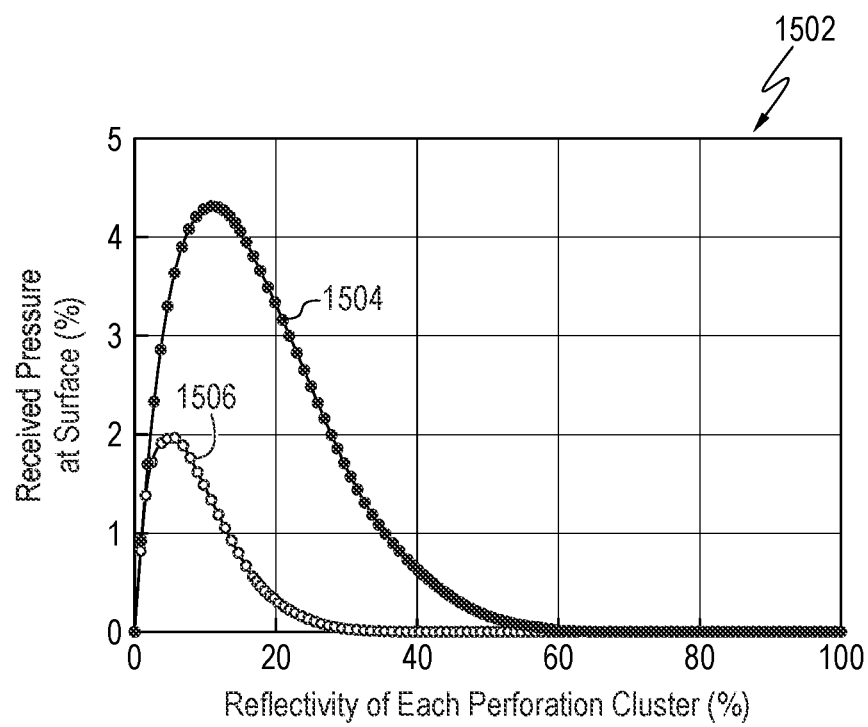
FIG. 15B is a graph showing the percentage of received pressure at the surface as a function of the percentage of reflectivity for each perforation cluster for a wellbore including 5 perforations clusters and a wellbore including 10 perforation clusters.

In general, this problem can be described using a ray tracing method. Specifically, a tube wave propagating through the wellbore is reflected by the first perforation cluster and also transmitted past the first perforation cluster. The transmitted tube wave then encounters subsequent perforation clusters, leading to additional bifurcation of tube waves with different travel paths. This is illustrated by FIGS. 15A and 15B. Specifically, FIG. 15A is a schematic view showing a simplified model 1500 of a portion of a wellbore including n perforation clusters, while FIG. 15B is a graph 1502 showing the percentage of received pressure at the surface as a function of the percentage of reflectivity for each perforation cluster for a wellbore including 5 perforations clusters, as shown at 1504, and a wellbore including 10 perforation clusters, as shown at 1506. According to this simplified model, the reflectivity of each perforation cluster is assumed to be equal, and the reflectivity from each perforation cluster can then be calculated, where the maximum number of detectable perforation clusters depends on the reflectivity of the perforation clusters close to the surface. As an example, for a group of 5 perforation clusters, with a reflectivity of around 12% for each perforation cluster, the $5^{th}$ perforation cluster has the highest reflectivity (i.e., around 4.3%), which means that a 200-Hz, 100-psi tube wave launched from the surface of a 20,000-ft long well can detect about 5 perforation clusters, with a pressure gauge including a sensitivity of around 10 mpsi. As another example, to detect 10 perforation clusters, the pressure gauge would have to be capable of detecting a smaller reflection (e.g., around 2%). However, this example is based on a simplified model without considering the cross-interferences from neighboring reflectors. Once there are variations in reflectivity among the group of perforation clusters and the interferences from neighboring reflectors are not negligible, the full waveform inversion method described herein can be used to estimate the reflectivity from each perforation cluster.

In general, there are several available options for maximizing the tube wave illumination power when the reflectivity is low (e.g., less than around 20%). As an example, the tube waves may be used to detect cluster efficiency for a smaller number of perforation clusters early in the pad phase. As another example, higher-frequency tube waves may be used.

Turning now to the details of the spatial resolution criterion for selecting a suitable frequency band for the tube waves described herein, a higher-frequency tube wave offers a higher spatial resolution for differentiating closely-spaced perforation clusters. The theoretical limit is based on a quarter wavelength resolution rule, which is that the tube wave can detect two perforation clusters separated by a distance of a quarter of its dominant wavelength. For example, the wavelength of a tube wave with peak power at 200 Hz is approximately 25 ft, assuming a sound speed of 5,000 ft/s. Therefore, the tube wave can be used to detect two perforation clusters with a separation of 6.25 ft apart (i.e., 25/4=6.25). It is also possible that the tube wave may provide a higher resolution than predicted by the quarter wavelength resolution rule, particularly if the two reflection points are strongly interacting (causing higher-order reflections) or if the reflected signal between the two reflectors is strong enough to go beyond one cycle of reflections. In that case, the full waveform inversion method described herein can be used to account for those extra signals together with the first cycle of reflection.

Given that higher-frequency tube waves are attenuated more than lower-frequency tube waves, the selection of a suitable frequency band for the tube waves involves a trade-off between the spatial resolution requirement and the ability to detect remotely-located perforation clusters in a long wellbore. In various embodiments, a suitable frequency band is around 50 Hz to around 200 Hz for resolving perforation clusters with a separation distance of around 6 ft to around 25 ft, which is generally suitable for wellbores with lengths of less than around 20,000 ft.

With regard to the reflector differentiation criterion for selecting a suitable frequency band, there are at least two reasons to tune the tube wave frequency band. The first reason is that, if high-frequency wave attenuation along the wellbore is not a limiting factor, a higher-frequency tube wave can probe more perforation clusters compared to a lower-frequency tube wave. This is due to the fact that reflectivity from a given joint reduces (thus increasing the transmitted energy) as the tube wave frequency increases. As a result of reduced reflectivity, the transmission of broadband tube waves in the wellbore becomes larger, enabling the detection of perforation clusters that are further away from the top of the wellbore. This is in contrast to the limitations associated with low-frequency tube waves, where the reflected signal is dominated by reflections at the first several perforation clusters closest to the acoustic source. To calculate the uniformity index, the reflectivity or hydraulic conductivity of each perforation cluster needs to be measured using the same tube wave frequency. The uniformity index across multiple frequencies or multiple frequency bands can then be compared to characterize the cluster efficiency for the perforation clusters within each stage. Additionally, hydraulic conductivity of individual perforation clusters across multiple frequencies or multiple frequency bands can be compared to characterize fracture compliance with respect to dynamic fluid intrusion by the fitting of parameterized models that simulate hydraulic behavior of fractures.

The second reason is that the frequency-dependent reflectivity follows different trends for different types of reflectors and, thus, the reflectivity versus the frequency can be used to differentiate between the different types of reflectors. For example, as the tube wave frequency is increased, the reflectivity increases for washouts, while the reflectivity remains relatively constant for casing joints and decreases for perforation clusters.

It is worth noting that the techniques described herein rely on the reflectivity at each perforation cluster/fracture interface for cluster efficiency characterization. Such reflectivities provide a surrogate measurement for comparing the fluid volume distribution within each perforation cluster in each stage. Because tube waves have limited penetration depths in the fractures, this type of surrogate measurement may be more useful than attempting to individually probe the fluid volume within each perforation cluster. Moreover, this approach also allows the tube wave generator and pressure receivers to be non-intrusively positioned at the wellhead, rather than intrusively lowered into the wellbore.

According to embodiments described herein, the tube wave generator and the pressure receivers may be specifically selected to improve signal quality at the selected frequency band (i.e., to provide a high SNR). In various embodiments, the tube wave generator is a controllable acoustic source that is capable of generating tube waves with waveforms that contain the desired frequency components. For example, suitable waveforms may include a Ricker or Ormsby waveform, or a Hanning windowed-sine waveform or a Chirp waveform with the selected frequency band.

The received signal quality can be improved using multiple methods. As an example, a combination of amplification and frequency-selective filtering methods (e.g., hardware- and/or software-based methods) can be used to remove background noises produced by the operation of various equipment, such as pumps. As another example, offset pressure receives or sensors can be deployed at different locations in the same line to enhance the signal quality through cross-correlation, deconvolution, interferometry, and statistical analysis methods (e.g., hardware- and/or software-based methods), as described further herein.

Data Preparation Using Interferometry of Multiple Pressure Measurements in Space or Time According to embodiments described herein, prior to performing the full waveform inversion on the data recorded by the pressure receivers, the data are processed using interferometric techniques. Such interferometric techniques are enabled, at least in part, by the positioning of the pressure receivers into multiple arrays (e.g., two arrays of three pressure receivers or two arrays of two pressure receivers) separated by a predetermined minimum distance and connected by a T-junction or other suitable connection point at the wellhead. An exemplary embodiment of this configuration was described with respect to FIGS. 1B and 2. In this exemplary embodiment, the spacing between the pressure receivers within each array is held to a constant distance, $\Delta$. However, those skilled in the art will appreciate that different distances may be used between the pressure receivers within each array (e.g., $\Delta_1$, $\Delta_2$, $\Delta_3$), and yet the same interferometric principles still apply. A more general set of equations than those outlined below would simply be applied, as the equations below have been simplified for the sake of brevity.

Figure 16:
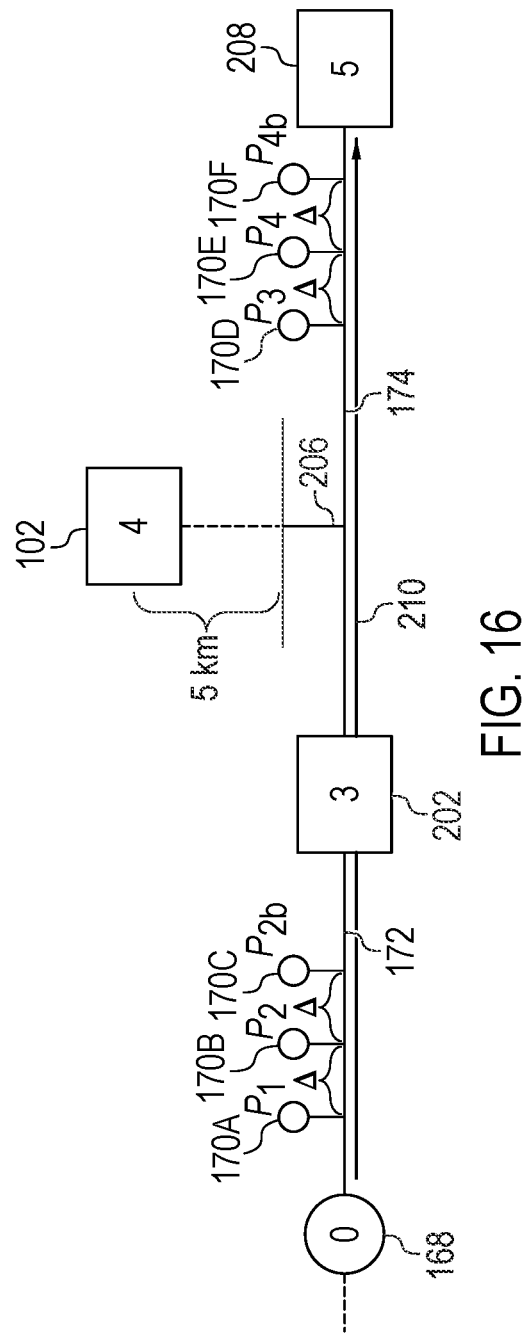
FIG. 16 is a simplified schematic view showing a linear representation of an exemplary configuration of the cluster efficiency measurement equipment described with respect to FIG. 1B.

FIG. 16 is a simplified schematic view showing a linear representation of an exemplary configuration of the cluster efficiency measurement equipment described with respect to FIG. 1B. Specifically, FIG. 16 depicts the tubing 172 including the pressure pulse generator 168 and the first array of pressure receivers 170A, 170B, and 170C (i.e., $p_1$, $p_2$, and $p_{2b}$), as well as the offshoot of tubing 174 including the second array of pressure receivers 170D, 170E, and 170F (i.e., $p_3$, $p_4$, and $p_{4b}$) and the end cap 208. As shown in FIG. 16, each pressure receiver 170A-F within each array may be equally-spaced or, in other words, separated by a predetermined distance, $\Delta$. The tubing 172 and the offshoot of tubing 174 are separated by the cumulative Christmas tree portion 202 of the wellhead 142, and the offshoot of tubing 174 is coupled to the wellhead 142 via the T-junction 206. Moreover, the top-side tubing 172 and the offshoot of tubing 174 are hydraulically coupled to each other and the wellbore 102 within the subsurface. Note that the cumulative Christmas tree portion in FIG. 16 represents a conglomeration of the effects produced by the multiple topside units in FIG. 2 (e.g., the Christmas tree top portion 200, the Christmas tree middle portion 202, and the Christmas tree connection portion 204). Each of the boxes in FIG. 16, that is, the boxes labeled as 102, 202 and 208, represent a complicated series of junctions causing reflections, and each may be completely mathematically characterized by complex-valued, frequency-dependent transfer functions for reflection and transmission. In the following paragraphs, for example, one of these reflection transfer functions is denoted by $\bar{\mathcal{R}}$; the "bar" decorator denotes two-way travel-time and attenuation associated with the distance, h, between a downstream reflector and the one before it, or between the downstream reflector and some other point of reference, where $\bar{\mathcal{R}} = E(2h)\mathcal{R}$. Also, note that the T-junction 206 to the side offshoot of tubing 174 is purposefully placed close to the wellbore such that there are no interfering reflection points related to the top-side apparatus between the T-junction and the wellbore.

Interferometric Recovery of the Green Function Between a Triplet of Pressure Receivers To perform interferometry using this configuration, Equations (10), (11), (12) and (13) may first be used to solve for $E(\Delta)$, a Green (or by some conventions, Green's) function for tube wave travel over a distance, $\Delta$, within a homogeneous section of tubing between pressure receivers. Equations (10) and (11) represent the use of interferometry over different receiver pairs within the triplet to recover the effective reflectivity of the pressure pulse generator 168 and all other reflection points beyond it, to the left of the circle labeled '0' in FIG. 16. That is, using any pair of pressure receivers and Equation (10), the effective reflection transfer function of all reflectors occurring on the opposite side of the source of the pressure pulse from the receiver pair can be recovered. Note that $p(z_1)$ denotes a dynamic pressure measured for a given angular frequency, $\omega$, at the location $z_1$ relative to the source location, which is at the origin. The pressure measurement, $p(z_2)$, is therefore measured at location $z_2$, which is a distance, $\Delta$, further from the source location than $z_1$.

$$\bar{\mathcal{R}}_0 = E(2z_2)\frac{p(z_1) - E(-\Delta)p(z_2)}{E(\Delta)p(z_2) - p(z_1)} \tag{10}$$

Equation (10) will be referred to as the original interferometry equation according to the present techniques, as will be described further in the upcoming paragraphs. According to Equation (10), two pressure receivers, $p_1$ and $p_2$, located at $z_1$ and $z_2$, respectively, are utilized. Equation (10) is analogous to another interferometry equation that simply uses the other combination of two pressure receivers in the triplet, $p_2$ and $p_{2b}$, as given by Equation (11).

$$\bar{\mathcal{R}}_0 = E(2z_2)\frac{E(\Delta)p(z_2) - p(z_{2b})}{p(z_{2b}) - E(-\Delta)p(z_2)} \tag{11}$$

To solve for the Green function, a combination of Equations (10) and (11) may then be rearranged and reduced, as shown in Equation (12), where the definition of $E(\Delta)$ is described further below.

$$p(z_2) = \gamma[p(z_1) + p(z_{2b})]/2 \qquad (12)$$

Solving for the complex coefficient, $\gamma$, for a range of angular frequencies, $\omega$, then provides the wavespeed and attenuation function versus frequency, in the parameter s (slowness), as shown in Equation (13).

$$\gamma = \sec(\omega s \Delta) \qquad (13)$$

A full spectral (frequency-dependent) estimate of s provides all information about dispersion and attenuation in the tubing that connects the pressure receivers within one array. The spacing of pressure receivers, here given by $\Delta$, determines the range of frequencies for which a robust estimate of s may be made, in light of noisy signals, $p(z_i)$. For this reason, it may prove necessary to place more than three receivers, so that many more estimates of $\gamma$ may be made involving a wide range of spacing, e.g., $\Delta$, $2\Delta$, $3\Delta$, etc. The greater the range of spacing with which the estimates of $\gamma$ are made, the greater the range of frequencies for which the resulting s estimates will be accurate.

For example, given a single spacing length, $\Delta$, for a receiver triplet, the upper frequency bound for accurate estimates of s (slowness) using Equations (12) and (13) is approximately reached when the signal wavelength is less than twice as long as the receiver separation, resulting in Equation (14).

$$f_{ub} = \frac{1}{2\Re[s]\Delta} \qquad (14)$$

On the other hand, the lower frequency bound for accurate estimates of s using Equations (12) and (13) is found when the maximum difference in magnitude of a signal measured at two offset locations emerges above the noise amplitude, $\varepsilon$, and is expressed by Equation (15).

$$f_{lb} = \frac{1}{2\pi\Re[s]\Delta}\cos^{-1}\left(1 - \frac{\varepsilon^2}{2}\right) \qquad (15)$$

Given a specified frequency band, defined by $f_{min}$ and $f_{max}$, for the pressure pulse generator waveform(s), and a desire to perform interferometry and to interpret data within that entire usable band, Equations (14) and (15) can be used to design receiver arrays that have enough different separation lengths, between $\Delta_{min}$ and $\Delta_{max}$, such that interferometric estimates from multiple triplets, each attributed their own $f_{lb}$ and $t_{ub}$, can be combined to achieve accurate interferometric data within the full desired frequency band. Rearranging Equations (14) and (15), receiver array specifications are obtained, where such specifications are set by the bandwidth of the pressure pulse generator in Equations (16) and (17).

$$\Delta_{max} = \frac{1}{2\Re[s]f_{max}} \qquad (16)$$

$$\Delta_{min} = \frac{1}{2\pi\Re[s]f_{min}}\cos^{-1}\left(1 - \frac{\varepsilon^2}{2}\right) \qquad (17)$$

Note, that the exact same form of Equation (12) is used to solve for the Green function within the array of pressure receivers in the offshoot of tubing, by substituting $p(z_4)$ for $p(z_2)$, $p(z_3)$ for $p(z_1)$ and $p(z_{4b})$ for $p(z_{2b})$. Thereby, specific Green functions for each triplet of receivers may be estimated and used in the interferometric calculations described in the following paragraphs.

Figure 17A:
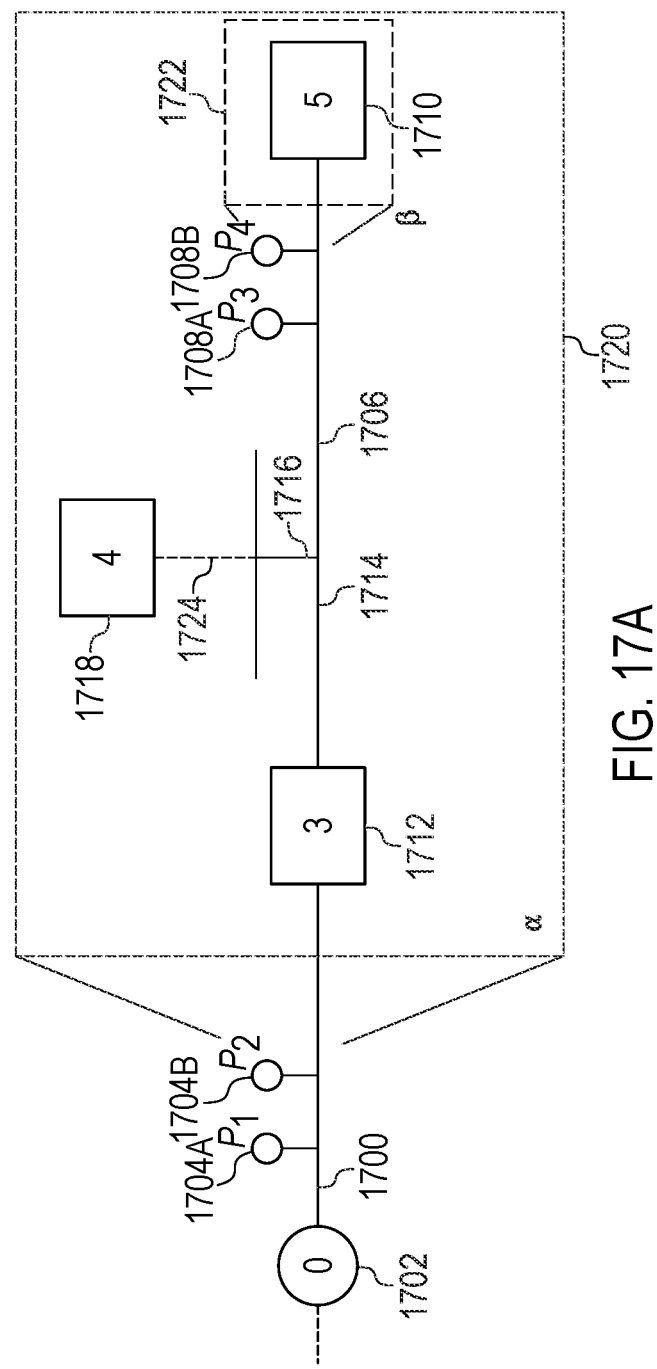
FIG. 17A is a simplified schematic view showing a linear representation of an exemplary configuration of the cluster efficiency measurement equipment described herein.

Interferometric Recovery of Reflection Transfer Functions by a Receiver Pair within a Single Array FIG. 17A is a simplified schematic view showing a linear representation of an exemplary configuration of the cluster efficiency measurement equipment described herein. Specifically, FIG. 17A depicts a tubing 1700 including a pressure pulse generator 1702 and a first array of at least two pressure receivers 1704A and 1704B (i.e., $p_1$ and $p_2$), as well as an offshoot of tubing 1706 including a second array of at least two pressure receivers 1708A and 1708B (i.e., $p_3$ and $p_4$) along with an end cap 1710. The tubing 1700 and the offshoot of tubing 1706 are separated by a cumulative Christmas tree portion, or other topside infrastructure that may cause reflections, 1712 of the wellhead 1714, and the offshoot of tubing 1706 is coupled to the wellhead 1714 via a T-junction 1716. Moreover, the tubing 1700 and the offshoot of tubing 1706 are hydraulically coupled to each other and the wellbore 1718 (and the corresponding subsurface reflectors) within the subsurface, with the offshoot of tubing 1706 being positioned close to the top of the wellbore 1718 where it intersects the ground surface. Again, in FIG. 17A, the boxes labeled as 1712, 1718, and 1710 each represent a complicated series of junctions causing reflections, and each may be completely mathematically characterized by complex-valued, frequency-dependent transfer functions for reflection and transmission.

As shown in FIG. 17A, data recorded by the pressure receivers 1704A and 1704B (i.e., $p_1$ and $p_2$) within the first array are used to perform interferometry which characterizes the effective reflectivity of a first portion of the system, $\alpha$, as represented by box 1720 in FIG. 17A, while a second portion of the system, $\beta$, as represented by box 1722 in FIG. 17A, is characterized using the same interferometric operations but on data recorded by the pressure receivers 1708A and 1708B (i.e., $p_3$ and $p_4$) within the second array. Calculations needed to solve for $\alpha$ and $\beta$ are given by Equation (18) and (19), respectively.

$$E(2z_2)[p(z_2) - E(-\Delta)p(z_1)] = \alpha[E(\Delta)p(z_2) - p(z_1)] \qquad (18)$$

$$E(2z_4)[p(z_4) - E(-\Delta)p(z_3)] = \beta[E(\Delta)p(z_4) - p(z_3)] \qquad (19)$$

Equations (12), (18), and (19) amount to least-squares regressions for complex coefficients $\gamma$, $\alpha$, and $\beta$, involving noisy data, $p(z_1), p(z_2), p(z_{2b}), p(z_3)$, $p(z_4)$ and $p(z_{4b})$. An independent regression is performed for each frequency in the data, thus frequency-dependent functions for $s(\omega)$, $\alpha(\omega)$, and $\beta(\omega)$ may be formed by collating the results of multiple regresssions. Since noisy data show up in the ordinate and abscissa of these regressions, some form of Total Least Squares is necessary.

Figure 17B:
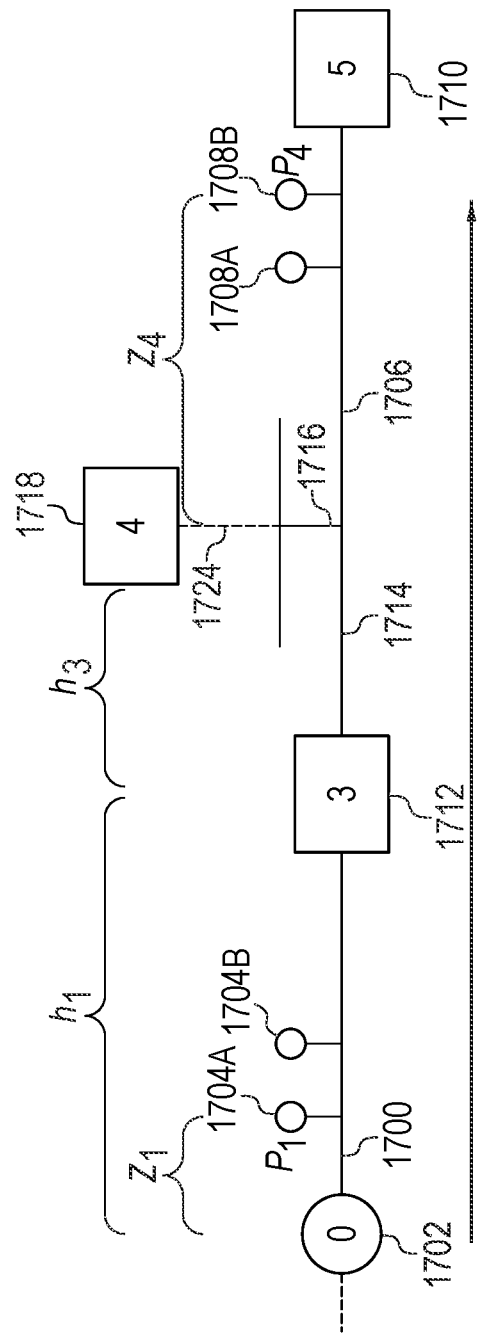
FIG. 17B is a schematic view of the linear representation of the exemplary configuration of the cluster efficiency measurement equipment described with respect to FIG. 17A, depicting the manner in which a new interferometric measure can be determined using pressure receivers from different arrays.

Mitigation of Top-Side Artifacts Using Interferometry of Two Pressure Receivers from Opposing Arrays FIG. 17B is a schematic view of the linear representation of the exemplary configuration of the cluster efficiency measurement equipment described with respect to FIG. 17A, depicting the manner in which a new interferometric measure can be determined using pressure receivers from different arrays arranged on opposite sides of topside infrastructure 1712 (represented by the "black-box" transfer function labeled with a '3' in FIG. 17B, and characterized mathematically by a complex-valued frequency-dependent effective reflection and transmission functions) that may introduce deleterious or unwanted effects in the data. In particular, FIG. 17B shows the manner in which the configuration of the equipment can be controlled to minimize artifacts within the signals represented by the recorded data. This is further defined by Equation (20), which relates to the new interferometric measure, $\delta$, that can be estimated using interferometric techniques on two pressure receivers, one from each array (i.e., in this case, $p_1$ and $p_4$). Equation (20) represent another regression for the new measure, $\delta$, which makes use of the previously-estimated interferometric measures, $\alpha$ and $\beta$, estimated by Equations (18) and (19), as well as, potentially, Green functions $E(z_i)$, estimated by Equations (12) and (13).

$$E(z_1)p(z_4)+\alpha E(-z_1)p(z_4)=\delta[E(z_4)p(z_1)+\beta E(-z_4)p(z_1)] \quad (20)$$

An analysis of the physics of the system can show that the interferometric measure of $\delta$, again a complex-valued frequency-dependent function, estimated by multiple regressions using Equation (20) relates to other reflection, transmission, and wave propagation components of the system, as described for a given frequency by Equation (21).

$$\delta = \frac{E(h_1)E(h_3)\mathcal{T}_{3*}^d(1+R_4^d)}{1-\bar{\mathcal{R}}_5 R_4^u - E(2h_3)\bar{\mathcal{R}}_{3*}^u[R_4^d - \bar{\mathcal{R}}_5(R_4^u R_4^d - T_4^u T_4^d)]} \quad (21)$$

In Equation (21), $E(h_1)$ and $E(h_3)$ symbolize tube wave propagation (Green functions) for a single frequency along lengths of tubing $h_1$ and $h_3$, shown in FIG. 17B. $\mathcal{R}_{3*}^u$ and $\mathcal{T}_{3*}^d$ are the effective up-going reflection and down-going transmission coefficients, respectively, related to the "black-box 3" 1712 representing the unwanted topside infrastructure response. Note that this black box clumps together the responses of boxes 1, 2, and 3 shown in FIG. 2, which are denoted using the * in Equation (21). $R_4^u$, $R_4^d$, $T_4^d$, and $T_4^u$, are the up-going and down-going reflection and transmission coefficients related to the T-junction 1716, which incorporate within them the effective reflection coefficient for the sub-surface "black-box 4" 1718, mathematically written as $\bar{\mathcal{R}}_4$. The most accurate estimate of the full-frequency dependence of $\bar{\mathcal{R}}_4$ on its own, with no other overprinting reflections, is the goal of all of the interferometric calculations; it contains the entirety of available knowledge about the subsurface which could be carried by a tube wave. Finally, $\bar{\mathcal{R}}_5$ is the symbol representing the effective reflection coefficient of the end-cap apparatus represented as "black-box 5" 1710 in FIG. 17B. Our interferometric calculations for $\beta$ provide an estimate of $\bar{\mathcal{R}}_5$.

Impedance Matching of the Side Offshoot Tubing to the Wellhead and Down-Hole Tubing For ideal interferometric conditions, the end cap of the offshoot of tubing, represented by the "black-box 5" 1710, would be perfectly absorbing, i.e., $\bar{\mathcal{R}}_5 \equiv 0$, resulting in the cleanest time-series possible. However, this case may not be feasible with realistic materials. Therefore, as an alternative, the offshoot of tubing 1706 may be impedance matched to the wellhead 1714 and downhole tubing 1724, that is, the down-going wave experiences the same impedance on the upstream side of the T-junction 1716 as it does on the downstream side. Given that the wellhead tubing is very close in diameter to the downhole tubing, this amounts to the offshoot of tubing having a much smaller inner diameter than the other two tubes joined at the T-junction 1716. The side offshoot tubing diameter is chosen so as to minimize the reflections from the offshoot end-cap escaping out of the side offshoot at the T-junction; this point is further elaborated in a later section. Preferably, the side offshoot tubing should have an inner diameter that is no more than 10% of the wellhead tubing. For example if the wellhead tubing and the downhole tubing have inner diameters of about 5 inches, the side offshoot tubing should have an inner diameter of about ½ inch.

Pressure Transients due to Tube Waves and Reflection Transfer Function Recovery

The following elaborates on the mathematical description of the manner in which the down-line reflection transfer functions can be estimated using multi-receiver interferometric techniques. In particular, the complex Fourier coefficient for a pressure transient, $p(z_o)$, from a traveling tube wave can be expressed according to Equation (22) for a single frequency, $f=\omega/(2\pi)$, of energy.

$$p(z_o) = \frac{E(|z_o|)\psi}{1-\bar{\mathcal{R}}_{,0}\bar{\mathcal{R}}_{,s}}(1+\bar{\mathcal{R}}_{,0})[1+E(-2z_o)\bar{\mathcal{R}}_{,s}] \quad (22)$$

In Equation (22), $z_o$ is an observation location down-line of the source, in terms of offset relative to the source location; $E(z)$, the tube-wave Green function for a homogeneous region, is a phase advance and attenuation operator pertaining to the wave travel-time due to wave slowness, s (i.e., whose real part is the inverse of velocity, and whose imaginary part relates to attenuation), over distance z; $E(z) =\exp(2\pi i f s z)$; $\psi$ is the complex-valued source signature (relating to amplitude and phase) for the given frequency; and $\bar{\mathcal{R}}_0$ and $\bar{\mathcal{R}}_s$ are complex-valued effective reflection coefficients for the upper (above the source position) and lower (below the source position, closer to the observation location) series of system junctions, respectively. For example, $\bar{\mathcal{R}}_s$ encapsulates all the reflection behavior for casing collars, end-caps, and perforation clusters that occur "downstream" and down-hole of the source location, while $\bar{\mathcal{R}}_0$ encapsulates all the reflection behavior of casing collars, T-junctions, end-caps, etc., that occur "upstream" of the source location.

Given observations of the same pressure transient but at two distinct locations along the travel path, $p(z_1)$ and $p(z_2)$, Equation (22) shows that it is possible, by deconvolving two offset pressure responses, to solve for the effective reflection transfer function of the downstream system, which is common to both observation locations, using Equation (23). The solution of Equation (23) will require an independent means for estimating the Green function of tube wave travel between the two receivers, $E(z_2-z_1)\equiv E(\Delta)$.

$$\bar{\mathcal{R}}_s = E(2z_2)\frac{p(z_1)-E(z_1-z_2)p(z_2)}{E(z_2-z_1)p(z_2)-p(z_1)} \quad (23)$$

The independent means for estimating the Green function may be performed using a triplet of receivers and the interferometric regression procedure outlined by Equations (12) and (13). It is also assumed that this Green function involves transmission only, that is, no reflection points exist between the two receivers.

In Equation (23), being expressed in the frequency domain, the division amounts to a deconvolution of two time-domain signals, each a difference between one pressure observation and the other, after performing a time shift related to the relative offset of the two observation points in the line of the tube-wave travel path. As will be appreciated by those skilled in the art, Equation (23) and others to follow are not applied directly on noisy field data through deconvolution. Instead, a form of robust regression, such as the Total Least Squares and/or Multi-variate Errors in Variables algorithms are applied, where, for example, to solve for $\bar{\mathcal{R}}_s$, the numerator and denominator on the right-hand side of Equation (23) serve as ordinate and abscissa, respectively, as exemplified by Equations (12), (18), (19) and (20).

By recovering $\bar{\mathcal{R}}_s$, all the effects of the source signature, correlated noise sources, and the reflection events created by structures (e.g., collars, T-junctions, end-caps, etc.) occurring upstream of the source location are removed. $\bar{\mathcal{R}}_s$ therefore only contains information about the downstream collars, perforations clusters, end-caps, and sources of noise. This quantity may then present an easier data set for the setup of an inversion targeted on recovering the downstream (i.e., subsurface) system parameters only, that is, primarily the compliance factors of individual perforation clusters.

With more than two sensors arrayed with finite offsets between them, an estimate like the one shown in Equation (23) may be made from each pair, and those estimates may then be averaged to reduce contamination from noise. With such multi-receiver arrays, methods for robust transfer function estimation (such as, for example, the multi-variate errors in variables (MEIV) method) may be used to solve Equation (23).

Where Equation (22) involved a pressure measurement location downstream of the source (or, in other words, closer to the perforation clusters), Equation (24) involves a pressure measurement location upstream of the source (again at a single frequency), but where $z_o$ is now a negative number as it relates to a receiver offset above a source location.

$$p(z_o) = \frac{E(|z_o|)\psi}{1 - \bar{\mathcal{R}}_0 \bar{\mathcal{R}}_s}(1 + \bar{\mathcal{R}}_s)[1 + E(2z_o)\bar{\mathcal{R}}_0] \quad (24)$$

With two pressure observations above the source location, it is possible to solve for the effective reflectivity of the upstream (i.e., topside) system according to Equation (25).

$$\bar{\mathcal{R}}_0 = E(-2z_2)\frac{p(z_1) - E(z_2 - z_1)p(z_2)}{E(z_1 - z_2)p(z_2) - p(z_1)} \quad (25)$$

Again, an independent means for estimating the Green function between the two receivers is required. If an independent measurement of the source signature, $\psi$, is also available, such measurement may be combined with the estimate from Equation (25) and the original pressure measurement from Equation (24) to solve for the effective reflectivity of the downstream system, as shown in Equation (26). In addition, an independent estimate of the Green function between the source location and the first or second receiver is needed, as may be achieved with a triplet of receivers and Equations (12) and (13).

$$\bar{\mathcal{R}}_s = \frac{p(z_o) - E(|z_o|)\psi[1 + E(2z_o)\bar{\mathcal{R}}_0]}{p(z_o)\bar{\mathcal{R}}_0 + E(|z_o|)\psi[1 + E(2z_o)\bar{\mathcal{R}}_0]} \quad (26)$$

Recovery of Changes in Reflection Transfer Functions Using Time-Lapsed Measurements, Part I If only pressure measurements upstream of the source are available, such that Equation (23) cannot be used to solve for the effective reflectivity of the target zone (downstream system) containing the perforation clusters, there is an alternative route which uses time-lapsed up-line measurements. First, it is assumed that Equation (25) may be used at one time instance to estimate $\bar{\mathcal{R}}_0$, and it is assumed that $\bar{\mathcal{R}}_0$ doesn't change from one time instance to the other. The only quantity that is assumed to change between time instances is $\bar{\mathcal{R}}_s$, as in, $\bar{\mathcal{R}}_s$ is measured before and after the perforation cluster/fracture treatment. Therefore, the initial measurement (at time $t=t_1$) is written as $p_1(z_o)$ with reflectivity $r_1 \equiv \bar{\mathcal{R}}_s|_{t=t_1}$, and the time-lapsed measurement (at time $t=t_2$) is written as $p_2(z_o)$ with the modified reflectivity $r_2 \equiv \bar{\mathcal{R}}_s|_{t=t_2}$. All other quantities in Equation (24) remain equal, such that the cross-normalized time-lapsed data difference is provided as shown in Equation (27).

$$\frac{1}{(1+\bar{\mathcal{R}}_0)}\frac{p_2(z_o) - p_1(z_o)}{\sqrt{p_1(z_o)p_2(z_o)}} = r_2 - r_1 + O(r_1^2) + O(r_2^2) \quad (27)$$

In the case where $r_i \ll 1$, the cross-normalized difference on the right-hand side of Equation (27) delivers a good estimate of the time-lapsed difference in reflectivity of the down-line system, that is, $r_2 - r_1$. This case would imply high levels of energy attenuation over the length of the wellbore before reaching the opposing (down-line) end-cap, which is a likely scenario.

Mitigation of Top-Side Artifacts Using Multiple Arrays and an Impedance-Matched T-Junction If the pressure receiver(s) are not in line with the tube wave generator(s) and the down-line system containing the perforation clusters, that is, if the pressure receiver(s) are placed in an offshoot of tubing connected to the main wellbore tubing by a T-junction, there is an alternative route that uses at least two arrays of pressure receivers, with each array of pressure receivers including at least two pressure receivers but preferably at least three pressure receivers. One array is then placed in the offshoot of tubing (i.e., not in the same line connecting the tube wave generator with the downstream system of perforation clusters), and the other array may be placed close to the tube wave generator, e.g., between the tube wave generator and the offshoot of tubing containing the other array. In sequence relative to primary tube wave travel, denoted by the long horizontal arrow in FIG. 17B, there is the source 1702, then the first array of pressure receivers 1704A and 1704B, then some arbitrary topside apparatus 1712, then a T-junction 1716 containing the offshoot tubing with the second array of pressure receivers 1708A-B, and finally the downstream wellbore containing the perforation clusters 1718. The location of the T-junction and side offshoot of tubing should be as close to the downstream wellbore as possible so that there are minimal interfering reflection points between the T-junction and the subsurface; that is, downstream of the T-junction there should be no more top-side apparatus, only reflection points related to the subsurface properties of interest. Critically, the pressure receivers within each array must be offset by a minimal distance, subject to the bandwidth of the generated acoustic energy, such that the individual recordings may be differentiated within computer precision capabilities and above the level of the background noise. Additionally, it is preferable that there are no reflector points between the pressure receivers within each array. However, there may be reflector points close to and on either side of each array of pressure receivers.

Given the aforementioned conditions, Equation (28) may be used to remove many of the effects of the source signature and top-side (up-line) reflection points in order to recover a time-series of synthetic recordings more directly relevant to the down-line system of perforation clusters.

$$\delta := \frac{E_1(z_o)p_4(z_o) + \alpha E_1(-z_o)p_4(z_o)}{E_4(z_o)p_1(z_o) + \beta E_4(-z_o)p_1(z_o)} \quad (28)$$

In Equation (28), $\alpha$ is an estimate using Equation (18), but equal in form to the right-hand sides of Equation (23) or Equation (25), calculated with the first array of pressure receivers near the tube wave generator, whereas $\beta$ is an estimate using Equation (19), but equal in form to the right-hand sides of Equation (23) and Equation (25), and calculated with the second array of pressure receivers in the offshoot of tubing attached by a T-junction to the main tubing.

If the hydraulic conductivity of the tubing upstream of the T-junction is symbolized as $\kappa_1$, the hydraulic conductivity of the tubing downstream of the T-junction (which includes the tubing in the wellbore) is symbolized as $\kappa_3$, and the hydraulic conductivity of the tubing of the side offshoot is symbolized as $\kappa_2$, an impedance-matched T-junction may be specified as one, where $\kappa_1 > \kappa_3$ and $\kappa_2 = \kappa_1 - \kappa_2 << \kappa_1$. Note that the hydraulic conductivity is related to the tubing and fluid properties by $$\kappa = \frac{\pi d^2}{4\rho_f c}.$$

For example, the offshoot tubing may have an inner diameter, d, much smaller than that of the main top-side and wellbore tubing to ensure its hydraulic conductivity is much smaller than that of the wellbore tubing. With the above specification for impedance matching at the T-junction, the following limits in Equations (29), (30), (31), and (32) are approached.

$$T_4^d \to 1 + \bar{\mathcal{R}}_4 \quad (29)$$

$$R_4^d \to \bar{\mathcal{R}}_4 \quad (30)$$

$$R_4^u \to -1 \quad (31)$$

$$T_4^u \to 0 \quad (32)$$

With an impedance matched T-junction, it can be shown that Equation (33) approximates the estimate made by Equations (20) or (28). Equation (33) is a simplification of Equation (21), which takes into account an impedance-matched T-junction.

$$\delta \approx \frac{\psi_{eff}(1 + \bar{\mathcal{R}}_{sub})}{(1 + \bar{\mathcal{R}}_5)(1 - \bar{\mathcal{R}}_{top} \bar{\mathcal{R}}_{sub})} \quad (33)$$

In Equation (33), $\bar{\mathcal{R}}_{sub} = \bar{\mathcal{R}}_4$ represents the unknown effective reflectivity of the subsurface (down-line) system of perforation clusters, whereas $\bar{\mathcal{R}}_{top} = E(2h_3) \mathcal{R}_{3*}^u$ represents the unknown reflectivity of the top-side system of reflectors generated between the location of the first array of pressure receivers near the source and the T-junction. In addition, $\psi_{eff} = E(h_1)E(h_3) \mathcal{T} T_{3*}^d$ represents a new, unknown, effective source signature, which may be estimated from the $\delta$ time-series by the first (direct) arrival of pressure energy. Finally, the approximation represented by Equation (33) shows that, since $\beta \approx \bar{\mathcal{R}}_5$ is already used to produce the estimate $\delta$, a new measure, $\delta_{IM}$, which uses $\beta$ to remove the effects of the offshoot tubing's end reflectors when given an impedance-matched (IM) T-junction, may be estimated as shown in Equation (34).

$$\delta_{IM} := (1 + \beta)\delta \approx \frac{\psi_{eff}(1 + \bar{\mathcal{R}}_{sub})}{(1 - \bar{\mathcal{R}}_{top} \bar{\mathcal{R}}_{sub})} \quad (34)$$

Analogous to Equation (18), (19) and (20), one would solve another regression for $\delta_{IM}$ shown by using Equation (35).

$$(1+\beta)[E(z_1)p(z_4) + \alpha E(-z_1)p(z_4)] = \delta_{IM}[E(z_4)p(z_1) + \beta E(-z_4)p(z_1)] \quad (35)$$

The estimates of $\delta$ or, if applicable, $\delta_{IM}$, after the application of a band-limited source signature and an inverse Fourier transform, present new synthetic time-series of recordings from the processing of real data. These synthetic recordings have fewer artifacts from unknown reflectors related to the top side system, i.e., $\bar{\mathcal{R}}_{top}$. Thus, it is easier to pass these derived data into a full waveform inversion to extract the reflectivity or hydraulic conductivity of the individual perforation clusters, e.g., information contained in $\bar{\mathcal{R}}_{sub}$.

Figure 18A:
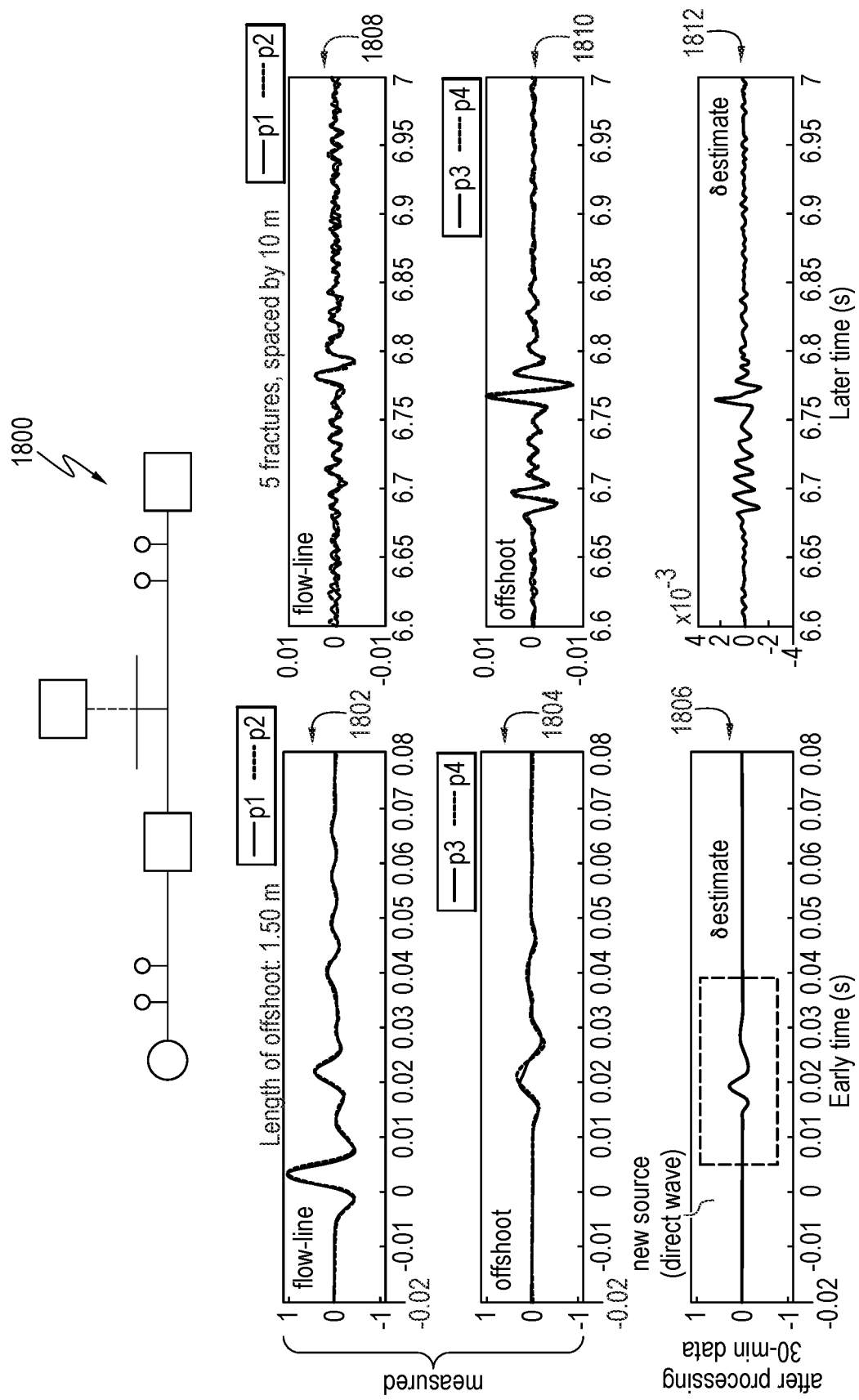
FIG. 18A includes a simplified schematic view of wellbore, along with several graphs showing δ estimates for an exemplary embodiment.
Figure 18B:
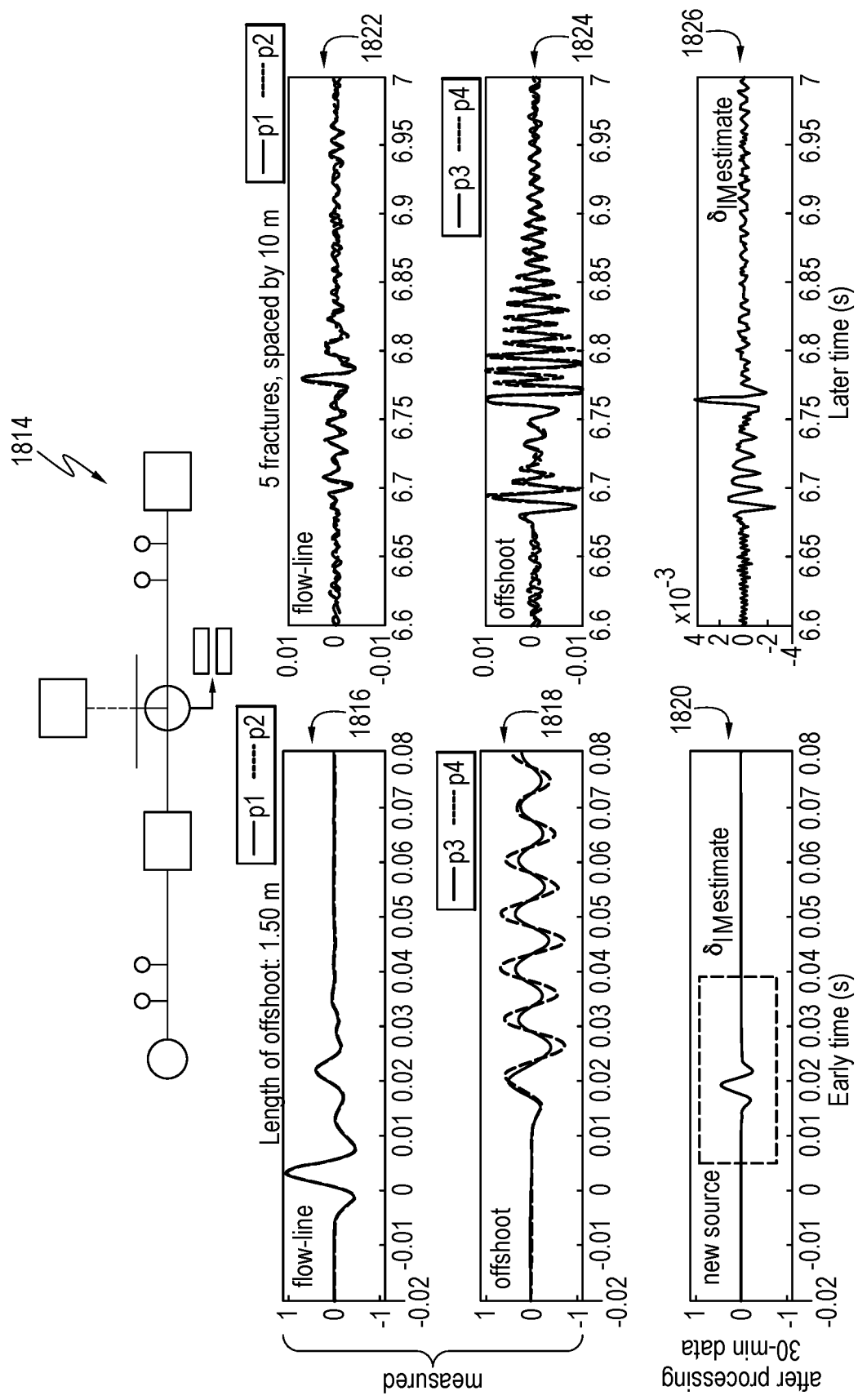
FIG. 18B includes a simplified schematic view of wellbore, along with several graphs showing $\delta_{IM}$ estimates for an exemplary embodiment.

FIG. 18A includes a simplified schematic view of wellbore 1800, along with several graphs 1802, 1804, 1806, 1808, 1810, and 1812 showing $\delta$ estimates for an exemplary embodiment. Similarly, FIG. 18B includes a simplified schematic view of wellbore 1814, along with several graphs 1816, 1818, 1820, 1822, 1824, and 1826 showing $\delta_{IM}$ estimates for an exemplary embodiment. According to the exemplary embodiments shown in FIGS. 18A and 18B, a model with five identical downhole perforation clusters is utilized, with the first perforation cluster being 5 km away from the T-junction that is connected to the offshoot of tubing. Note that, in the figures, graphs 1802, 1808, 1816, and 1822 correspond to the main flow-line including the receiver array that is positioned proximate to the pressure pulse generator, while graphs 1804, 1810, 1818, and 1824 correspond to the offshoot of tubing that is connected to the main flowline by a T-junction. Moreover, graphs 1802, 1804, 1808, 1810 and graphs 1816, 1818, 1822, and 1824 correspond to the measured data, while graphs 1806 and 1812 and graphs 1820 and 1826 correspond to the $\delta$ and $\delta_{IM}$ estimates, respectively, after the data are processed.

Recovery of Changes in Reflection Transfer Functions Using Time-Lapsed Measurements, Part II Similar to the previous section regarding time-lapsed pressure transient measurements, time-lapse principles can be used with the interferometric products when dealing with the situation of a complicated and unknown top-side apparatus. Here, it is assumed that the measurement configuration is as needed to perform $\delta_{IM}$ interferometry, which includes an impedance-matched T-junction. The measurements are taken in two epochs such that a robust ($\delta_{IM}$ estimate can be made both before and after a subsurface stimulation activity, such as hydraulic fracturing through perforation clusters. Thus, there will be an interferometric estimate $\tau_1 := \delta_{IM}|_{t=t_1}$, from measurements taken at time $t_1$ before hydraulic fracturing, and an interferometric estimate $\tau_1 := \delta_{IM}|_{t=t_1}$ from measurements taken at time $t_2$ after hydraulic fracturing.

Let a trimmed interferometric estimate for the $i^{th}$ time epoch be denoted as $\hat{\tau}_i$. To get this, the time series within a single epoch, derived by an inverse Fourier transform of $\tau_i$, is trimmed such that only the first set of reflection arrivals is included and later arrivals involving multiple reflections off the top-side apparatus are thereby rejected; the later reflections are represented by the denominator in Equation (34). In effect, $\hat{\tau}_i$ is then achieved by Fourier transforming this trimmed time-series. Note that this whole process can be completed entirely in the frequency-domain by a subsampling of frequencies followed by interpolation. This trimming process should produce a new quantity with multiples removed represented in frequency-domain by Equation (36).

$$\hat{\tau}_i \approx \psi_{eff}(1 + \bar{\mathcal{R}}_{sub}|_{t=t_i}) \quad (36)$$

It is next assumed that $\psi_{eff}$ does not change from one epoch to the next, since the top-side apparatus does not change. One can then estimate $\psi_{eff}$ by extracting the early-time direct (first) arrival of energy within the $\delta_{IM}$ time series from any epoch. Again, $\psi_{eff}$ may be extracted by trimming in time, followed by padding the time series with zeros, or by subsampling in frequency-domain, followed by interpolation. With the estimated quantities $\hat{\tau}_i$ and $\psi_{eff}$, and by analyzing the approximation of Equation (36), another useful approximation can be derived, as given by Equation (37), which makes use of the trimmed interferometric estimates from two different time epochs.

$$\frac{\hat{\tau}_2 - \hat{\tau}_1}{\hat{\tau}_1 - \psi_{eff}} \approx \frac{\mathcal{R}_{sub}|_{t=t_2}}{E(2h_s)\mathcal{R}_{sub}|_{t=t_1}} - 1 \quad (37)$$

In Equation (37), the distance $h_s$ is the length of the stage containing the multiple perforation clusters being probed by the two epochs of pressure measurements, the starting point being the first perforation cluster and the ending point being the toe-plug. Equation (37) assumes that the first epoch, being pre-fracturing, does not have any reflectors within this stage length, and that the only reflector contributing to $\mathcal{R}_{sub}|_{t=t_1}$ is the toe-plug (end-cap) at the end of the stage or well. Note that the "bar" decorator has been removed from the $\mathcal{R}_{sub}$ in Equation (37), relative to previous equations that had $\bar{\mathcal{R}}_{sub}$. This is because the time-lapse measurements allow for the removal of the effect of two-way travel-time (phase shift) and attenuation over the long distance (e.g., the 5-km offset between 206 and 102 in FIG. 16) between the T-junction and the first reflection point (preferably the first perforation cluster) in the subsurface for either epoch. All that is left is the two-way travel-time and attenuation effect of the length of the stage, e.g., $E(2h_s)$. Equation (37) provides the relative difference in subsurface reflectivity between the pre- and post-fracturing epochs.

Exemplary Process Flow Description for Interferometric Techniques

Figure 19:
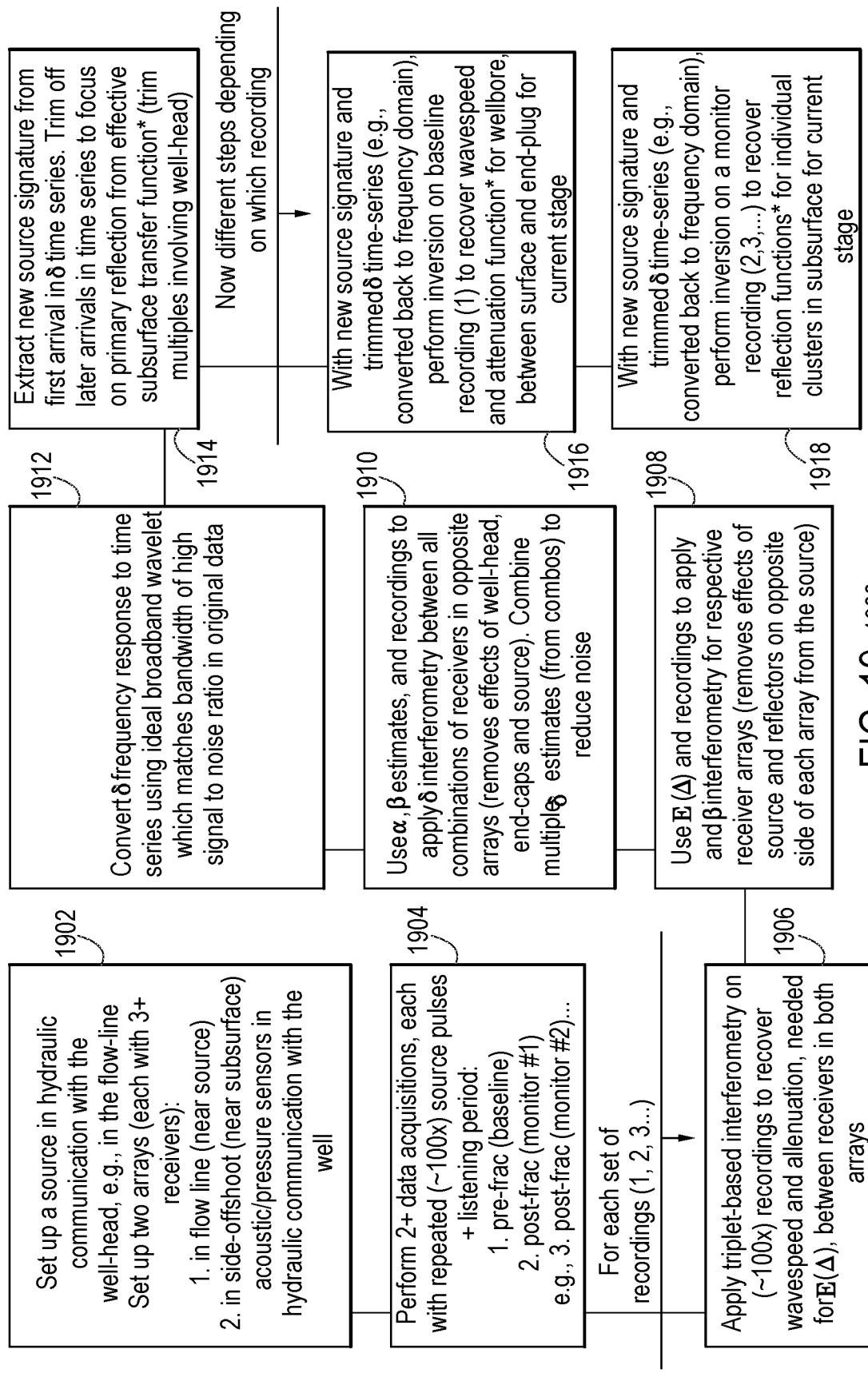
FIG. 19 is a process flow diagram showing an exemplary method for using interferometric techniques to determine the reflection functions for each perforation cluster/fracture interface within a stage of a wellbore.

FIG. 19 is a process flow diagram showing an exemplary method 1900 for using interferometric techniques to determine the reflection functions for each perforation cluster/fracture interface within a stage of a wellbore. The method 1900 begins at block 1902, the source (i.e., the pressure pulse generator) is set up such that it is in hydraulic communication with the wellhead (e.g., in the flowline). In addition, two arrays of pressure receivers are set up, with each array including three pressure receivers. One array is set up in the flowline (near the source), while the other array is set up in a side offshoot (as near to the subsurface as possible), with all the pressure receivers (i.e., acoustic/pressure sensors) being in hydraulic communication with the wellbore. At block 1904, two or more data acquisitions are performed, each with repeated (e.g., around 100 times) source pulse generation and listening periods. The number of repeated pulse generation and listening periods may be driven by the ambient noise levels and the desired signal resolution. For example, with a shorter wellbore section leading to the perforation clusters, there will be less attenuation and greater SNR and, thus, fewer than 100 repeat measurements may be sufficient. Regardless of the number of repeat measurements, this iterative measurement process may be performed once pre-fracturing (e.g., as a baseline measurement) and two or more times post-fracturing for the particular stage of the wellbore, to assess fracture growth, dilation, or contraction.

The following is then performed for each set of recordings (i.e., the pre-fracturing recordings and each of the post-fracturing recordings). First, at block 1906, triplet-based interferometry is applied on the recordings to recover the wavespeed and attenuation, or slowness functions s, which are needed to determine $E(\Delta)$ between the pressure receivers in both arrays, as described herein. At block 1908, $E(\Delta)$ is used, in combination with the recordings, to apply $\alpha$ and $\beta$ interferometry for the respective pressure receiver arrays, which removes the effects of the pressure pulse generator and the reflectors that lie on opposite sides of each array from the pressure pulse generator. At block 1910, the $\alpha$, $\beta$ estimates, in combination with the raw pressure recordings, are used to apply $\delta$ (or $\delta_{IM}$ with an impedance-matched T-junction) interferometry between all the combinations of receivers in opposite arrays, which removes the effects of the wellhead infrastructure lying between the two receiver arrays, the effective reflections end cap(s), and the source. Multiple $\delta$ (or $\delta_{IM}$) estimates derived from different receiver combinations are then combined to reduce the amount of noise in the resulting frequency response. At block 1912, the $\delta$ (or $\delta_{IM}$) frequency response is converted to a time-series using an ideal broadband wavelet that matches the bandwidth of the high signal-to-noise ratio in the original data, and an inverse Fourier transform. At block 1914, a new source signature is extracted from the first arrival in the $\delta$ (or $\delta_{IM}$) time-series. The latest arrivals in the time-series are trimmed off to focus on the primary reflection from the effective subsurface transfer function (e.g., complex-valued functions of frequency). This amounts to trimming of multiple (higher-order) interactions between the topside infrastructure and the subsurface.

The method then proceeds to block 1916 or 1918, depending on which recording is being considered. At block 1916, with the new source signature and the trimmed $\delta$ (or $\delta_{IM}$) time-series (which may be converted back to the frequency domain, depending on inversion preference), an inversion is performed on the baseline recording to recover the wavespeed and attenuation function for the wellbore, between the surface and the end-plug for the current stage. At block 1918, with the new source signature and the trimmed $\delta$ (or $\delta_{IM}$) time-series for post-fracturing recordings (e.g., converted back to the frequency domain), an inversion is performed to recover reflection functions (i.e., complex reflection coefficients that vary with frequency) for individual perforation clusters (e.g., the perforation cluster/fracture interfaces, which are representative of the perforation clusters and corresponding fractures themselves) for the current stage.

Cluster Efficiency Measurement Workflow

All casing joints, valves, and other downhole equipment within the wellbore are potential acoustic impedance boundaries that can act as reflectors for tube waves. Moreover, the reflected tube waves become even more complicated once there are perforation clusters and corresponding fractures connected to the wellbore. Therefore, one strategy for cluster efficiency measurement is to carry out measurements several times during the pad phase of the stimulation, when no proppants are present in the wellbore. Such measurements may include a baseline measurement with only casing joints, valves, and piping at the surface and a plug at the end of the stage. This baseline measurement helps to determine the tube wave response in the wellbore before the fractures are formed, including reflections from all casing joints, valves, and other downhole equipment, as well as the sound speed and attenuation in the wellbore under pressure. In addition, several other measurements may be taken over time to track the perforation cluster growth into the fractures. Such measurements are then interpreted using the full waveform inversion method described herein to infer the reflectivity from all the reflectors in the wellbore.

The success of this strategy relies on the use of a tube wave generator that is a controllable/repeatable acoustic source for generating tube waves in the wellbore, as well as pressure receivers that are highly sensitive and able to reliably detect the differences caused by the different perforation clusters/fractures. Each measurement can be taken with multiple waveforms with different frequencies. Suitable waveforms include, for example, Ricker, Ormsby, Hanning windowed-sine wave, Chirp, and others. In addition, multiple individual frequencies or a continuous frequency band may be used. Moreover, measurements taken using different waveform and/or frequency options can be cross compared to determine information about the cluster efficiency for each stage, as described herein. Furthermore, as described herein, it is preferable to take all measurements under static conditions without any flow (or with a minimal amount of flow) in the wellbore since this helps to eliminate flow-induced reduction of the perforation clusters' reflectivities.

Inversion Engine for the Cluster Efficiency Measurement

Figure 20:
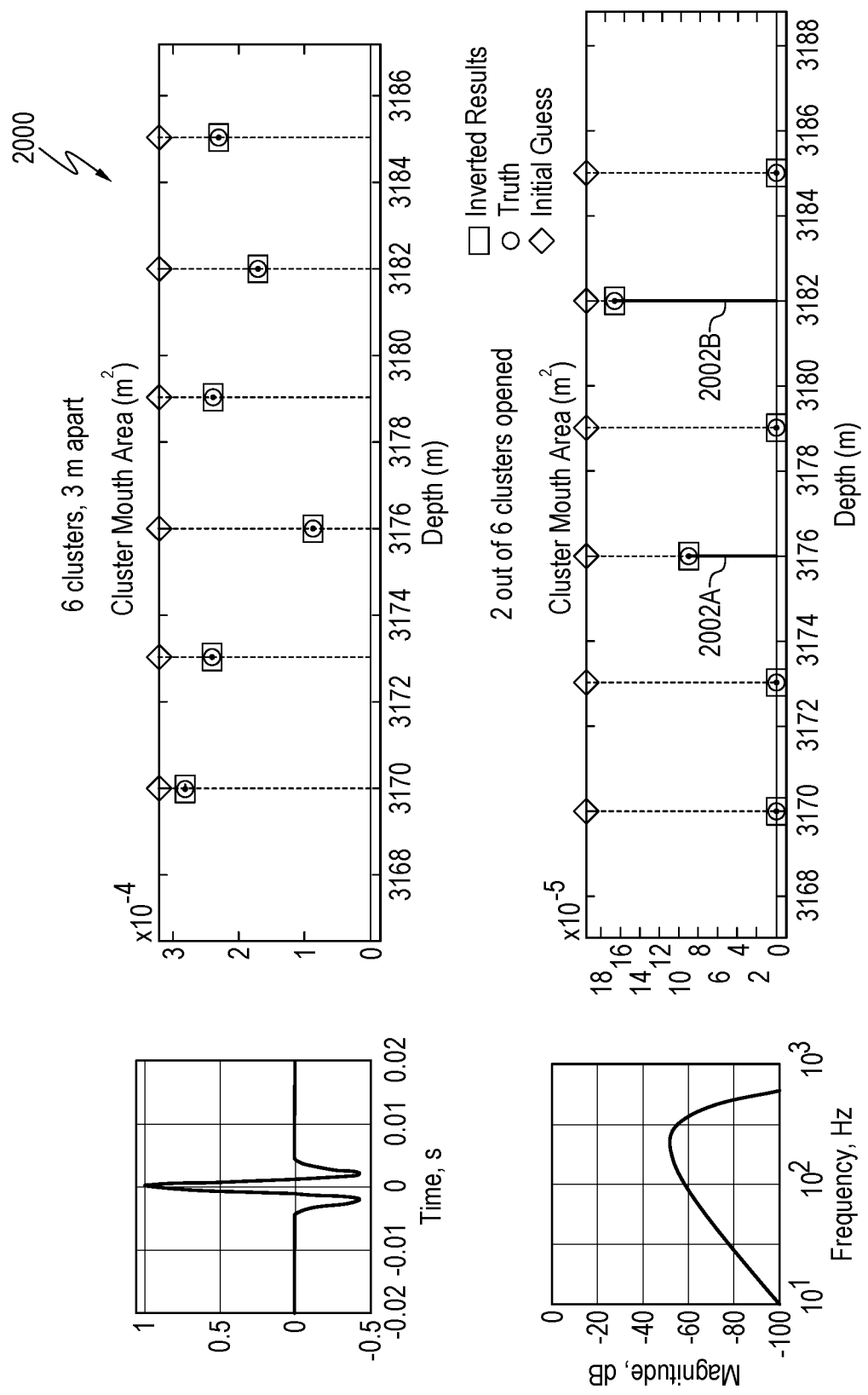
FIG. 20 is a graphical view of exemplary results obtained using the full waveform inversion method described herein.

Tube wave reflection and transmission in a group of perforation clusters can be very complicated. The tube waves transmitted beyond an initial acoustic impedance boundary may encounter subsequent acoustic impedance boundaries, leading to additional bifurcation of tube waves with different travel paths. Pressure receivers that monitor pressure near the top of the wellbore will detect the cumulative tube wave that travels back up the wellbore, which represents a complicated set of interactions of reflected and transmitted tube waves reflected at multiple acoustic impedance boundaries. In order to relate the received tube waves to the nature of the acoustic impedance boundaries, a robust physical model of tube wave propagation in a wellbore may be used, in conjunction with details regarding the proper characterization of the behavior of different types of acoustic impedance boundaries. Specifically, according to embodiments described herein, a robust full waveform inversion method, which is based on the physical model of tube wave propagation in a wellbore and has a tolerance to realistic noise levels, is used to infer the number of reflections and the complex reflection coefficients, which may each be frequency dependent. Moreover, this full waveform inversion method is designed to work within suitable frequency bands for resolving the interactions at multiple acoustic impedance boundaries, i.e., multiple perforation clusters. This is illustrated by FIG. 20, which is a graphical view of exemplary results 2000 obtained using the full waveform inversion method described herein. Such results were obtained using a tube wave generated with a Ricker source waveform with a peak frequency of 200-Hz. This tube wave was used to detect six perforation clusters, with each perforation cluster being 3 meters apart. As shown at 2002A and 2002B, such results 2000 indicate that two out of the six perforation clusters are opened, while the other four perforation clusters are not.

Figure 21:
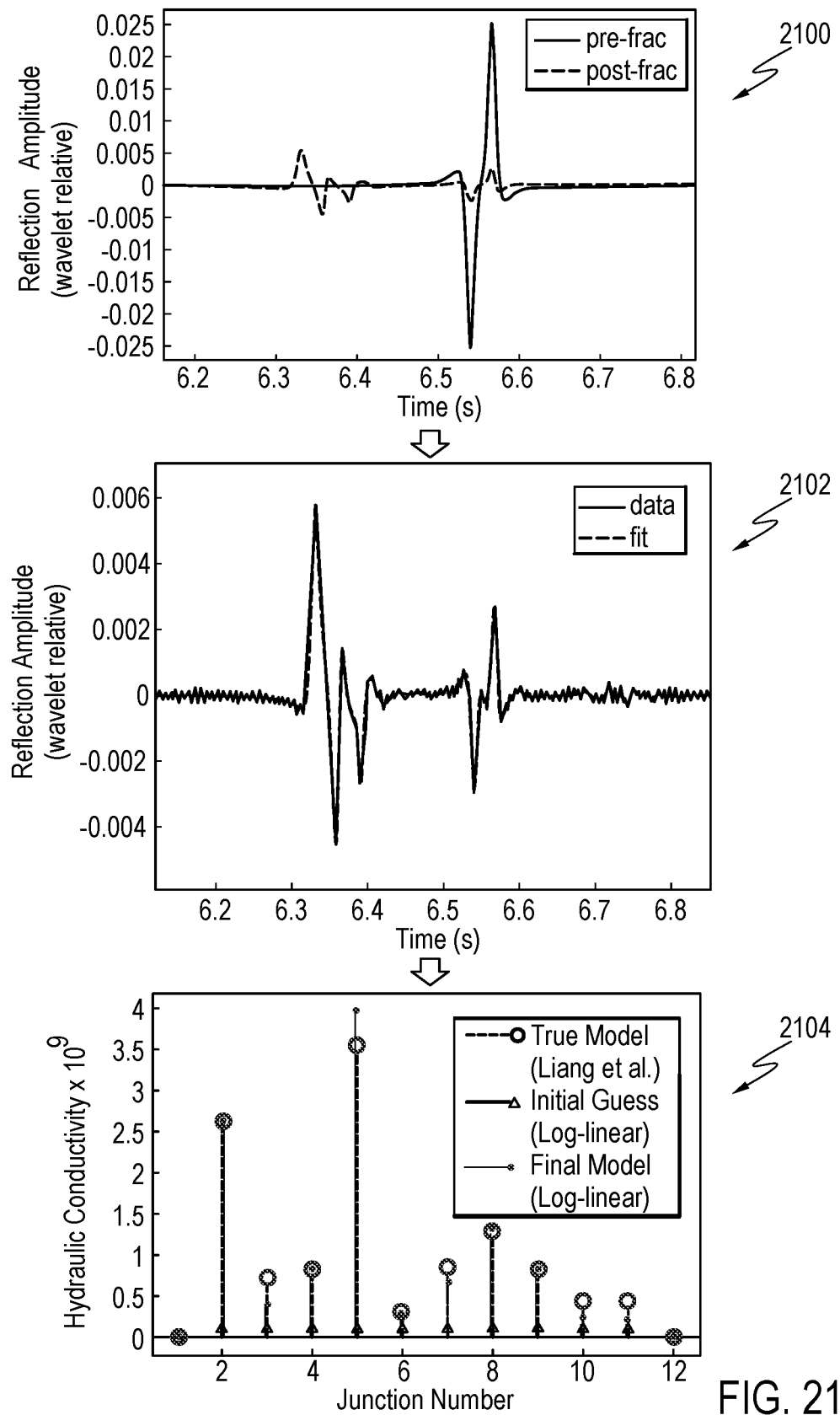
FIG. 21 is a graphical representation of exemplary results obtained using the techniques described herein.

FIG. 21 is a graphical representation of exemplary results obtained using the techniques described herein. Specifically, a first graph 2100 shows reflection amplitude as a function of time since the initiation of the pulse generation for the measured data (which were taken both pre- and post-fracturing). A second graph 2102 shows reflection amplitude as a function of time since the initiation of the pulse generation for the post-fracturing data to which the full waveform inversion is performed. Finally, a third graph 2104 shows the model results that are obtained using such data with full waveform inversion. In particular, the third graph 2104 provides an estimate of the hydraulic conductivity, at a frequency of 90 Hz corresponding to the peak power density of the generated pressure pulse, for each perforation cluster within the corresponding stage. The data in FIG. 21 were generated using a Liang-type fracture model for hydraulic conductivity, while the inversion used the log-linear parametric hydraulic conductivity model from Equation (38).

The cluster efficiency measurement techniques described herein utilize a pressure pulse generator and pressure receivers positioned at the surface of a wellbore. Ideally, the frequency is high enough that the perforation cluster spacing is greater than one quarter wavelength of the tube wave, as described herein. The tube waves reflected from multiple subsurface perforation clusters/fractures are then used in conjunction with the full waveform inversion method described herein to identify the number of open perforation clusters/fractures, as well as to estimate their reflectivity. The reflectivity, which is a complex-valued function of frequency, is then used as a surrogate measurement of the cluster efficiency.

According to the full waveform inversion methods described herein, the pressure measurements taken at specific observation locations within the top-side tube and/or the down-hole apparatus are matched by modifying the parameters of a model representing that apparatus. The model parameters, which are all functions of distance along the travel path of the tube wave, may include, for example, the radius of the tubular, the fluid bulk modulus, the fluid density, the fluid viscosity, the tube wall shear modulus, the tube wave-speed, the tube wave attenuation, the tube-junction reflection coefficient, the fracture aperture, the effective fluid density in the fracture, the effective fluid viscosity in the fracture, the effective fluid bulk modulus in the fracture, the shear modulus of the fracture wall, the cross-sectional area of the fracture mouth, the length of the fracture, and/or the effective hydraulic conductivity of the fracture (which is itself a parameterized complex-valued function of frequency, $f$).

For such a function for hydraulic conductivity, both Hornby- and Liang-type fractures (i.e., as described in Hornby et al. (1989), "Fracture evaluation using reflected Stoneley-wave arrivals," *GEOPHYSICS* 54: 1274-1288, and Liang at al. (2017), "Hydraulic fracture diagnostics from Krauklis-wave resonance and tube-wave reflections," *GEOPHYSICS* 82: D171-D186, respectively) may result in an effective hydraulic conductivity, σ, which may be approximately represented by Equation (38), parameterized by positive fitting coefficients, A, B, C, D and E.

$$\sigma(x) = A \exp[-Bx + i\phi(x)] \quad (38)$$

In Equation (1), $x=\log_{10} f$, and the phase function is given by $$\phi(x) = \frac{\pi}{180} \frac{C}{1 + \exp[D(x - \log_{10} E)]}.$$

Moreover, the function given in Equation (38) has a linear relationship between logarithmic amplitude and logarithmic frequency, and a logistic relationship between phase angle and logarithmic frequency.

Any optimization method may be used in combination with the full waveform inversion method to estimate the ensemble of tubular and perforation cluster/fracture parameters for the whole modeled apparatus, each seeking to find a single model, a set of highly-probable models, and/or a range for each model parameter, that best reproduces the observed data. These methods may include, for example, gradient descent methods, conjugate gradient descent methods, stochastic gradient descent methods, Newton's method, the Gauss-Newton method, the stochastic Gauss-Newton method, quasi-Newton methods, the limited-memory Broyden-Fletcher-Goldfarb-Shanno (L-BFGS) method, the Markov-chain Monte Carlo method, and/or the Randomized Maximum Likelihood method (or other forms of Bayesian inference). For example, in some embodiments, a regularized stochastic Gauss-Newton form of optimization is used, with adaptive selection of the trade-off between the regularization term (prior probability) and the data-fitting term (likelihood). The regularization term is used to introduce prior information about the model parameters. The Gauss-Newton framework requires the efficient calculation of the Jacobian matrix of model sensitivities, which may be accomplished through analytic or automatic differentiation. Data may be fit in either the frequency domain or the time domain, regardless of the manner in which the data are collected or visualized.

The results of the full waveform inversion method from a baseline (e.g., pre-fracture treatment) measurement may be used as prior model parameters for the subsequent inversion of a time-lapsed (e.g., post-fracture treatment) measurement. This would be a dual/cascading inversion approach. For example, the baseline measurements may be used to solve for the specific tube wave speed and attenuation in the unperforated, unfractured borehole. These tube-wave values may then be inserted and held fixed, or highly regularized, in a subsequent inversion of post-fracturing measurements, where only the individual cluster efficiency parameters are solved for. Alternatively, both the baseline and time-lapsed measurements may be simultaneously inverted for a model parameterized by both a baseline configuration and perturbations to that configuration representing the changes introduced by the fracturing.

Exemplary Methods for Cluster Efficiency Measurement Using Broadband Tube Waves

Embodiments described herein provides acoustic-based methods for characterizing specific properties of the perforation clusters within each stage of a wellbore, as well as (optionally) specific properties for each stage as a whole. This is accomplished using one or more pressure pulse generators to generate broadband tube waves that extend to relatively high frequencies within the wellbore, as well as multiple arrays of pressure receivers to record the resulting reflected tube waves. More specifically, the cluster efficiency measurement methods described herein utilize low-attenuation, broadband tube waves, in combination with interferometric and inversion techniques applied to the resulting data, to determine the reflection coefficients (and, thus, the estimated hydraulic conductivities) for each perforation cluster within each stage of a wellbore. Such reflection coefficients may then be directly interpreted as representing the individual perforation cluster efficiencies within each stage. Moreover, in various embodiments, such reflection coefficients are then used to define a uniformity index for the stage of the wellbore, which enables real-time cluster efficiency measurement during stimulation and/or after hydraulic fracturing. For example, such methods can be used to perform diagnostic fracture injection testing (DFIT) and/or to monitor fracture mouth opening/closing in real-time.

According to embodiments described herein, the waveform and frequency band for the generated tube waves are selected based on the details of the particular implementation. In particular, in various embodiments, the frequency band is specifically selected for each wellbore based, at least in part, on perforating-gun-generated tube waves within the wellbore. Moreover, in various embodiments, one or more tube waves with different frequency components can be generated and used to extract information about the number, sizes, compliances, and locations of the perforation clusters/fractures in each stage.

In various embodiments, the selected frequency band may be tuned as the cluster efficiency measurement process proceeds, and the results obtained using different frequency bands may be compared to help determine the characteristics of the reflectors within the wellbore. The various reflectors may then be categorized based on the reflectivity versus frequency trends for the reflected tube waves. In addition, in various embodiments, the pressure within the wellbore may be adjusted to enable tube waves to be generated within the selected frequency band. Techniques for signal-to-noise-ratio improvement (e.g., use of multiple repeat measurements through stacking or regression) may also be used to achieve a higher resolution of weak reflectors or perforation clusters that are shielded by others that come before it relative to the primary path of travel for the generated tube wave. Furthermore, as described herein, the tube wave generator and the pressure receivers may be separated by a predetermined distance to prevent interference between the generated and reflected broadband tube waves.

As described herein, the cluster efficiency measurement methods may include first taking a baseline measurement for the wellbore and then taking multiple measurements after the perforation clusters for a particular stage begin to grow. In general, it is preferable to perform this process when the wellbore is either static or under minimum flow conditions.

The cluster efficiency measurement methods described herein further include using full waveform inversion methods to interpret the results. In various embodiments, such full waveform inversion methods include determining a prior distribution for model parameters, including the parameters' configuration, individual values, ranges of uncertainty, and absolute bounds. This may be accomplished, at least in part, using a physical model that describes fracture and tube wave properties and/or an arbitrary fitting function that defines the hydraulic conductivity within fractures and the tube wave speed and attenuation properties. In some embodiments, prior information obtained from well design specifications and well-logging tools is utilized. Moreover, in some embodiments, prior information obtained from inversion results for a separate wellbore and/or prior pressure data acquired from the same wellbore may be utilized.

In various embodiments, the full waveform inversion methods include preparing the data in the frequency or time domain, as well as estimating the data errors. This may include stacking or averaging of multiple repeat observations from the same tube wave generator/pressure receiver system. Additionally or alternatively, this may include time/phase-shifted differencing and deconvolution of multiple simultaneous observations from the same system positioned at different locations, which is a form of interferometry. Additionally or alternatively, this may include differencing and cross-normalization of multiple time-lapsed observations of a changing system, where changes are isolated to one part of the system. Additionally or alternatively, this may include other forms of interferometry, which uses multiple measurements, either at multiple locations within the same system or at multiple times within a changing system. Interferometry seeks to prepare the data in a way that removes dependence on unknown source parameters or unknown reflection points that occur near the source and receiver apparatus, but which are unrelated to the downstream/down-line perforation clusters.

In various embodiments, the full waveform inversion methods include any of a number of additional features. As an example, the full waveform inversion methods may include generating realistic numerical simulations of tube waves interacting with joints, perforation clusters/fractures, and other reflectors within the wellbore, where such numerical simulations may also produce a Jacobian matrix of derivatives of each datum with respect to each model parameter. As another example, the full waveform inversion methods may include using optimization techniques to reduce a misfit between simulated and measured data down to an estimated data error level while honoring prior information. As another example, the full waveform inversion methods may include outputting model parameters describing the overall wellbore, where such model parameters fit the observed data and honor prior information. As another example, the full waveform inversion methods may include performing two inversions: one inversion before fracturing to estimate background tubular/wellbore properties and one inversion after fracturing, where the inversion performed after fracturing reuses background values from the first inversion and estimates perforation cluster/fracture parameters; and the output (posterior) model of the first inversion then becomes the prior model of the second inversion. As yet another example, the full waveform inversion methods may include performing uncertainty quantification by solving for a range of model values or distributions of models that fit the data to an acceptable degree.

Figure 22:
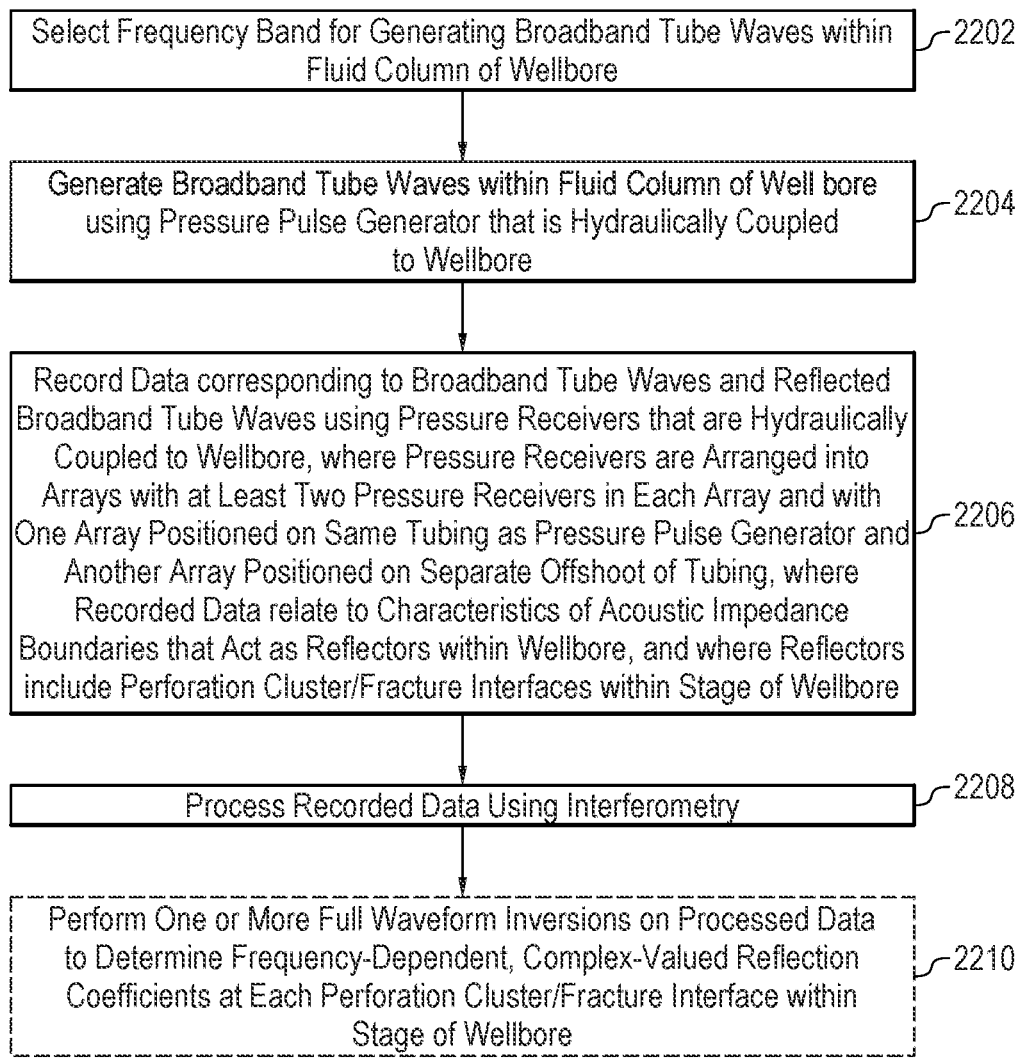
FIG. 22 is a process flow diagram of an exemplary method for cluster efficiency measurement for a hydrocarbon well.

FIG. 22 is a process flow diagram of an exemplary method 2200 for cluster efficiency measurement for a stage of a hydrocarbon well. The hydrocarbon well includes a wellbore including a fluid column that is defined by a surface casing string that couples the wellbore to a wellhead located at the surface and a production casing string that extends through a reservoir within the subsurface. Moreover, in various embodiments, the method 2200 is performed for each stage of the wellbore as the hydraulic fracturing operation progresses.

The method 2200 begins at block 2202, at which a frequency band is selected for generating broadband tube waves within the fluid column, where the frequency band may be selected based on a non-dispersive wave criterion, a low attenuation criterion, a spatial resolution criterion, and/or a reflector differentiation criterion. In various embodiments, selecting the frequency band based on the non-dispersive wave criterion includes selecting the upper frequency bound for the frequency band based on the diameter of the smallest casing string within the wellbore. In various embodiments, selecting the frequency band based on the low attenuation criterion includes determining expected tube wave attenuation within the wellbore using high-frequency pressure data acquired at the surface based on at least one of a single perforating-gun-generated tube wave generated at a single location within the wellbore or multiple perforating-gun-generated tube waves generated at different locations along the wellbore. In various embodiments, selecting the frequency band based on the spatial resolution criterion includes determining the frequency band based on a quarter wavelength resolution rule in combination with a distance between each perforation cluster/fracture interface within the stage of the wellbore. In various embodiments, selecting the frequency band based on the reflector differentiation criterion includes selecting the frequency band such that the recorded data, in light of ambient and/or instrumental noise, enable differentiation between the reflectors within the wellbore. Moreover, in various embodiments, the frequency band is selected based, at least in part, on performing inversions of synthetic data created with various choices of frequency bands and then selecting the frequency band that results in a best recovery of model parameters through inversion. Furthermore, in some embodiments, the frequency band is between 10 Hertz and 500 Hertz.

At block 2204, the broadband tube waves are generated within the fluid column of the wellbore using a pressure pulse generator that is hydraulically coupled to the wellbore. In some embodiments, the broadband tube waves are generated when the fluid column is static, flowing at a rate of less than 1 barrel per minute (bbl/min), flowing at a rate of less than 5 bbl/min, or flowing at a rate of less than 10 bbl/min. In some embodiments, generating the broadband tube waves using the pressure pulse generator includes generating the broadband tube waves using at least one high-speed, actuated valve that is electrically or hydraulically controlled. Moreover, in some embodiments, generating the broadband tube waves within the fluid column of the wellbore includes generating multiple broadband tube waves with different frequencies within the frequency band.

At block 2206, data corresponding to the broadband tube waves and the reflected broadband tube waves are recorded using a number of pressure receivers that are hydraulically coupled to the wellbore, where the pressure receivers are arranged into arrays with two or more pressure receivers in each array and with one array positioned on the same tubing as the pressure pulse generator and another array positioned on a separate offshoot of tubing, which may be connected by a T-junction to a portion of the wellhead that is in close proximity to the wellbore. In particular, in various embodiments, the offshoot of tubing is positioned within close proximity to the wellbore such that there are minimal interfering reflection points between the offshoot of tubing and the wellbore. The data recorded by the pressure receivers relate to characteristics of reflectors within the wellbore, and such reflectors include the perforation cluster/fracture interfaces within the particular stage of the wellbore.

In various embodiments, the pressure pulse generator and the pressure receivers are specifically selected to achieve a high signal-to-noise ratio (SNR) at the selected frequency band. In various embodiments, the pressure receivers and the pressure pulse generator are provided at a predetermined minimum distance from each other to prevent interference between the generated broadband tube waves and other non-tube-wave modes of energy propagation or the reflected broadband tube waves propagating within the fluid column.

In addition, in some embodiments, the positioning of the pressure receivers and/or the pressure pulse generator is modified based on the pressure receiver's signal-to-noise ratio limit. Furthermore, in some embodiments, the method 2200 further includes selecting a waveform for generating the broadband tube waves, as described herein.

In various embodiments, each pressure receiver within each array is positioned at a predetermined minimum distance from the other pressure receivers within the array to enable differentiation between the data recorded by each pressure receiver. In some embodiments, each array includes three pressure receivers, although each array may alternatively include two, four, or even more pressure receivers for some applications. In addition, in various embodiments, the pressure receivers within each array are equally spaced. Furthermore, in various embodiments, the offshoot of tubing includes an inner diameter that is smaller than the inner diameter of the tubing including the pressure pulse generator; and in various embodiments, the offshoot of tubing is positioned close to the wellbore.

At block 2208, the recorded data are processed using interferometry, as described herein. At block 2210, at least one full waveform inversion is performed, as described herein, to determine frequency-dependent, complex-valued reflection coefficients at each perforation cluster/fracture interface within the stage of the wellbore. Furthermore, at optional block 2212, the magnitudes of the frequency-dependent, complex-valued reflection coefficients at each perforation cluster/fracture interface may be normalized to determine a frequency-dependent uniformity index that defines a cluster efficiency of the stage as a whole.

The process flow diagram of FIG. 22 is not intended to indicate that the steps of the method 2200 are to be executed in any particular order, or that all of the steps of the method 2200 are to be included in every case. Further, any number of additional steps not shown in FIG. 22 may be included within the method 2200, depending on the details of the specific implementation. As an example, in some embodiments, the method 2200 includes performing time-lapsed measurements for each stage by: (1) generating the broadband tube waves and recording the corresponding data before the stage is hydraulically fractured; (2) generating the broadband tube waves and recording the corresponding data after the stage is hydraulically fractured; and (3) performing one of: (a) using at least a portion of the data recorded before the stage was hydraulically fractured to determine prior model parameters for performing the full waveform inversion(s) on the data recorded after the stage was hydraulically fractured; or (b) performing interferometry on the resulting time-lapsed data sets and then using at least a portion of the resulting interferometric data as input for performing the full waveform inversion(s). As another example, in some embodiments, the method 2200 includes determining whether the cluster efficiency of the stage (as determined at optional block 2212) is below a threshold level and, if the cluster efficiency is below the threshold level, performing one or more limited entry techniques, performing one or more intra-stage diversion techniques, and/or modifying the pump schedule during the hydraulic fracturing process.

Exemplary Embodiments of Present Techniques

In one or more embodiments, the present techniques may be susceptible to various modifications and alternative forms, such as the following embodiments as noted in paragraphs 1 to 20.

Paragraph 1. A method for measuring cluster efficiency for a stage of a wellbore, wherein the wellbore comprises a fluid column that is defined by a surface casing string that couples the wellbore to a wellhead located at a surface and a production casing string that extends through a reservoir within a subsurface, and wherein the method comprises: selecting a frequency band for generating broadband tube waves within the fluid column of the wellbore; generating the broadband tube waves within the fluid column of the wellbore using a pressure pulse generator that is hydraulically coupled to the wellbore; recording data corresponding to the broadband tube waves and reflected broadband tube waves using a plurality of pressure receivers that are hydraulically coupled to the wellbore, wherein the plurality of pressure receivers are arranged into arrays with at least two pressure receivers in each array and with one array positioned on a same tubing as the pressure pulse generator and another array positioned on a separate offshoot of tubing, wherein the data recorded by the plurality of pressure receivers relate to characteristics of reflectors within the wellbore, and wherein the reflectors comprise perforation cluster/fracture interfaces within a stage of the wellbore; processing the recorded data using interferometry; and performing at least one full waveform inversion on the processed data to determine frequency-dependent, complex-valued reflection coefficients at each perforation cluster/fracture interface within the stage of the wellbore.

Paragraph 2. The method of paragraph 1, further comprising normalizing magnitudes of the frequency-dependent, complex-valued reflection coefficients at each perforation cluster/fracture interface to determine a frequency-dependent uniformity index that defines a cluster efficiency of the stage.

Paragraph 3. The method of paragraph 2, comprising: determining whether the cluster efficiency of the stage is below a threshold level; and if the cluster efficiency is below the threshold level, performing at least one of modification of a pump schedule or use of intra-stage diversion techniques.

Paragraph 4. The method of any of paragraphs 1 to 3, comprising selecting the frequency band based, at least in part, on at least one of a non-dispersive wave criterion, a low attenuation criterion, a spatial resolution criterion, or a reflector differentiation criterion.

Paragraph 5. The method of paragraph 4, comprising performing at least one of: selecting the frequency band based, at least in part, on the non-dispersive wave criterion by selecting an upper frequency bound for the frequency band based on a diameter of a smallest casing string within the wellbore; selecting the frequency band based, at least in part, on the low attenuation criterion by determining expected tube wave attenuation within the wellbore using high-frequency pressure data acquired at the surface based on at least one of a single perforating-gun-generated tube wave generated at a single location within the wellbore or multiple perforating-gun-generated tube waves generated at different locations along the wellbore; selecting the frequency band based, at least in part, on the spatial resolution criterion by determining the frequency band based on a quarter wavelength resolution rule in combination with a distance between each perforation cluster/fracture interface within the stage of the wellbore; or selecting the frequency band based, at least in part, on the reflector differentiation criterion by selecting the frequency band such that the recorded data, in light of at least one of ambient or instrumental noise, enable differentiation between the reflectors within the wellbore.

Paragraph 6. The method of any of paragraphs 1 to 5, comprising selecting the frequency band based, at least in part, on performing inversions of synthetic data created with various choices of frequency bands and then selecting the frequency band that results in a best recovery of model parameters through inversion.

Paragraph 7. The method of any of paragraphs 1 to 6, comprising positioning each of the plurality of pressure receivers within each array at a predetermined minimum distance from each other to enable differentiation between the data recorded by each pressure receiver.

Paragraph 8. The method of any of paragraphs 1 to 7, comprising performing the method for each of a plurality of stages of the wellbore.

Paragraph 9. The method of paragraph 8, wherein the method further comprises performing time-lapsed measurements for each stage by: generating the broadband tube waves and recording the corresponding data before the stage is hydraulically fractured; generating the broadband tube waves and recording the corresponding data after the stage is hydraulically fractured; and performing one of: using at least a portion of the data recorded before the stage was hydraulically fractured to determine prior model parameters for performing the at least one full waveform inversion on at least a portion of the data recorded after the stage was hydraulically fractured; or performing interferometry on resulting time-lapsed data sets and then using at least a portion of resulting interferometric data as input for performing the at least one full waveform inversion.

Paragraph 10. The method of any of paragraphs 1 to 9, comprising providing the pressure pulse generator and the plurality of pressure receivers at a predetermined minimum distance from each other.

Paragraph 11. A system for measuring cluster efficiency for a stage of a wellbore, comprising: a pressure pulse generator that is hydraulically coupled to a wellbore and is configured to generate broadband tube waves with a selected frequency band, wherein the broadband tube waves propagate within a fluid column within the wellbore and interact with perforation cluster/fracture interfaces and other reflectors within a stage of the wellbore, creating reflected broadband tube waves that propagate within the fluid column; and at least two arrays of pressure receivers that are hydraulically coupled to the wellbore and are configured to record data corresponding to the broadband tube waves and the reflected broadband tube waves, wherein each array comprises at least two pressure receivers, with one array positioned on a same tubing as the pressure pulse generator and another array positioned on a separate offshoot of tubing, and wherein the data recorded by the pressure receivers provide frequency-dependent, complex-valued reflection coefficients at each perforation cluster/fracture interface within the stage of the wellbore after application of interferometric techniques and at least one full waveform inversion.

Paragraph 12. The system of paragraph 11, wherein the data recorded by the pressure receivers provide a frequency-dependent uniformity index that defines a cluster efficiency of the stage of the wellbore after normalization of the magnitudes of the frequency-dependent, complex-valued reflection coefficients at each perforation cluster/fracture interface.

Paragraph 13. The system of paragraph 11 or 12, wherein the frequency band is selected based, at least in part, on at least one of a non-dispersive wave criterion, a low attenuation criterion, a spatial resolution criterion, or a reflector differentiation criterion.

Paragraph 14. The system of any of paragraphs 11 to 13, wherein the frequency band is selected based, at least in part, on performance of inversions of synthetic data created with various choices of frequency bands and then selecting the frequency band that results in a best recovery of model parameters through inversion.

Paragraph 15. The system of any of paragraphs 11 to 14, wherein each pressure receiver within each array is positioned at a predetermined minimum distance from the other pressure receivers within the array to enable differentiation between the data recorded by each pressure receiver.

Paragraph 16. The system of any of paragraphs 11 to 15, wherein the pressure pulse generator and the pressure receivers are provided at a predetermined minimum distance from each other.

Paragraph 17. The system of any of paragraphs 11 to 16, wherein each array comprises three pressure receivers.

Paragraph 18. The system of any of paragraphs 11 to 17, wherein the pressure receivers within each array are equally spaced.

Paragraph 19. The system of any of paragraphs 11 to 18, wherein the offshoot of tubing comprises an inner diameter that is less than 10% of an inner diameter of the tubing comprising the pressure pulse generator.

Paragraph 20. The system of any of paragraphs 11 to 19, wherein the offshoot of tubing is positioned within close proximity to the wellbore such that there are minimal interfering reflection points between the offshoot of tubing and the wellbore.

While the embodiments described herein are well-calculated to achieve the advantages set forth, it will be appreciated that such embodiments are susceptible to modification, variation, and change without departing from the spirit thereof. In other words, the particular embodiments described herein are illustrative only, as the teachings of the present techniques may be modified and practiced in different but equivalent manners apparent to those skilled in the art having the benefit of the teachings herein. Furthermore, no limitations are intended on the details of formulation, construction, or design herein shown, other than as described in the claims below. Moreover, the systems and methods illustratively disclosed herein may suitably be practiced in the absence of any element that is not specifically disclosed herein and/or any optional element disclosed herein. While compositions and methods are described in terms of "comprising" or "including" various components or steps, the compositions and methods can also "consist essentially of" or "consist of" the various components and steps. Indeed, the present techniques include all alternatives, modifications, and equivalents falling within the true spirit and scope of the appended claims.

What is claimed is:

1. A method for measuring cluster efficiency for a wellbore, wherein the wellbore comprises a fluid column that is defined by a surface casing string that couples the wellbore to a wellhead located at a surface and a production casing string that extends through a reservoir within a subsurface, and wherein the method comprises:

selecting a frequency band for generating broadband tube waves within the fluid column of the wellbore;

generating the broadband tube waves within the fluid column of the wellbore using a pressure pulse generator that is hydraulically coupled to the wellbore;

recording data corresponding to the broadband tube waves and reflected broadband tube waves using a plurality of pressure receivers that are hydraulically coupled to the wellbore, wherein the plurality of pressure receivers are arranged into arrays with at least two pressure receivers in each array and with one array positioned on a same tubing as the pressure pulse generator and another array positioned on a separate offshoot of tubing, wherein the data recorded by the plurality of pressure receivers relate to characteristics of reflectors within the wellbore, and wherein the reflectors comprise perforation cluster/fracture interfaces within a stage of the wellbore;
processing the recorded data using interferometry; and
performing at least one full waveform inversion on the processed data to determine frequency-dependent, complex-valued reflection coefficients at each perforation cluster/fracture interface within the stage of the wellbore.

2. The method of claim 1, further comprising normalizing magnitudes of the frequency-dependent, complex-valued reflection coefficients at each perforation cluster/fracture interface to determine a frequency-dependent uniformity index that defines a cluster efficiency of the stage.

3. The method of claim 2, comprising:
determining whether the cluster efficiency of the stage is below a threshold level; and
if the cluster efficiency of the stage is below the threshold level, performing at least one of modification of a pump schedule or use of intra-stage diversion techniques.

4. The method of claim 1, comprising selecting the frequency band based, at least in part, on at least one of a non-dispersive wave criterion, a low attenuation criterion, a spatial resolution criterion, or a reflector differentiation criterion.

5. The method of claim 4, comprising performing at least one of:
selecting the frequency band based, at least in part, on the non-dispersive wave criterion by selecting an upper frequency bound for the frequency band based on a diameter of a smallest casing string within the wellbore;
selecting the frequency band based, at least in part, on the low attenuation criterion by determining expected tube wave attenuation within the wellbore using high-frequency pressure data acquired at the surface based on at least one of a single perforating-gun-generated tube wave generated at a single location within the wellbore or multiple perforating-gun-generated tube waves generated at different locations along the wellbore;
selecting the frequency band based, at least in part, on the spatial resolution criterion by determining the frequency band based on a quarter wavelength resolution rule in combination with a distance between each perforation cluster/fracture interface within the stage of the wellbore; or
selecting the frequency band based, at least in part, on the reflector differentiation criterion by selecting the frequency band such that the recorded data, in light of at least one of ambient or instrumental noise, enable differentiation between the reflectors within the wellbore.

6. The method of claim 1, comprising selecting the frequency band based, at least in part, on performing inversions of synthetic data created with various choices of frequency bands and then selecting a frequency band that results in a best recovery of model parameters through inversion.

7. The method of claim 1, comprising positioning each of the plurality of pressure receivers within each array at a predetermined minimum distance from each other to enable differentiation between the data recorded by each pressure receiver.

8. The method of claim 1, comprising performing the method for each of a plurality of stages of the wellbore.

9. The method of claim 8, wherein the method further comprises performing time-lapsed measurements for each stage by:
generating the broadband tube waves and recording the corresponding data before the stage is hydraulically fractured;
generating the broadband tube waves and recording the corresponding data after the stage is hydraulically fractured; and
performing one of:
using at least a portion of the data recorded before the stage was hydraulically fractured to determine prior model parameters for performing the at least one full waveform inversion on at least a portion of the data recorded after the stage was hydraulically fractured; or
performing interferometry on resulting time-lapsed data sets and then using at least a portion of resulting interferometric data as input for performing the at least one full waveform inversion.

10. The method of claim 1, comprising providing the pressure pulse generator and the plurality of pressure receivers at a predetermined minimum distance from each other.

11. A system for measuring cluster efficiency, comprising:
a pressure pulse generator that is hydraulically coupled to a wellbore and is configured to generate broadband tube waves with a selected frequency band, wherein the broadband tube waves propagate within a fluid column within the wellbore and interact with perforation cluster/fracture interfaces and other reflectors within a stage of the wellbore, creating reflected broadband tube waves that propagate within the fluid column; and
at least two arrays of pressure receivers that are hydraulically coupled to the wellbore and are configured to record data corresponding to the broadband tube waves and the reflected broadband tube waves, wherein each array comprises at least two pressure receivers, with one array positioned on a same tubing as the pressure pulse generator and another array positioned on a separate offshoot of tubing, and wherein the data recorded by the pressure receivers of at least one of the at least two arrays of pressure receivers provide frequency-dependent, complex-valued reflection coefficients at each perforation cluster/fracture interface within the stage of the wellbore after application of interferometric techniques and at least one full waveform inversion.

12. The system of claim 11, wherein the data recorded by the pressure receivers of at least one of the at least two arrays of pressure receivers provide a frequency-dependent uniformity index that defines a cluster efficiency of the stage of the wellbore after normalization of magnitudes of the frequency-dependent, complex-valued reflection coefficients at each perforation cluster/fracture interface.

13. The system of claim 11, wherein the frequency band is selected based, at least in part, on at least one of a non-dispersive wave criterion, a low attenuation criterion, a spatial resolution criterion, or a reflector differentiation criterion.

14. The system of claim 11, wherein the frequency band is selected based, at least in part, on performance of inversions of synthetic data created with various choices of frequency bands and then selecting a frequency band that results in a best recovery of model parameters through inversion.

15. The system of claim 11, wherein each pressure receiver within each array is positioned at a predetermined minimum distance from the other pressure receivers within the array to enable differentiation between the data recorded by each pressure receiver.

16. The system of claim 11, wherein the pressure pulse generator and the pressure receivers of at least one of the at least two arrays of pressure receivers are provided at a predetermined minimum distance from each other.

17. The system of claim 11, wherein each array comprises three pressure receivers.

18. The system of claim 11, wherein the pressure receivers within each array are equally spaced.

19. The system of claim 11, wherein the offshoot of tubing comprises an inner diameter that is less than 10% of an inner diameter of the tubing comprising the pressure pulse generator.

20. The system of claim 11, wherein the offshoot of tubing is positioned within close proximity to the wellbore such that there are minimal interfering reflection points between the offshoot of tubing and the wellbore.

* * * * *